(12) United States Patent
Jhang et al.

(10) Patent No.: US 9,983,385 B2
(45) Date of Patent: May 29, 2018

(54) OPTICAL IMAGING LENS

(71) Applicant: GENIUS ELECTRONIC OPTICAL CO., LTD., Taichung (TW)

(72) Inventors: Jia-Sin Jhang, Taichung (TW); Yanxuan Yin, Xiamen (CN); Maozong Lin, Xiamen (CN)

(73) Assignee: GeniuS Electronic Optical (Xiamen) Co., Ltd., Xiamen (CN)

( * ) Notice: Subject to any disclaimer, the term of this patent is extended or adjusted under 35 U.S.C. 154(b) by 0 days. days.

(21) Appl. No.: 15/145,241

(22) Filed: May 3, 2016

(65) Prior Publication Data

US 2017/0269332 A1   Sep. 21, 2017

(30) Foreign Application Priority Data

Mar. 18, 2016 (CN) .......................... 2016 1 0157042

(51) Int. Cl.
*G02B 13/00* (2006.01)
*G02B 9/34* (2006.01)

(52) U.S. Cl.
CPC .............. *G02B 13/004* (2013.01); *G02B 9/34* (2013.01)

(58) Field of Classification Search
CPC .......... G02B 13/004; G02B 9/38; G02B 9/34; G02B 9/56; G02B 13/0045
USPC ........................................................ 359/715
See application file for complete search history.

(56) References Cited

U.S. PATENT DOCUMENTS

2014/0055870 A1* 2/2014 Chang ................. G02B 13/004
                                                           359/715
2015/0116569 A1* 4/2015 Mercado ............ H04N 5/23212
                                                           348/335

* cited by examiner

*Primary Examiner* — Bumsuk Won
*Assistant Examiner* — Wen Huang
(74) *Attorney, Agent, or Firm* — Baker & McKenzie LLP

(57) ABSTRACT

Present embodiments provide for an optical imaging lens. The optical imaging lens comprises a first lens element, a second lens element, a third lens element, and a fourth lens element positioned in an order from an object side to an image side. By controlling the convex or concave shape of the surfaces of the lens elements and designing parameters satisfying at least one inequality, the optical imaging lens may exhibit better optical characteristics and an enlarged field angle, and the total length of the optical imaging lens may be shortened.

19 Claims, 55 Drawing Sheets

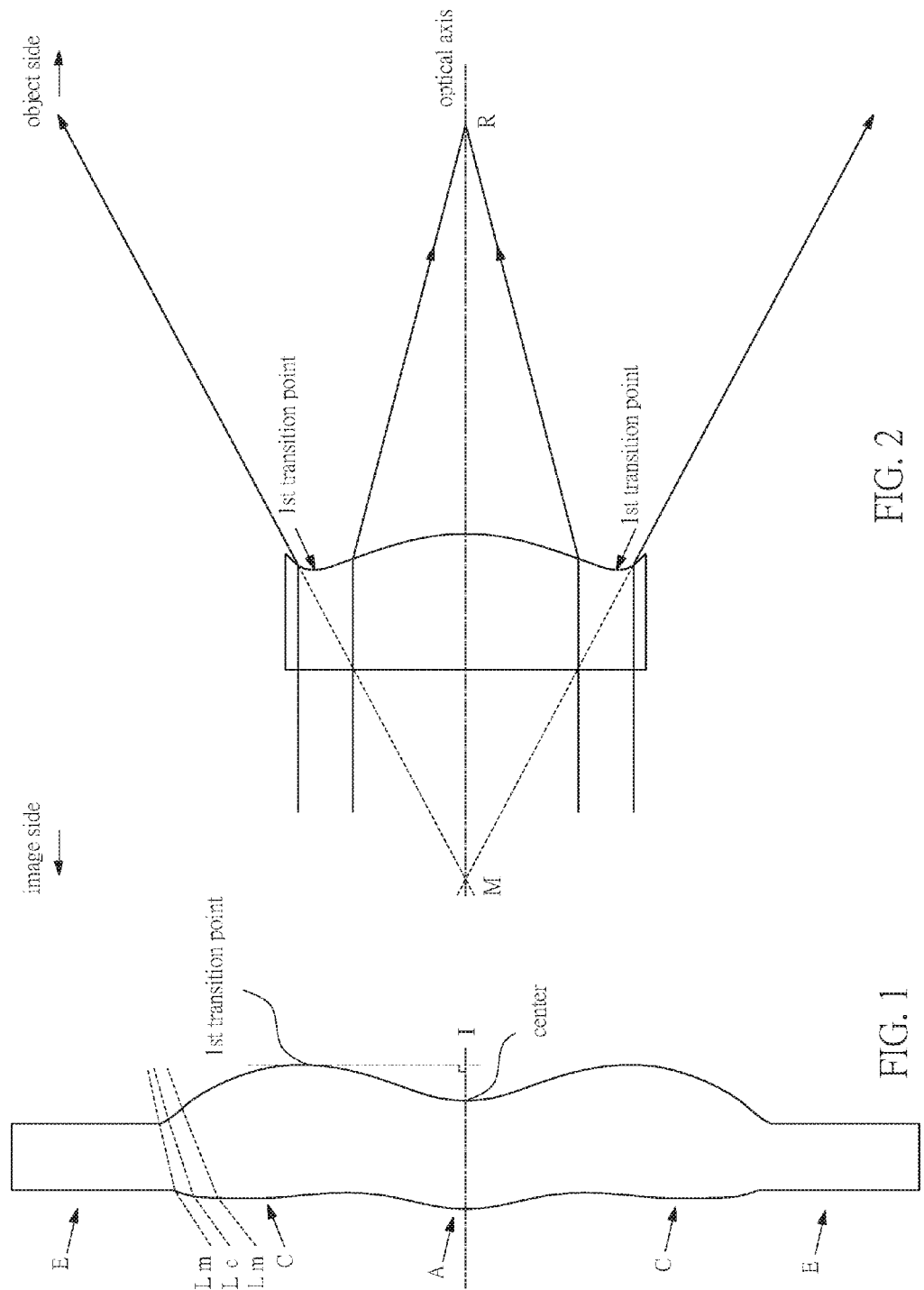

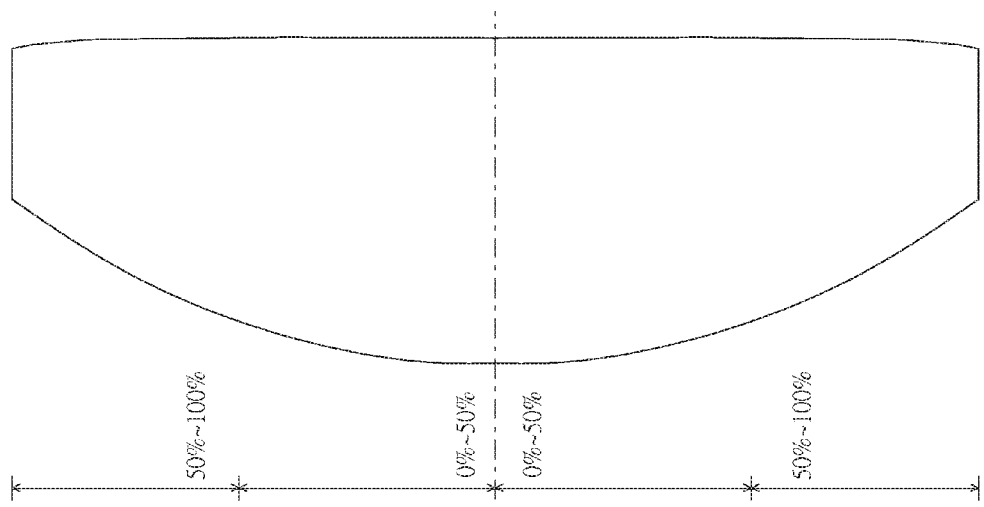
FIG. 5
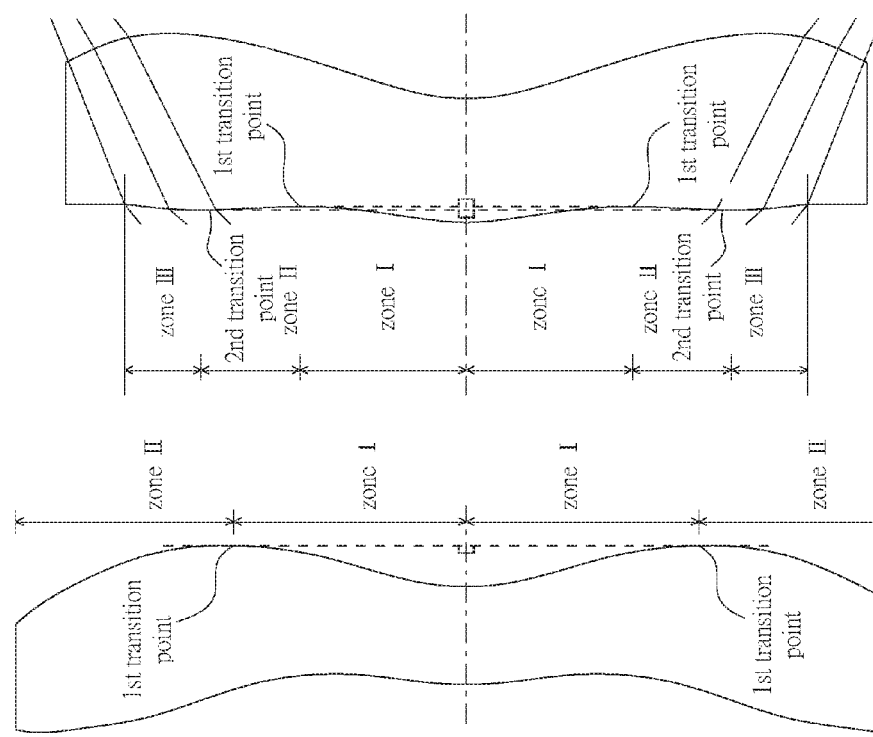
FIG. 4
FIG. 3

| \multicolumn{7}{c|}{EFL(Effective focus length)= 7.075mm, HFOV(Half angular field of view)= 18.726deg., System length=6.960 mm, Image height= 2.4mm, Fno=2.398} |
|---|---|---|---|---|---|---|---|
| Surface # | | Radius | Thickness | Refractive index | Abbe number | Focus | Material |
| - | Object | ∞ | ∞ | | | | |
| 100 | Aperture stop | ∞ | -0.565 | | | | |
| 111 | 1st lens element | 2.136 | 1.342 | 1.545 | 55.987 | 3.460 | plastic |
| 112 | | -12.784 | 0.317 | | | | |
| 121 | 2nd lens lement | -28.863 | 0.230 | 1.642 | 22.409 | -4.207 | plastic |
| 122 | | 3.017 | 2.322 | | | | |
| 131 | 3rd lens element | 8.065 | 0.858 | 1.642 | 22.409 | 8.666 | plastic |
| 132 | | -17.656 | 0.516 | | | | |
| 141 | 4th lens element | -2.255 | 0.374 | 1.535 | 55.690 | -6.190 | plastic |
| 142 | | -7.428 | 0.400 | | | | |
| 161 | IR cut filter | ∞ | 0.210 | 1.517 | 64.167 | | plastic |
| 162 | | ∞ | 0.390 | | | | |
| 170 | Image plane | ∞ | 0.000 | | | | |

FIG. 8

| Aspherical parameters | | | | |
|---|---|---|---|---|
| Surface # | 111 | 112 | 121 | 122 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -7.959110E-04 | 1.288646E-02 | 2.252729E-02 | 3.104692E-02 |
| $a_6$ | -8.745375E-04 | -4.877156E-03 | -1.349664E-02 | -3.337275E-03 |
| $a_8$ | 2.767889E-04 | 2.311829E-03 | 9.077421E-03 | 8.415348E-03 |
| $a_{10}$ | -9.435495E-05 | -5.069031E-04 | -2.537982E-03 | -3.369049E-04 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 131 | 132 | 141 | 142 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -2.680990E-02 | -5.212177E-02 | -7.576998E-02 | -4.167798E-02 |
| $a_6$ | 1.141555E-02 | 3.156385E-02 | 9.032860E-02 | 3.004619E-02 |
| $a_8$ | -7.640133E-03 | -1.213266E-02 | -3.107406E-02 | -7.748622E-03 |
| $a_{10}$ | 1.211825E-03 | 1.441653E-03 | 4.437855E-03 | 7.954896E-04 |
| $a_{12}$ | 0.000000E+00 | 0.000000E+00 | -1.925734E-04 | -2.910321E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 9

EFL(Effective focus length)= 8.000mm, HFOV(Half angular field of view)= 16.644deg., System length=7.999 mm, Image height= 2.4mm, Fno=2.395

| Surface # | | Radius | Thickness | Refractive index | Abbe number | Focus | Material |
|---|---|---|---|---|---|---|---|
| - | Object | ∞ | ∞ | | | | |
| 200 | Aperture stop | ∞ | -0.496 | | | | |
| 211 | 1st lens element | 2.850 | 1.473 | 1.545 | 55.987 | 4.446 | plastic |
| 212 | | -13.433 | 0.055 | | | | |
| 221 | 2nd lens lement | -11.113 | 0.299 | 1.661 | 20.401 | -9.554 | plastic |
| 222 | | 15.067 | 2.367 | | | | |
| 231 | 3rd lens element | 10.895 | 0.932 | 1.545 | 55.987 | -8.590 | plastic |
| 232 | | 3.181 | 0.372 | | | | |
| 241 | 4th lens element | 2.575 | 0.416 | 1.661 | 20.401 | 23.989 | plastic |
| 242 | | 2.871 | 0.400 | | | | |
| 261 | IR cut filter | ∞ | 0.210 | 1.517 | 64.167 | | plastic |
| 262 | | ∞ | 1.477 | | | | |
| 270 | Image plane | ∞ | 0.000 | | | | |

FIG. 12

| Aspherical parameters | | | | |
|---|---|---|---|---|
| Surface # | 211 | 212 | 221 | 222 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -2.472826E-03 | -1.274532E-04 | 3.847812E-03 | 2.609509E-03 |
| $a_6$ | 1.330029E-04 | -6.396093E-04 | -1.446339E-03 | -1.074467E-03 |
| $a_8$ | -1.520667E-04 | 1.310056E-04 | 2.392771E-04 | -1.353023E-05 |
| $a_{10}$ | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 231 | 232 | 241 | 242 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -1.638366E-02 | -3.947882E-02 | -1.117903E-01 | -1.087161E-01 |
| $a_6$ | -1.781595E-02 | 2.395176E-03 | 1.420390E-02 | 1.861797E-02 |
| $a_8$ | 6.762630E-03 | -5.174741E-04 | -9.148057E-04 | -3.008002E-03 |
| $a_{10}$ | -2.007390E-03 | -1.021892E-04 | -8.023248E-04 | -6.211541E-05 |
| $a_{12}$ | 0.000000E+00 | 0.000000E+00 | 1.619546E-04 | 6.625188E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 13

| EFL(Effective focus length)= 7.079mm, HFOV(Half angular field of view)= 18.710deg., System length=6.887 mm, Image height= 2.4mm, Fno=2.400 |||||||  |
|---|---|---|---|---|---|---|---|
| Surface # | | Radius | Thickness | Refractive index | Abbe number | Focus | Material |
| - | Object | ∞ | ∞ | | | | |
| 300 | Aperture stop | ∞ | -0.572 | | | | |
| 311 | 1st lens element | 2.099 | 1.033 | 1.545 | 55.987 | 3.498 | plastic |
| 312 | | -17.663 | 0.392 | | | | |
| 321 | 2nd lens lement | 60.158 | 0.230 | 1.642 | 22.409 | -4.450 | plastic |
| 322 | | 2.745 | 2.570 | | | | |
| 331 | 3rd lens element | 7.424 | 0.851 | 1.642 | 22.409 | 8.625 | plastic |
| 332 | | -21.500 | 0.486 | | | | |
| 341 | 4th lens element | -2.307 | 0.325 | 1.535 | 55.690 | -5.868 | plastic |
| 342 | | -9.049 | 0.400 | | | | |
| 361 | IR cut filter | ∞ | 0.210 | 1.517 | 64.167 | | plastic |
| 362 | | ∞ | 0.390 | | | | |
| 370 | Image plane | ∞ | 0.000 | | | | |

FIG. 16

| Aspherical parameters | | | | |
|---|---|---|---|---|
| Surface # | 311 | 312 | 321 | 322 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -9.714619E-04 | 9.562274E-03 | 2.304715E-02 | 3.532925E-02 |
| $a_6$ | -1.147595E-03 | -4.204198E-03 | -1.392862E-02 | -5.395392E-03 |
| $a_8$ | 1.133144E-04 | 1.724575E-03 | 9.427634E-03 | 9.859193E-03 |
| $a_{10}$ | -8.059766E-05 | -2.690023E-04 | -2.254874E-03 | -2.067552E-04 |
| $a_{12}$ | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 331 | 332 | 341 | 342 |
| K | 0.000000E+00 | 0.000000E+00 | 0.000000E+00 | 0.000000E+00 |
| $a_2$ | 0.000000E+00 | 0.000000E+00 | 0.000000E+00 | 0.000000E+00 |
| $a_4$ | -2.361633E-02 | -4.827129E-02 | -7.248395E-02 | -4.176781E-02 |
| $a_6$ | 1.056934E-02 | 3.028240E-02 | 8.695851E-02 | 2.960467E-02 |
| $a_8$ | -6.968164E-03 | -1.158754E-02 | -2.960257E-02 | -7.431812E-03 |
| $a_{10}$ | 1.059003E-03 | 1.346913E-03 | 4.191483E-03 | 7.334912E-04 |
| $a_{12}$ | 0.000000E+00 | 0.000000E+00 | -1.879932E-04 | -2.561144E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 17

| \multicolumn{7}{c}{EFL(Effective focus length)= 7.094mm, HFOV(Half angular field of view)= 18.687deg., System length=7.094 mm, Image height= 2.4mm, Fno=2.403} |
|---|---|---|---|---|---|---|
| Surface # | | Radius | Thickness | Refractive index | Abbe number | Focus | Material |
| - | Object | ∞ | ∞ | | | | |
| 400 | Aperture stop | ∞ | -0.350 | | | | |
| 411 | 1st lens element | 2.479 | 0.974 | 1.545 | 55.987 | 3.757 | plastic |
| 412 | | -8.706 | 0.125 | | | | |
| 421 | 2nd lens lement | -3.688 | 0.430 | 1.642 | 22.409 | -9.358 | plastic |
| 422 | | -68.445 | 2.724 | | | | |
| 431 | 3rd lens element | -3.557 | 0.660 | 1.545 | 55.987 | 21.030 | plastic |
| 432 | | -5.695 | 0.861 | | | | |
| 441 | 4th lens element | -5.268 | 0.318 | 1.545 | 55.987 | -4.852 | plastic |
| 442 | | -1.944 | 0.400 | | | | |
| 461 | IR cut filter | ∞ | 0.210 | 1.517 | 64.167 | | plastic |
| 462 | | ∞ | 0.391 | | | | |
| 470 | Image plane | ∞ | 0.000 | | | | |

FIG. 20

| Asphorical parameters | | | | |
|---|---|---|---|---|
| Surface # | 411 | 412 | 421 | 422 |
| K | -1.112235E-01 | 5.212271E-00 | -5.193718E+00 | -4.502239E+02 |
| $a_2$ | -2.464671E-02 | -1.833332E-02 | -3.353990E-02 | -7.460435E-02 |
| $a_4$ | -1.105801E-02 | -2.800564E-02 | -4.391983E-03 | 1.974216E-02 |
| $a_6$ | 5.176728E-03 | 2.396794E-02 | 2.576174E-02 | 1.224574E-02 |
| $a_8$ | -4.294276E-03 | -7.163288E-03 | -1.195668E-02 | -1.321631E-02 |
| $a_{10}$ | 8.732406E-04 | 3.500671E-04 | 1.322866E-03 | 4.017455E-03 |
| $a_{12}$ | 7.048252E-05 | -8.558627E-05 | 1.809020E-04 | -2.290240E-05 |
| $a_{14}$ | 2.382087E-07 | 1.589665E-05 | -3.179841E-05 | -2.261024E-04 |
| $a_{16}$ | -2.679159E-05 | -4.021756E-06 | -4.507466E-06 | 3.161382E-05 |
| Surface # | 431 | 432 | 441 | 442 |
| K | -2.407004E-00 | -4.359861E-01 | -5.722551E+01 | -8.135524E-01 |
| $a_2$ | 3.996168E-02 | -4.985933E-02 | -1.281946E-01 | 2.244074E-01 |
| $a_4$ | -3.272069E-02 | -3.991389E-02 | -8.012916E-02 | -5.350266E-02 |
| $a_6$ | -3.158874E-02 | -9.194052E-03 | 2.974921E-02 | 2.008207E-02 |
| $a_8$ | 2.680657E-02 | 1.257459E-02 | -2.875175E-03 | -4.929668E-03 |
| $a_{10}$ | -1.415059E-02 | -5.289563E-03 | -1.095015E-03 | 5.610765E-04 |
| $a_{12}$ | 2.650397E-03 | 8.844219E-04 | 2.302563E-04 | 2.888358E-06 |
| $a_{14}$ | 6.526486E-04 | 1.233250E-04 | 4.817123E-05 | -8.655239E-06 |
| $a_{16}$ | -2.081292E-04 | -2.902639E-05 | -1.004081E-05 | 8.352601E-07 |

FIG. 21

| \multicolumn{8}{|c|}{EFL(Effective focus length)= 7.125mm, HFOV(Half angular field of view)= 18.599deg., System length=7.038 mm, Image height= 2.4mm, Fno=2.412} |
|---|---|---|---|---|---|---|---|
| Surface # | | Radius | Thickness | Refractive index | Abbe number | Focus | Material |
| - | Object | ∞ | ∞ | | | | |
| 500 | Aperture stop | ∞ | -0.334 | | | | |
| 511 | 1st lens element | 2.449 | 0.911 | 1.545 | 55.987 | 3.731 | plastic |
| 512 | | -9.050 | 0.128 | | | | |
| 521 | 2nd lens element | -3.708 | 0.426 | 1.642 | 22.409 | -9.409 | plastic |
| 522 | | -74.255 | 2.735 | | | | |
| 531 | 3rd lens element | -3.453 | 0.666 | 1.545 | 55.987 | 25.256 | plastic |
| 532 | | -5.549 | 0.864 | | | | |
| 541 | 4th lens element | -5.006 | 0.308 | 1.545 | 55.987 | -4.918 | plastic |
| 542 | | -1.934 | 0.400 | | | | |
| 561 | IR cut filter | ∞ | 0.210 | 1.517 | 64.167 | | plastic |
| 562 | | ∞ | 0.390 | | | | |
| 570 | Image plane | ∞ | 0.000 | | | | |

FIG. 24

| Aspherical parameters | | | | |
|---|---|---|---|---|
| Surface # | 511 | 512 | 521 | 522 |
| K | -1.142785E-01 | 5.039579E-00 | -5.204226E+00 | -2.139021E+02 |
| $a_2$ | -2.387136E-02 | -1.827465E-02 | -3.342791E-02 | -7.484800E-02 |
| $a_4$ | -1.112479E-02 | -2.796255E-02 | -4.361652E-03 | 1.964587E-02 |
| $a_6$ | 5.191163E-03 | 2.399163E-02 | 2.578573E-02 | 1.219910E-02 |
| $a_8$ | -4.285266E-03 | -7.147858E-03 | -1.194623E-02 | -1.321932E-02 |
| $a_{10}$ | 8.744020E-04 | 3.592430E-04 | 1.329039E-03 | 4.021592E-03 |
| $a_{12}$ | 6.801245E-05 | -8.162976E-05 | 1.849973E-04 | -2.060029E-05 |
| $a_{14}$ | -2.385288E-06 | 1.692467E-05 | -2.888907E-05 | -2.258308E-04 |
| $a_{16}$ | -2.866124E-05 | -4.162803E-06 | -2.511448E-06 | 3.103668E-05 |
| Surface # | 531 | 532 | 541 | 542 |
| K | -2.313798E+00 | -4.455747E-01 | -6.057391E+01 | -8.187718E-01 |
| $a_2$ | 3.758956E-02 | -4.642992E-02 | -1.271488E-01 | 2.194725E-01 |
| $a_4$ | -3.303641E-02 | -3.940045E-02 | -7.997256E-02 | -5.358981E-02 |
| $a_6$ | -3.188884E-02 | -9.018278E-03 | 2.976881E-02 | 2.019392E-02 |
| $a_8$ | 2.673846E-02 | 1.260901E-02 | -2.866362E-03 | -4.922048E-03 |
| $a_{10}$ | -1.415788E-02 | -5.288629E-03 | -1.087212E-03 | 5.606739E-04 |
| $a_{12}$ | 2.654841E-03 | 8.832153E-04 | 2.305060E-04 | 2.644832E-06 |
| $a_{14}$ | 6.554613E-04 | 1.230569E-04 | 4.799129E-05 | -8.692478E-06 |
| $a_{16}$ | -2.066101E-04 | -2.884609E-05 | -1.013159E-05 | 8.383923E-07 |

FIG. 25

| EFL(Effective focus length)= 7.088mm, HFOV(Half angular field of view)= 18.699deg., System length=7.087mm, Image height= 2.4mm, Fno=2.400 ||||||||
|---|---|---|---|---|---|---|---|
| Surface # | | Radius | Thickness | Refractive index | Abbe number | Focus | Material |
| - | Object | ∞ | ∞ | | | | |
| 600 | Aperture stop | ∞ | -0.355 | | | | |
| 611 | 1st lens element | 2.452 | 0.908 | 1.545 | 55.987 | 3.702 | plastic |
| 612 | | -8.734 | 0.155 | | | | |
| 621 | 2nd lens lement | -3.134 | 0.429 | 1.642 | 22.409 | -9.150 | plastic |
| 622 | | -19.258 | 2.723 | | | | |
| 631 | 3rd lens element | -3.304 | 0.659 | 1.545 | 55.987 | 23.008 | plastic |
| 632 | | -5.377 | 0.905 | | | | |
| 641 | 4th lens element | -4.892 | 0.307 | 1.545 | 55.987 | -5.053 | plastic |
| 642 | | -2.024 | 0.400 | | | | |
| 661 | IR cut filter | ∞ | 0.210 | 1.517 | 64.167 | | plastic |
| 662 | | ∞ | 0.390 | | | | |
| 670 | Image plane | ∞ | 0.000 | | | | |

FIG. 28

| Aspherical parameters | | | | |
|---|---|---|---|---|
| Surface # | 611 | 612 | 621 | 622 |
| K | -5.150303E-02 | -1.693738E+01 | -8.002011E+00 | -6.588623E+02 |
| $a_2$ | -2.248186E-02 | -1.721725E-02 | -3.835318E-02 | -8.038926E-02 |
| $a_4$ | -1.099071E-02 | -2.487510E-02 | -6.580932E-04 | 2.322156E-02 |
| $a_6$ | 5.502230E-03 | 2.230472E-02 | 2.496026E-02 | 1.327338E-02 |
| $a_8$ | -4.391050E-03 | -7.134906E-03 | -1.252347E-02 | -1.379669E-02 |
| $a_{10}$ | 8.510307E-04 | 2.951499E-04 | 1.462118E-03 | 3.972058E-03 |
| $a_{12}$ | 8.045432E-05 | -6.675663E-05 | 2.827143E-04 | 8.608797E-05 |
| $a_{14}$ | 6.500248E-06 | 3.716027E-05 | -5.189276E-05 | -2.286080E-04 |
| $a_{16}$ | -3.356934E-05 | -1.066027E-05 | -3.720128E-06 | 2.518903E-05 |
| Surface # | 631 | 632 | 641 | 642 |
| K | -1.851140E+00 | -3.447691E+01 | -4.186424E+01 | -8.735306E-01 |
| $a_2$ | 4.656749E-02 | -4.482241E-02 | -1.138414E-01 | 2.137475E-01 |
| $a_4$ | -2.865223E-02 | -3.685933E-02 | -8.639149E-02 | -6.122343E-02 |
| $a_6$ | -2.929094E-02 | -8.810827E-03 | 3.091976E-02 | 2.223091E-02 |
| $a_8$ | 2.549901E-02 | 1.229777E-02 | -2.660142E-03 | -5.210568E-03 |
| $a_{10}$ | -1.383944E-02 | -5.221838E-03 | -1.124184E-03 | 5.791721E-04 |
| $a_{12}$ | 2.914473E-03 | 8.792752E-04 | 2.215129E-04 | 4.378017E-06 |
| $a_{14}$ | 4.415811E-04 | 1.205713E-04 | 4.280262E-05 | -1.003980E-05 |
| $a_{16}$ | -1.750851E-04 | -3.064383E-05 | -8.789775E-06 | 1.012276E-06 |

FIG. 29

| EFL(Effective focus length)= 8.000mm, HFOV(Half angular field of view)= 16.677deg., System length=8.000mm, Image height= 2.4mm, Fno=2.395 ||||||||
|---|---|---|---|---|---|---|---|
| Surface # | | Radius | Thickness | Refractive index | Abbe number | Focus | Material |
| - | Object | ∞ | ∞ | | | | |
| 700 | Aperture stop | ∞ | -0.850 | | | | |
| 711 | 1st lens element | 1.953 | 1.362 | 1.545 | 55.987 | 4.015 | plastic |
| 712 | | -28.110 | 0.051 | | | | |
| 721 | 2nd lens lement | 11.235 | 0.416 | 1.642 | 22.409 | -5.713 | plastic |
| 722 | | 2.301 | 1.909 | | | | |
| 731 | 3rd lens element | -15.395 | 0.815 | 1.535 | 55.690 | 1307.677 | plastic |
| 732 | | 5.794 | 0.348 | | | | |
| 741 | 4th lens element | 3.515 | 0.399 | 1.642 | 22.409 | 282.957 | plastic |
| 742 | | 8.451 | 0.400 | | | | |
| 761 | IR cut filter | ∞ | 0.210 | 1.517 | 64.167 | | plastic |
| 762 | | ∞ | 2.091 | | | | |
| 770 | Image plane | ∞ | 0.000 | | | | |

FIG. 32

| Aspherical parameters | | | | |
|---|---|---|---|---|
| Surface # | 711 | 712 | 721 | 722 |
| K | -2.575158E-01 | -1.125127E+03 | 3.005861E+01 | 1.988062E+00 |
| $a_2$ | -9.709218E-03 | 4.185151E-02 | -3.088912E-02 | -6.782698E-02 |
| $a_4$ | -1.307072E-03 | 1.104594E-02 | 4.554202E-02 | 3.038360E-02 |
| $a_6$ | 3.963777E-03 | -1.528841E-02 | -3.581359E-02 | -1.836290E-03 |
| $a_8$ | -1.733681E-03 | 1.042348E-02 | 2.149957E-02 | -1.240655E-02 |
| $a_{10}$ | 3.510166E-04 | -1.425191E-03 | -4.883884E-03 | 1.422346E-02 |
| $a_{12}$ | 2.111554E-05 | -3.622260E-04 | -1.391312E-04 | -5.356181E-03 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |
| Surface # | 731 | 732 | 741 | 742 |
| K | -6.023531E+02 | -3.778865E+00 | -1.719174E+00 | 1.138792E+01 |
| $a_2$ | -1.857706E-01 | -2.810784E-01 | 6.083220E-02 | 1.548091E-01 |
| $a_4$ | 8.149773E-03 | 1.674421E-02 | -5.350103E-02 | -7.415326E-02 |
| $a_6$ | -2.119749E-03 | 5.074245E-03 | 2.377506E-02 | 2.705078E-02 |
| $a_8$ | 3.689190E-03 | -4.105980E-03 | -6.691323E-03 | -6.940053E-03 |
| $a_{10}$ | -4.037731E-03 | 4.990323E-04 | 9.591181E-04 | 8.938301E-04 |
| $a_{12}$ | 9.833834E-04 | -5.186303E-06 | -6.623412E-05 | -5.487192E-05 |
| $a_{14}$ | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 |

FIG. 33

| EFL(Effective focus length)= 7.095mm, HFOV(Half angular field of view)= 18.686deg., System length=7.094 mm, Image height= 2.4mm, Fno=2.402 ||||||||
|---|---|---|---|---|---|---|---|
| Surface # | | Radius | Thickness | Refractive index | Abbe number | Focus | Material |
| - | Object | ∞ | ∞ | | | | |
| 800 | Aperture stop | ∞ | -0.358 | | | | |
| 811 | 1st lens element | 2.457 | 0.994 | 1.545 | 55.987 | 3.686 | plastic |
| 812 | | -8.549 | 0.150 | | | | |
| 821 | 2nd lens element | -3.051 | 0.430 | 1.642 | 22.409 | -9.190 | plastic |
| 822 | | -16.903 | 2.679 | | | | |
| 831 | 3rd lens element | -2.920 | 0.662 | 1.545 | 55.987 | 22.953 | plastic |
| 832 | | -4.575 | 0.882 | | | | |
| 841 | 4th lens element | -5.162 | 0.298 | 1.545 | 55.987 | -5.030 | plastic |
| 842 | | -1.970 | 0.400 | | | | |
| 861 | IR cut filter | Infinity | 0.210 | 1.517 | 64.167 | | plastic |
| 862 | | Infinity | 0.390 | | | | |
| 870 | Image plane | Infinity | 0.000 | | | | |

FIG. 36

| Aspherical parameters | | | | |
|---|---|---|---|---|
| Surface # | 811 | 812 | 821 | 822 |
| K | -6.410683E-02 | -1.586092E+01 | -8.077996E+00 | -5.150596E+02 |
| $a_2$ | -2.206625E-02 | -1.814872E-02 | -3.827928E-02 | -8.096760E-02 |
| $a_4$ | -1.103508E-02 | -2.525437E-02 | -6.657655E-04 | 2.385831E-02 |
| $a_6$ | 5.446725E-03 | 2.194366E-02 | 2.495129E-02 | 1.353109E-02 |
| $a_8$ | -4.441430E-03 | -7.269514E-03 | -1.256685E-02 | -1.384842E-02 |
| $a_{10}$ | 8.209959E-04 | 2.840083E-04 | 1.516353E-03 | 3.981335E-03 |
| $a_{12}$ | 6.880101E-05 | -5.838943E-05 | 2.753638E-04 | 9.576543E-05 |
| $a_{14}$ | 7.721362E-06 | 3.181941E-05 | -5.777718E-05 | -2.388321E-04 |
| $a_{16}$ | -3.008225E-05 | -8.445220E-06 | -5.528233E-06 | 2.656815E-05 |
| Surface # | 831 | 832 | 841 | 842 |
| K | -1.419861E+00 | -2.297438E+01 | -4.883116E+01 | -8.400197E-01 |
| $a_2$ | 3.976013E-02 | -5.216073E-02 | -1.230688E-01 | 2.175853E-01 |
| $a_4$ | -3.030545E-02 | -3.963891E-02 | -8.729556E-02 | -6.231455E-02 |
| $a_6$ | -3.009881E-02 | -8.903786E-03 | 3.099395E-02 | 2.227607E-02 |
| $a_8$ | 2.546564E-02 | 1.252103E-02 | -2.616809E-03 | -5.190651E-03 |
| $a_{10}$ | -1.357620E-02 | -5.148235E-03 | -1.113726E-03 | 5.851396E-04 |
| $a_{12}$ | 3.010630E-03 | 8.955818E-04 | 2.264835E-04 | 3.912839E-06 |
| $a_{14}$ | 4.657390E-04 | 1.212312E-04 | 4.289008E-05 | -1.015733E-05 |
| $a_{16}$ | -1.935603E-04 | -3.124369E-05 | -9.104257E-06 | 1.040821E-06 |

FIG. 37

| EFL(Effective focus length)= 8.689mm, HFOV(Half angular field of view)= 15.451deg., System length=8.681 mm, Image height= 2.4mm, Fno=2.660 |||||||||
|---|---|---|---|---|---|---|---|
| Surface # | | Radius | Thickness | Refractive index | Abbe number | Focus | Material |
| - | Object | ∞ | ∞ | | | | |
| 911 | Aperture stop | 2.562 | 1.481 | 1.545 | 55.987 | 4.405 | |
| 912 | 1st lens element | -31.612 | 0.051 | | | | plastic |
| 900 | | 0.000 | 0.100 | | | | |
| 921 | 2nd lens lement | -3.220 | 0.428 | 1.642 | 22.409 | -7.706 | plastic |
| 922 | | -9.556 | 2.616 | | | | |
| 931 | 3rd lens element | 13.456 | 0.908 | 1.535 | 55.690 | -10.810 | plastic |
| 932 | | 3.958 | 0.514 | | | | |
| 941 | 4th lens element | 2.298 | 0.433 | 1.642 | 22.409 | 21.528 | plastic |
| 942 | | 2.548 | 0.400 | | | | |
| 961 | IR cut filter | ∞ | 0.210 | 1.517 | 64.167 | | plastic |
| 962 | | ∞ | 1.539 | | | | |
| 970 | Image plane | ∞ | 0.000 | | | | |

FIG. 40

| Aspherical parameters | | | | |
|---|---|---|---|---|
| Surface # | 911 | 912 | 921 | 922 |
| K | 2.919990E-02 | 3.961164E+02 | -3.146162E+00 | 3.903971E+01 |
| $a_2$ | 0.000000E+00 | 0.000000E+00 | 0.000000E+00 | 0.000000E+00 |
| $a_4$ | -9.354654E-04 | 4.085488E-02 | 1.201636E-01 | 1.020008E-01 |
| $a_6$ | -8.338750E-04 | -3.124995E-02 | -7.448808E-02 | -3.330657E-02 |
| $a_8$ | -6.612928E-04 | 1.072451E-02 | 4.125894E-02 | 2.322557E-02 |
| $a_{10}$ | 1.472658E-04 | -1.516143E-03 | -1.311887E-02 | -7.416777E-03 |
| $a_{12}$ | -2.266651E-05 | -1.081268E-04 | 9.092830E-04 | 7.111438E-04 |
| $a_{14}$ | -1.157171E-05 | -2.647069E-05 | 6.977982E-04 | 4.090717E-04 |
| $a_{16}$ | 1.677107E-06 | 2.844265E-05 | -1.512107E-04 | -6.389497E-05 |
| Surface # | 931 | 932 | 941 | 942 |
| K | 5.297452E+01 | 2.411785E+00 | -4.468217E-01 | -3.151181E+00 |
| $a_2$ | 0.000000E+00 | 0.000000E+00 | 0.000000E+00 | 0.000000E+00 |
| $a_4$ | -4.139675E-03 | -2.435301E-02 | -6.433727E-02 | -4.400762E-02 |
| $a_6$ | -5.341828E-03 | 8.632368E-03 | 1.407240E-02 | 1.042657E-02 |
| $a_8$ | 1.386138E-03 | -4.806276E-03 | -1.982598E-03 | -1.238949E-03 |
| $a_{10}$ | -6.418222E-04 | 6.166020E-04 | -1.300907E-05 | -5.394025E-05 |
| $a_{12}$ | -1.174759E-04 | 7.394387E-05 | -1.430931E-05 | 1.401030E-06 |
| $a_{14}$ | 1.470487E-04 | -2.211153E-05 | 1.084522E-05 | 5.208466E-06 |
| $a_{16}$ | -2.744295E-05 | 3.142700E-07 | -9.404053E-07 | -4.350737E-07 |

FIG. 41

| Embodiment | 1st | 2nd | 3rd | 4th | 5th | 6th | 7th | 8th | 9th (stop=1) |
|---|---|---|---|---|---|---|---|---|---|
| ALT | 2.804 | 3.119 | 2.438 | 2.382 | 2.312 | 2.304 | 2.991 | 2.384 | 3.251 |
| Gaa | 3.156 | 2.793 | 3.449 | 3.710 | 3.726 | 3.783 | 2.307 | 3.710 | 3.281 |
| BFL | 1.000 | 2.087 | 1.000 | 1.001 | 1.000 | 1.000 | 2.701 | 1.000 | 2.149 |
| TTL | 6.960 | 7.999 | 6.887 | 7.094 | 7.038 | 7.087 | 8.000 | 7.094 | 8.681 |
| TL | 5.960 | 5.913 | 5.887 | 6.092 | 6.038 | 6.087 | 5.299 | 6.094 | 6.532 |
| EFL/TTL | 1.017 | 1.000 | 1.028 | 1.000 | 1.012 | 1.000 | 1.000 | 1.000 | 1.001 |
| TL/G23 | 2.566 | 2.498 | 2.290 | 2.237 | 2.208 | 2.235 | 2.776 | 2.275 | 2.497 |
| ALT/T1 | 2.090 | 2.118 | 2.361 | 2.445 | 2.538 | 2.538 | 2.197 | 2.397 | 2.195 |
| (T1+G12+T2+G23)/T3 | 4.906 | 4.501 | 4.967 | 6.442 | 6.301 | 6.392 | 4.588 | 6.428 | 5.147 |
| $F_{NO}$/(G12+G23) | 0.908 | 0.989 | 0.810 | 0.843 | 0.843 | 0.834 | 1.222 | 0.849 | 0.961 |
| ALT/T4 | 7.501 | 7.500 | 7.501 | 7.500 | 7.500 | 7.501 | 7.500 | 7.999 | 7.501 |
| (T1+G12+T2)/G23 | 0.813 | 0.772 | 0.644 | 0.562 | 0.536 | 0.548 | 0.958 | 0.588 | 0.787 |
| EFL/(T2+T3) | 6.501 | 6.500 | 6.553 | 6.508 | 6.521 | 6.509 | 6.501 | 6.500 | 6.501 |
| (G12+G23)/(T1+T2) | 1.679 | 1.367 | 2.347 | 2.029 | 2.141 | 2.152 | 1.102 | 1.986 | 1.450 |
| EFL/$F_{NO}$ | 2.951 | 3.340 | 2.949 | 2.952 | 2.955 | 2.953 | 3.341 | 2.954 | 3.267 |
| EFL/T2 | 30.766 | 26.744 | 30.822 | 16.506 | 16.716 | 16.503 | 19.230 | 16.503 | 20.295 |
| $F_{NO}$/T4 | 6.413 | 5.759 | 7.385 | 7.567 | 7.825 | 7.813 | 6.004 | 8.059 | 6.138 |
| (G12+G23)/T1 | 1.967 | 1.644 | 2.869 | 2.924 | 3.143 | 3.170 | 1.439 | 2.844 | 1.869 |
| EFL/(T1+T2) | 4.501 | 4.516 | 5.608 | 5.052 | 5.329 | 5.300 | 4.500 | 4.981 | 4.552 |
| (T1+T2+T3)/T4 | 6.501 | 6.500 | 6.501 | 6.500 | 6.500 | 6.501 | 6.500 | 6.999 | 6.501 |
| TTL/T2 | 30.267 | 26.740 | 29.987 | 16.504 | 16.511 | 16.501 | 19.228 | 16.501 | 20.278 |
| G23/T2 | 10.099 | 7.911 | 11.192 | 6.338 | 6.415 | 6.340 | 4.588 | 6.230 | 6.111 |
| $F_{NO}$/T1 | 1.787 | 1.627 | 2.325 | 2.466 | 2.648 | 2.644 | 1.758 | 2.415 | 1.796 |
| ALT/(G12+G23) | 1.062 | 1.288 | 0.823 | 0.836 | 0.808 | 0.800 | 1.526 | 0.843 | 1.175 |
| EFL/G23 | 3.047 | 3.381 | 2.754 | 2.604 | 2.606 | 2.603 | 4.191 | 2.649 | 3.321 |
| (T2+T3)/T1 | 0.811 | 0.836 | 1.046 | 1.119 | 1.200 | 1.199 | 0.904 | 1.098 | 0.903 |
| TTL | 6.960 | 7.999 | 6.887 | 7.094 | 7.038 | 7.087 | 8.000 | 7.094 | 8.681 |

FIG. 42

| EFL(Effective focus length)= 9.000mm, HFOV(Half angular field of view)= 18.052deg., System length=7.952 mm, Image height= 2.944mm, Fno=2.391 ||||||||
|---|---|---|---|---|---|---|---|
| Surface # | | Radius | Thickness | Refractive index | Abbe number | Focus | Material |
| -- | Object | ∞ | ∞ | | | | |
| 1000 | Aperture stop | ∞ | -0.894 | | | | |
| 1011 | 1st lens element | 2.373 | 1.475 | 1.545 | 55.987 | 3.641 | plastic |
| 1012 | | -9.595 | 0.077 | | | | |
| 1021 | 2nd lens lement | -10.049 | 0.237 | 1.642 | 22.409 | -6.332 | plastic |
| 1022 | | 6.987 | 1.469 | | | | |
| 1031 | 3rd lens element | -7.321 | 0.297 | 1.545 | 55.987 | -14.796 | plastic |
| 1032 | | -78.877 | 2.032 | | | | |
| 1051 | 5th lens element | -10.200 | 0.601 | 1.661 | 20.401 | 7.410 | plastic |
| 1052 | | -3.405 | 0.051 | | | | |
| 1041 | 4th lens element | -3.038 | 0.339 | 1.535 | 55.690 | -4.846 | plastic |
| 1042 | | 18.747 | 0.400 | | | | |
| 1061 | IR cut filter | ∞ | 0.210 | 1.517 | 64.167 | | plastic |
| 1062 | | ∞ | 0.763 | | | | |
| 1070 | Image plane | ∞ | 0.000 | | | | |

FIG. 45

| Aspherical parameters | | | | | |
|---|---|---|---|---|---|
| Surface # | 1011 | 1012 | 1021 | 1022 | 1031 |
| K | 0.000000E+00 | 0.000000E+00 | 0.000000E+00 | 0.000000E+00 | 2.205831E+01 |
| $a_2$ | 0.000000E+00 | 0.000000E+00 | 0.000000E+00 | 0.000000E+00 | 0.000000E+00 |
| $a_4$ | -1.774895E-03 | 9.984479E-03 | 8.036322E-03 | 9.650539E-04 | 3.434802E-03 |
| $a_6$ | 6.242016E-04 | -6.486961E-04 | 8.698265E-04 | 3.994345E-03 | -9.482431E-04 |
| $a_8$ | -2.578861E-04 | 1.438987E-04 | -4.917418E-04 | -1.665109E-03 | -8.827629E-04 |
| $a_{10}$ | 3.871376E-05 | -4.762513E-05 | 2.484532E-05 | 2.822780E-04 | -6.786214E-04 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1032 | 1051 | 1052 | 1041 | 1042 |
| K | -8.235812E+00 | -2.356053E+01 | -5.865778E+01 | -6.285545E+01 | 4.118102E+01 |
| $a_2$ | 0.000000E+00 | 0.000000E+00 | 0.000000E+00 | 0.000000E+00 | 0.000000E+00 |
| $a_4$ | 1.604210E-02 | -2.274086E-02 | -3.725610E-02 | -2.487322E-02 | -1.873105E-02 |
| $a_6$ | 5.818358E-03 | 3.289035E-04 | 2.687318E-03 | 2.125442E-03 | 2.883443E-03 |
| $a_8$ | -3.062027E-03 | 3.633418E-04 | -7.759110E-05 | 8.672625E-05 | -5.924442E-04 |
| $a_{10}$ | 3.634623E-04 | -1.325065E-05 | 3.081046E-05 | -2.131933E-05 | 5.328774E-05 |
| $a_{12}$ | 0.000000E+00 | 0.000000E+00 | 0.000000E+00 | 1.980552E-06 | -2.102299E-06 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 46

| \multicolumn{7}{c}{EFL(Effective focus length)= 9.000mm, HFOV(Half angular field of view)= 18.067deg., System length=7.952 mm, Image height= 2.944mm, Fno=2.395} |||||||
|---|---|---|---|---|---|---|---|
| Surface # |  | Radius | Thickness | Refractive index | Abbe number | Focus | Material |
| - | Object | ∞ | ∞ |  |  |  |  |
| 1110 | Aperture stop | ∞ | -0.920 |  |  |  |  |
| 1111' | 1st lens element | 2.326 | 1.476 | 1.545 | 55.987 | 3.724 | plastic |
| 1112' |  | -12.598 | 0.056 |  |  |  |  |
| 1121' | 2nd lens lement | -16.570 | 0.235 | 1.642 | 22.409 | -6.659 | plastic |
| 1122' |  | 5.859 | 1.486 |  |  |  |  |
| 1131 | 3rd lens element | -5.908 | 0.296 | 1.545 | 55.987 | -15.036 | plastic |
| 1132 |  | -21.413 | 1.950 |  |  |  |  |
| 1151 | 5th lens element | -8.699 | 0.547 | 1.661 | 20.401 | 454.542 | plastic |
| 1152 |  | -8.669 | 0.050 |  |  |  |  |
| 1141 | 4th lens element | -15.309 | 0.393 | 1.535 | 55.690 | -15.033 | plastic |
| 1142 |  | 17.203 | 0.400 |  |  |  |  |
| 1161 | IR cut filter | ∞ | 0.210 | 1.517 | 64.167 |  | plastic |
| 1162 |  | ∞ | 0.853 |  |  |  |  |
| 1170 | Image plane | ∞ | 0.000 |  |  |  |  |

FIG. 49

| Aspherical parameters | | | | | |
|---|---|---|---|---|---|
| Surface # | 1111 | 1112 | 1121 | 1122 | 1131 |
| K | 0.000000E+00 | 0.000000E+00 | 0.000000E+00 | 0.000000E+00 | 1.447427E+01 |
| $a_2$ | 0.000000E+00 | 0.000000E+00 | 0.000000E+00 | 0.000000E+00 | 0.000000E+00 |
| $a_4$ | -2.047605E-03 | 6.205849E-03 | 2.757162E-03 | 1.005218E-05 | 4.882047E-04 |
| $a_6$ | 5.791552E-04 | 2.052417E-04 | 9.796026E-04 | 2.160500E-03 | -4.895777E-03 |
| $a_8$ | -2.094714E-04 | -8.744550E-05 | -2.369134E-04 | -5.381750E-04 | 3.311740E-03 |
| $a_{10}$ | 2.446421E-05 | -1.360834E-05 | -8.976788E-06 | 8.602483E-05 | -1.667158E-03 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1132 | 1151 | 1152 | 1141 | 1142 |
| K | -1.201334E+02 | 2.676481E-02 | -4.400254E+00 | -2.309460E+01 | 3.667784E+01 |
| $a_2$ | 0.000000E+00 | 0.000000E+00 | 0.000000E+00 | 0.000000E+00 | 0.000000E+00 |
| $a_4$ | 6.163284E-03 | -2.758793E-02 | -4.316939E-02 | -3.255504E-02 | -1.870899E-02 |
| $a_6$ | 6.114553E-03 | 9.842196E-04 | 3.079377E-03 | 1.419036E-03 | 7.975190E-04 |
| $a_8$ | -1.461725E-03 | 5.417265E-04 | 1.419191E-04 | 2.707932E-04 | -2.928018E-04 |
| $a_{10}$ | -1.684884E-06 | -3.527367E-05 | 1.531073E-05 | -2.175166E-06 | 4.055007E-05 |
| $a_{12}$ | 0.000000E+00 | 0.000000E+00 | 0.000000E+00 | -2.292754E-07 | -2.052670E-06 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 50

| \multicolumn{7}{c}{EFL(Effective focus length)= 9.000mm, HFOV(Half angular field of view)= 18.027deg., System length=7.954 mm, Image height= 2.944mm, Fno=2.390} | | | | | | |
|---|---|---|---|---|---|---|
| Surface # | | Radius | Thickness | Refractive index | Abbe number | Focus | Material |
| - | Object | ∞ | ∞ | | | | |
| 1210 | Aperture stop | ∞ | -0.900 | | | | |
| 1211' | 1st lens element | 2.317 | 1.337 | 1.545 | 55.987 | 3.966 | plastic |
| 1212' | | -26.562 | 0.050 | | | | |
| 1221' | 2nd lens lement | 3.109 | 0.234 | 1.642 | 22.409 | -5.979 | plastic |
| 1222' | | 1.673 | 3.460 | | | | |
| 1231 | 3rd lens element | -6.336 | 0.289 | 1.545 | 55.987 | -97.174 | plastic |
| 1232 | | -7.311 | 0.094 | | | | |
| 1251 | 5th lens element | -6.320 | 0.796 | 1.642 | 22.409 | 12.424 | plastic |
| 1252 | | -3.714 | 0.229 | | | | |
| 1241 | 4th lens element | -2.916 | 0.354 | 1.545 | 55.987 | -5.345 | plastic |
| 1242 | | -2275.977 | 0.400 | | | | |
| 1261 | IR cut filter | ∞ | 0.210 | 1.517 | 64.167 | | plastic |
| 1262 | | ∞ | 0.500 | | | | |
| 1270 | Image plane | ∞ | 0.000 | | | | |

FIG. 53

| | Aspherical parameters | | | | |
|---|---|---|---|---|---|
| Surface # | 1211 | 1212 | 1221 | 1222 | 1231 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.772689E-03 | 4.973353E-03 | -6.687362E-02 | -8.754526E-02 | -6.992910E-02 |
| $a_6$ | 9.523543E-04 | -4.616856E-04 | 2.149110E-02 | 2.647865E-02 | 9.611251E-04 |
| $a_8$ | -3.396154E-04 | 1.166362E-04 | -2.376795E-03 | -3.616988E-03 | 1.579155E-03 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1232 | 1251 | 1252 | 1241 | 1242 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -3.185736E-02 | 3.630590E-02 | 3.770781E-02 | 8.267592E-03 | -5.090268E-02 |
| $a_6$ | 3.050210E-03 | -8.531353E-03 | -9.107652E-03 | 4.249821E-03 | 1.443346E-02 |
| $a_8$ | 4.486811E-04 | 6.674873E-04 | 7.397106E-04 | -9.752565E-04 | -1.785687E-03 |
| $a_{10}$ | 0.000000E+00 | 0.000000E+00 | 0.000000E+00 | 8.359383E-05 | 7.643327E-05 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 54

| \multicolumn{7}{c}{EFL(Effective focus length)= 9.000mm, HFOV(Half angular field of view)= 17.966deg., System length=7.993 mm, Image height= 2.944mm, Fno=2.387} | | | | | | |
|---|---|---|---|---|---|---|---|
| Surface # | | Radius | Thickness | Refractive index | Abbe number | Focus | Material |
| - | Object | ∞ | ∞ | | | | |
| 1310 | Aperture stop | ∞ | -0.696 | | | | |
| 1311 | 1st lens element | 2.773 | 1.000 | 1.545 | 55.987 | 4.187 | plastic |
| 1312 | | -11.386 | 0.047 | | | | |
| 1321 | 2nd lens lement | -27.301 | 0.269 | 1.642 | 22.409 | -8.899 | plastic |
| 1322 | | 7.329 | 3.005 | | | | |
| 1331 | 3rd lens element | -23.680 | 0.325 | 1.545 | 55.987 | -30.785 | plastic |
| 1332 | | 58.308 | 1.255 | | | | |
| 1351 | 5th lens element | -12.097 | 0.569 | 1.661 | 20.401 | 64.770 | plastic |
| 1352 | | -9.627 | 0.075 | | | | |
| 1341 | 4th lens element | -4.103 | 0.333 | 1.535 | 55.690 | -6.185 | plastic |
| 1342 | | 17.853 | 0.400 | | | | |
| 1361 | IR cut filter | ∞ | 0.210 | 1.517 | 64.167 | | plastic |
| 1362 | | ∞ | 0.505 | | | | |
| 1370 | Image plane | ∞ | 0.000 | | | | |

FIG. 57

| Aspherical parameters | | | | | |
|---|---|---|---|---|---|
| Surface # | 1311 | 1312 | 1321 | 1322 | 1331 |
| K | 0.000000E+00 | 0.000000E+00 | 0.000000E+00 | 0.000000E+00 | 1.763927E+02 |
| $a_2$ | 0.000000E+00 | 0.000000E+00 | 0.000000E+00 | 0.000000E+00 | 0.000000E+00 |
| $a_4$ | -3.425675E-03 | 9.595300E-03 | 6.210417E-03 | -2.985689E-03 | -3.304799E-02 |
| $a_6$ | 1.310642E-03 | -1.581704E-05 | 1.049554E-03 | 3.460470E-03 | 8.182725E-04 |
| $a_8$ | -3.964596E-04 | -1.103301E-04 | -2.071261E-04 | -8.049085E-04 | 2.861709E-03 |
| $a_{10}$ | 4.755353E-05 | 1.097519E-05 | 9.885146E-06 | 1.116423E-04 | -8.475658E-04 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1332 | 1351 | 1352 | 1341 | 1342 |
| K | 8.445107E+02 | 2.268915E+01 | 1.414558E+01 | -2.400892E+01 | 3.978527E+01 |
| $a_2$ | 0.000000E+00 | 0.000000E+00 | 0.000000E+00 | 0.000000E+00 | 0.000000E+00 |
| $a_4$ | -3.435691E-02 | -7.350181E-02 | -5.589834E-02 | -3.933392E-02 | -3.978847E-02 |
| $a_6$ | 9.350483E-03 | 9.724355E-03 | 4.129273E-03 | 2.442542E-03 | 5.901588E-03 |
| $a_8$ | 8.400547E-04 | 5.386932E-04 | 2.554403E-04 | 3.810449E-04 | -5.673634E-04 |
| $a_{10}$ | -2.968838E-04 | -8.339471E-05 | 3.444483E-05 | -4.730326E-07 | 2.745172E-05 |
| $a_{12}$ | 0.000000E+00 | 0.000000E+00 | 0.000000E+00 | -2.575814E-06 | -1.414560E-06 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 58

| EFL(Effective focus length)= 9.000mm, HFOV(Half angular field of view)= 18.162deg., System length=7.965mm, Image height= 2.944mm, Fno=2.372 | | | | | | | |
|---|---|---|---|---|---|---|---|
| Surface # | | Radius | Thickness | Refractive index | Abbe number | Focus | Material |
| - | Object | ∞ | ∞ | | | | |
| 1410 | Aperture stop | ∞ | -0.898 | | | | |
| 1411 | 1st lens element | 2.346 | 1.399 | 1.545 | 55.987 | 3.660 | plastic |
| 1412 | | -10.671 | 0.085 | | | | |
| 1421 | 2nd lens lement | -14.883 | 0.482 | 1.642 | 22.409 | -6.153 | plastic |
| 1422 | | 5.508 | 2.093 | | | | |
| 1431 | 3rd lens element | -4.184 | 0.902 | 1.535 | 55.690 | -43.095 | plastic |
| 1432 | | -5.492 | 0.714 | | | | |
| 1451 | 5th lens element | -2.869 | 0.580 | 1.545 | 55.987 | -7.685 | plastic |
| 1452 | | -9.707 | 0.079 | | | | |
| 1441 | 4th lens element | 30.989 | 0.518 | 1.642 | 22.409 | -86.877 | plastic |
| 1442 | | 19.849 | 0.400 | | | | |
| 1461 | IR cut filter | ∞ | 0.210 | 1.517 | 64.167 | | plastic |
| 1462 | | ∞ | 0.503 | | | | |
| 1470 | Image plane | ∞ | 0.000 | | | | |

FIG. 61

| Aspherical parameters | | | | | |
|---|---|---|---|---|---|
| Surface # | 1411 | 1412 | 1421 | 1422 | 1431 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -2.279937E-03 | 1.280392E-02 | 1.150864E-02 | 6.912463E-03 | -1.366439E-02 |
| $a_6$ | 4.812452E-04 | -1.524524E-03 | 1.083498E-03 | 3.949878E-03 | -8.625012E-03 |
| $a_8$ | -1.947552E-04 | 2.474898E-04 | -1.089542E-03 | 5.007768E-04 | 9.288680E-05 |
| $a_{10}$ | 3.597874E-05 | -8.279448E-05 | 1.650008E-04 | -1.232063E-04 | 1.558301E-03 |
| $a_{12}$ | -4.743476E-06 | 1.275639E-05 | 2.498656E-05 | -3.106169E-04 | -9.614612E-04 |
| $a_{14}$ | 0.000000E+00 | 0.000000E+00 | -5.578370E-06 | 1.525850E-04 | 0.000000E+00 |
| $a_{16}$ | 0.000000E+00 | 0.000000E+00 | 0.000000E+00 | 0.000000E+00 | 0.000000E+00 |
| Surface # | 1432 | 1451 | 1452 | 1441 | 1442 |
| K | 0.000000E+00 | -1.400410E-01 | 0.000000E+00 | 5.674582E+01 | 0.000000E+00 |
| $a_2$ | 0.000000E+00 | 0.000000E+00 | 0.000000E+00 | 0.000000E+00 | 0.000000E+00 |
| $a_4$ | 3.635102E-03 | 1.591374E-02 | 8.983675E-04 | -4.081074E-02 | -5.108647E-02 |
| $a_6$ | 4.881990E-03 | 3.582251E-03 | -4.694989E-04 | 6.805808E-03 | 6.945780E-03 |
| $a_8$ | 1.566693E-03 | -1.206249E-04 | 8.950965E-05 | -2.560505E-04 | -2.990130E-04 |
| $a_{10}$ | -7.715044E-04 | -3.947207E-05 | -1.436707E-05 | -1.122320E-05 | -1.135624E-06 |
| $a_{12}$ | 7.386983E-05 | 1.388267E-06 | 1.836176E-06 | -1.656963E-06 | 5.953264E-08 |
| $a_{14}$ | 0.000000E+00 | 2.056452E-07 | -2.328342E-07 | -2.722367E-08 | -7.945292E-08 |
| $a_{16}$ | 0.000000E+00 | 0.000000E+00 | 0.000000E+00 | 7.847026E-09 | 9.646253E-09 |

FIG. 62

| EFL(Effective focus length)= 9.000mm, HFOV(Half angular field of view)= 17.934deg., System length=7.959 mm, Image height= 2.944mm, Fno=2.385 ||||||||
|---|---|---|---|---|---|---|---|
| Surface # | | Radius | Thickness | Refractive index | Abbe number | Focus | Material |
| - | Object | ∞ | ∞ | | | | |
| 1510 | Aperture stop | ∞ | -0.808 | | | | |
| 1511 | 1st lens element | 2.495 | 1.332 | 1.545 | 55.987 | 3.827 | plastic |
| 1512 | | -10.476 | 0.050 | | | | |
| 1521 | 2nd lens element | -16.962 | 0.482 | 1.642 | 22.409 | -6.701 | plastic |
| 1522 | | 5.893 | 1.596 | | | | |
| 1531 | 3rd lens element | -12.487 | 0.289 | 1.545 | 55.987 | -13.173 | plastic |
| 1532 | | 17.123 | 0.049 | | | | |
| 1551 | 5th lens element | 13.038 | 0.442 | 1.642 | 22.409 | 41.337 | plastic |
| 1552 | | 25.089 | 2.215 | | | | |
| 1541 | 4th lens element | -6.593 | 0.392 | 1.545 | 55.987 | -9.102 | plastic |
| 1542 | | 20.648 | 0.400 | | | | |
| 1561 | IR cut filter | ∞ | 0.210 | 1.517 | 64.167 | | plastic |
| 1562 | | ∞ | 0.502 | | | | |
| 1570 | Image plane | ∞ | 0.000 | | | | |

FIG. 65

| Aspherical parameters | | | | | |
|---|---|---|---|---|---|
| Surface # | 1511 | 1512 | 1521 | 1522 | 1531 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.547390E-03 | 4.871526E-04 | -5.889553E-03 | -7.028132E-03 | -1.520407E-02 |
| $a_6$ | -2.029292E-04 | 1.295074E-03 | 1.596394E-03 | -1.120839E-03 | -2.211845E-02 |
| $a_8$ | -6.616358E-06 | -2.227190E-04 | -2.479962E-04 | 8.800666E-05 | 2.572385E-03 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1532 | 1551 | 1552 | 1541 | 1542 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 5.853680E-02 | 2.869591E-02 | -1.584964E-02 | -5.405315E-02 | -6.778570E-02 |
| $a_6$ | -4.434049E-02 | -1.315238E-02 | 1.029169E-02 | 1.226252E-02 | 1.241153E-02 |
| $a_8$ | 9.227610E-03 | 1.948910E-03 | -1.699309E-03 | -8.728200E-04 | -1.108449E-03 |
| $a_{10}$ | 0.000000E+00 | 0.000000E+00 | 0.000000E+00 | 2.391697E-05 | 4.997521E-05 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 66

| \multicolumn{7}{c}{EFL(Effective focus length)= 9.000mm, HFOV(Half angular field of view)= 17.814deg., System length=7.961mm, Image height= 2.944mm, Fno=22.377} |
|---|---|---|---|---|---|---|---|
| Surface # | | Radius | Thickness | Refractive index | Abbe number | Focus | Material |
| - | Object | ∞ | ∞ | | | | |
| 1610 | Aperture stop | ∞ | -0.841 | | | | |
| 1611 | 1st lens element | 2.430 | 1.331 | 1.545 | 55.987 | 3.794 | plastic |
| 1612 | | -11.367 | 0.050 | | | | |
| 1621 | 2nd lens element | -52.959 | 0.482 | 1.642 | 22.409 | -7.124 | plastic |
| 1622 | | 5.069 | 1.583 | | | | |
| 1631 | 3rd lens element | -8.742 | 0.417 | 1.545 | 55.987 | -17.110 | plastic |
| 1632 | | -137.453 | 0.050 | | | | |
| 1651 | 5th lens element | -143.464 | 0.998 | 1.642 | 22.409 | -67.825 | plastic |
| 1652 | | 63.439 | 1.439 | | | | |
| 1641 | 4th lens element | -6.135 | 0.497 | 1.545 | 55.987 | -7.623 | plastic |
| 1642 | | 13.331 | 0.400 | | | | |
| 1661 | IR cut filter | ∞ | 0.210 | 1.517 | 64.167 | | plastic |
| 1662 | | ∞ | 0.503 | | | | |
| 1670 | Image plane | ∞ | 0.000 | | | | |

FIG. 69

| Aspherical parameters | | | | | |
|---|---|---|---|---|---|
| Surface # | 1611 | 1612 | 1621 | 1622 | 1631 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | -1.441936E-03 | -2.965016E-03 | -1.544757E-02 | -1.355211E-02 | -2.960248E-02 |
| $a_6$ | -1.832348E-04 | 2.254459E-03 | 4.297060E-03 | 1.037887E-03 | -1.510549E-02 |
| $a_8$ | -3.729616E-05 | -2.750274E-04 | -5.033273E-04 | -2.077543E-04 | 1.672986E-05 |
| $a_{10}$ | 0.000000E+00 | 0.000000E+00 | 0.000000E+00 | 0.000000E+00 | 0.000000E+00 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1632 | 1651 | 1652 | 1641 | 1642 |
| K | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 |
| $a_4$ | 5.397111E-02 | 4.592041E-02 | -8.717838E-03 | -8.952146E-02 | -1.037380E-01 |
| $a_6$ | -2.961211E-02 | -1.175819E-02 | 8.587940E-03 | 2.461112E-02 | 2.307798E-02 |
| $a_8$ | 5.772092E-03 | 1.241860E-03 | -1.092825E-03 | -2.164071E-03 | -2.499220E-03 |
| $a_{10}$ | 0.000000E+00 | 0.000000E+00 | 0.000000E+00 | 6.265510E-05 | 1.199635E-04 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 70

| \multicolumn{7}{c}{EFL(Effective focus length)= 9.000mm, HFOV(Half angular field of view)= 17.996deg., System length=7.927mm, Image height= 2.944mm, Fno=2.397} | | | | | | |
|---|---|---|---|---|---|---|
| Surface # | | Radius | Thickness | Refractive index | Abbe number | Focus | Material |
| - | Object | ∞ | ∞ | | | | |
| 1711 | Aperture stop | 2.603 | 1.597 | 1.545 | 55.987 | 3.797 | |
| 1712 | 1st lens element | -7.996 | 0.022 | | | | plastic |
| 1710 | | ∞ | 0.136 | | | | |
| 1721 | 2nd lens lement | -8.470 | 0.237 | 1.642 | 22.409 | -6.394 | plastic |
| 1722 | | 8.182 | 2.439 | | | | |
| 1731 | 3rd lens element | -13.867 | 0.294 | 1.545 | 55.987 | -12.028 | plastic |
| 1732 | | 12.581 | 1.040 | | | | |
| 1751 | 5th lens element | -12.470 | 0.666 | 1.661 | 20.401 | -157.840 | plastic |
| 1752 | | -14.450 | 0.050 | | | | |
| 1741 | 4th lens element | -15.272 | 0.330 | 1.535 | 55.690 | -15.676 | plastic |
| 1742 | | 18.868 | 0.400 | | | | |
| 1761 | IR cut filter | ∞ | 0.210 | 1.517 | 64.167 | | plastic |
| 1762 | | ∞ | 0.507 | | | | |
| 1770 | Image plane | ∞ | 0.000 | | | | |

FIG. 73

| Aspherical parameters | | | | | |
|---|---|---|---|---|---|
| Surface # | 1711 | 1712 | 1721 | 1722 | 1731 |
| K | 0.000000E+00 | 0.000000E+00 | 0.000000E+00 | 0.000000E+00 | 6.545936E+01 |
| $a_2$ | 0.000000E+00 | 0.000000E+00 | 0.000000E+00 | 0.000000E+00 | 0.000000E+00 |
| $a_4$ | -4.793592E-03 | 1.198804E-02 | 4.119983E-03 | -2.852137E-03 | -8.397900E-02 |
| $a_6$ | 2.755735E-03 | -1.318117E-03 | 1.273788E-03 | 2.144621E-03 | 1.623814E-02 |
| $a_8$ | -8.175525E-04 | 1.258892E-04 | -1.285616E-03 | -1.027606E-03 | 1.093813E-04 |
| $a_{10}$ | 1.111922E-04 | -7.047230E-06 | 2.751379E-04 | 3.694010E-04 | -4.413845E-04 |
| $a_{12}$ | 0.000000E+00 | 0.000000E+00 | 0.000000E+00 | 0.000000E+00 | 0.000000E+00 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |
| Surface # | 1732 | 1751 | 1752 | 1741 | 1742 |
| K | -1.807375E+04 | 6.094059E+00 | 3.188110E+01 | 3.146274E+01 | 4.446486E+01 |
| $a_2$ | 0.000000E+00 | 0.000000E+00 | 0.000000E+00 | 0.000000E+00 | 0.000000E+00 |
| $a_4$ | -6.566665E-02 | -4.098840E-02 | -5.160208E-02 | -4.705828E-02 | -2.497041E-02 |
| $a_6$ | 1.430166E-02 | 2.957213E-03 | 3.196210E-03 | 2.756071E-03 | 2.289370E-03 |
| $a_8$ | 2.640148E-03 | 7.382054E-04 | 1.756411E-04 | 4.300572E-04 | -3.563820E-04 |
| $a_{10}$ | -6.087572E-04 | -5.872396E-05 | 3.878252E-05 | 5.111985E-06 | 3.067361E-05 |
| $a_{12}$ | 0.000000E+00 | 0.000000E+00 | 0.000000E+00 | -2.160692E-06 | -1.597723E-06 |
| $a_{14}$ | 0.000000E+00 | 0.000000E+00 | 0.000000E+00 | 0.000000E+00 | 0.000000E+00 |
| $a_{16}$ | 0.000000E+00 | 0.000000E+00 | 0.000000E+00 | 0.000000E+00 | 0.000000E+00 |

FIG. 74

| Embodiment | 10st | 11th | 12th | 13th | 14th | 15th | 16th | 17th (stop=1) |
|---|---|---|---|---|---|---|---|---|
| ALT | 2.949 | 2.947 | 3.011 | 2.496 | 3.881 | 2.938 | 3.725 | 3.124 |
| Gaa | 3.978 | 3.891 | 4.004 | 4.707 | 3.292 | 2.095 | 2.083 | 4.037 |
| BFL | 1.373 | 1.463 | 1.110 | 1.115 | 1.113 | 1.112 | 1.113 | 1.117 |
| TTL | 7.952 | 7.952 | 7.954 | 7.993 | 7.965 | 7.959 | 7.961 | 7.928 |
| TL | 6.578 | 6.489 | 6.844 | 6.878 | 6.852 | 6.847 | 6.847 | 6.810 |
| EFL/TTL | 1.132 | 1.132 | 1.131 | 1.126 | 1.130 | 1.131 | 1.131 | 1.135 |
| TL/G23 | 4.477 | 4.367 | 1.978 | 2.289 | 3.274 | 4.291 | 4.325 | 2.793 |
| ALT/T1 | 1.999 | 1.997 | 2.252 | 2.495 | 2.774 | 2.205 | 2.799 | 1.956 |
| (T1+G12+T2+G23)/T3 | 10.977 | 10.983 | 17.561 | 13.311 | 4.501 | 11.956 | 8.263 | 15.087 |
| $F_{NO}$/(G12+G23) | 1.546 | 1.554 | 0.681 | 0.782 | 1.089 | 1.449 | 1.455 | 0.923 |
| ALT/T4 | 8.692 | 7.500 | 8.498 | 7.501 | 7.500 | 7.501 | 7.501 | 9.453 |
| (T1+G12+T2)/G23 | 1.217 | 1.189 | 0.469 | 0.438 | 0.940 | 1.169 | 1.177 | 0.817 |
| EFL/(T2+T3) | 16.864 | 16.938 | 17.196 | 15.164 | 6.500 | 11.665 | 10.008 | 16.972 |
| (G12+G23)/(T1+T2) | 0.903 | 0.901 | 2.234 | 2.405 | 1.158 | 0.907 | 0.901 | 1.416 |
| EFL/$F_{NO}$ | 3.764 | 3.757 | 3.766 | 3.770 | 3.795 | 3.773 | 3.786 | 3.755 |
| EFL/T2 | 37.998 | 38.266 | 38.460 | 33.483 | 18.654 | 18.668 | 18.664 | 38.034 |
| $F_{NO}$/T4 | 7.046 | 6.096 | 6.745 | 7.174 | 4.583 | 6.090 | 4.786 | 7.253 |
| (G12+G23)/T1 | 1.048 | 1.044 | 2.625 | 3.052 | 1.557 | 1.235 | 1.227 | 1.626 |
| EFL/(T1+T2) | 5.257 | 5.259 | 5.728 | 7.091 | 4.782 | 4.960 | 4.963 | 4.908 |
| (T1+T2+T3)/T4 | 5.920 | 5.108 | 5.251 | 4.790 | 5.379 | 5.372 | 4.491 | 6.438 |
| TTL/T2 | 33.572 | 33.810 | 33.992 | 29.737 | 16.510 | 16.510 | 16.509 | 33.502 |
| G23/T2 | 6.204 | 6.318 | 14.787 | 11.182 | 4.339 | 3.310 | 3.283 | 10.305 |
| $F_{NO}$/T1 | 1.621 | 1.623 | 1.787 | 2.386 | 1.695 | 1.790 | 1.786 | 1.501 |
| ALT/(G12+G23) | 1.907 | 1.912 | 0.858 | 0.818 | 1.782 | 1.785 | 2.281 | 1.203 |
| EFL/G23 | 6.125 | 6.057 | 2.601 | 2.994 | 4.299 | 5.640 | 5.684 | 3.691 |
| (T2+T3)/T1 | 0.362 | 0.360 | 0.391 | 0.593 | 0.989 | 0.579 | 0.676 | 0.332 |
| TTL | 7.952 | 7.952 | 7.954 | 7.993 | 7.965 | 7.959 | 7.961 | 7.928 |

OPTICAL IMAGING LENS

INCORPORATION BY REFERENCE

This application claims priority from China Patent Application No. 201610157042.5, filed on Mar. 18, 2016, the contents of which are hereby incorporated by reference in their entirety for all purposes.

TECHNICAL FIELD

The present disclosure relates to an optical imaging lens, and particularly, relates to an optical imaging lens having four or five lens elements.

BACKGROUND

The ever-increasing demand for smaller sized mobile devices, such as cell phones, digital cameras, etc. has triggered a corresponding and growing need for smaller sized photography modules comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics may present a challenging problem.

The optical lens with good optical performance and smaller size may not necessarily be achieved by scaling down the optical lens with good optical performance. Rather, the design process may involve characteristics of the material and assembly yield.

Designing a small sized optical lens may be more difficult than designing a traditional optical lens. Therefore, manufacturing an optical lens that conforms to consumer demands and upgrading its imaging quality are always desirable objectives for industries, governments, and academia.

SUMMARY

The present disclosure may advantageously provide for an optical imaging lens. By controlling the convex or concave shape of the surfaces of each lens element and the parameters in at least two equations, the length of the optical imaging lens may be shortened while maintaining good optical characteristics and system functionality.

In some embodiments, an optical imaging lens may comprise sequentially from an object side to an image side along an optical axis, first, second, third and fourth lens elements and an aperture stop, each of the first, second, third and fourth lens elements having refracting power, an object-side surface facing toward the object side and an image-side surface facing toward the image side and a central thickness defined along the optical axis.

In the specification, parameters used here may include:

| Parameter | Definition |
|---|---|
| TA | The distance between the aperture stop and the object-side surface of the adjacent lens element along the optical axis |
| T1 | The central thickness of the first lens element along the optical axis |
| G12 | The distance between the image-side surface of the first lens element and the object-side surface of the second lens element along the optical axis/The air gap between the first lens element and the second lens element along the optical axis |
| T2 | The central thickness of the second lens element along the optical axis |
| G23 | The air gap between the second lens element and the third lens element along the optical axis |
| T3 | The central thickness of the third lens element along the optical axis |
| G34 | The air gap between the third lens element and the fourth lens element along the optical axis |
| T4 | The central thickness of the fourth lens element along the optical axis |
| G54 | The air gap between the fifth lens element and the fourth lens element along the optical axis |
| T5 | The central thickness of the fifth lens element along the optical axis |
| G35 | The air gap between the third lens element and the fifth lens element along the optical axis |
| G4F | The distance between the image-side surface of the fourth lens element and the object-side surface of a filtering unit along the optical axis |
| TF | The central thickness of the filtering unit along the optical axis |
| GFP | The distance between the image-side surface of the filtering unit and an image plane along the optical axis |
| f1 | The focusing length of the first lens element |
| f2 | The focusing length of the second lens element |
| f3 | The focusing length of the third lens element |
| f4 | The focusing length of the fourth lens element |
| f5 | The focusing length of the fifth lens element |
| n1 | The refracting index of the first lens element |
| n2 | The refracting index of the second lens element |
| n3 | The refracting index of the third lens element |
| n4 | The refracting index of the fourth lens element |
| n5 | The refracting index of the fifth lens element |
| V1 | The Abbe number of the first lens element |
| V2 | The Abbe number of the second lens element |
| V3 | The Abbe number of the third lens element |
| V4 | The Abbe number of the fourth lens element |
| V5 | The Abbe number of the fifth lens element |
| HFOV | Half Field of View of the optical imaging lens |
| Fno | F-number of the optical imaging lens |
| EFL | The effective focal length of the optical imaging lens |
| TTL | The distance between the object-side surface of the first lens element and an image plane along the optical axis/The length of the optical image lens |
| ALT | The sum of the central thicknesses of all lens elements |
| Gaa | The sum of all air gaps between all lens element along the optical axis |
| BFL | The back focal length of the optical imaging lens/The distance from the image-side surface of the last lens element to the image plane along the optical axis |
| TL | The distance from the object-side surface of the first lens element to the image-side surface of the lens element adjacent to the image plane along the optical axis |

According to some embodiments of the optical imaging lens of the present disclosure, the first lens element may have positive refracting power, the object-side surface of the first lens element may comprise a convex portion in a vicinity of the optical axis and a concave portion in a vicinity of a periphery of the first lens element; the second lens element may have negative refracting power; the object-side surface of the third lens element may comprise a concave portion in a vicinity of a periphery of the third lens element; the image-side surface of the fourth lens element may comprise a convex portion in a vicinity of a periphery of the fourth lens element; and the optical imaging lens may comprise no other lenses having refracting power beyond the four lens elements.

In another exemplary embodiment, other equation(s), such as those relating to the ratio among parameters could be taken into consideration. For example, EFL and TTL could be controlled to satisfy the equation as follows:

$$1.0 \leq EFL/TTL \quad \text{Equation (1);}$$

TL and G23 could be controlled to satisfy the equation as follows:

$$TL/G23 \leq 4.5 \quad \text{Equation (2);}$$

ALT and T1 could be controlled to satisfy the equation as follows:

$$ALT/T1 \leq 2.8 \quad \text{Equation (3); and}$$

T1, T2, T3, G12 and G23 could be controlled to satisfy the equation as follows:

$$4.5 \leq (T1+G12+T2+G23)/T3 \quad \text{Equation (4).}$$

Alternatively, other parameters could be taken into consideration. For example, Fno and G12 and G23 could be controlled to satisfy the equation as follows:

$$Fno/(G12+G23) \leq 1.8 \quad \text{Equation (5);}$$

ALT and T4 could be controlled to satisfy the equation as follows:

$$7.5 \leq ALT/T4 \quad \text{Equation (6);}$$

T1, T2, G12 and G23 could be controlled to satisfy the equation as follows:

$$(T1+G12+T2)/G23 \leq 1.3 \quad \text{Equation (7);}$$

EFL, T2 and T3 could be controlled to satisfy the equation as follows:

$$6.5 \leq EFL/(T2+T3) \quad \text{Equation (8);}$$

T1, T2, G12 and G23 could be controlled to satisfy the equation as follows:

$$0.9 \leq (G12+G23)/(T1+T2) \quad \text{Equation(9);}$$

EFL and Fno could be controlled to satisfy the equation as follows:

$$2.5 \leq EFL/Fno \quad \text{Equation (10);}$$

EFL and T2 could be controlled to satisfy the equation as follows:

$$11.5 \leq EFL/T2 \quad \text{Equation (11);}$$

Fno and T4 could be controlled to satisfy the equation as follows:

$$2.5 \leq Fno/T4 \quad \text{Equation (12);}$$

G12, G23 and T1 could be controlled to satisfy the equation as follows:

$$0.8 \leq (G12+G23)/T1 \quad \text{Equation(13);}$$

EFL, T1 and T2 could be controlled to satisfy the equation as follows:

$$4.5 \leq EFL/(T1+T2) \quad \text{Equation (14);}$$

T1, T2, T3 and T4 could be controlled to satisfy the equation as follows:

$$1.5 \leq (T1+T2+T3)/T4 \quad \text{Equation (15);}$$

TTL and T2 could be controlled to satisfy the equation as follows:

$$16.5 \leq TTL/T2 \quad \text{Equation (16);}$$

G23 and T2 could be controlled to satisfy the equation as follows:

$$3.1 \leq G23/T2 \quad \text{Equation (17);}$$

Fno and T1 could be controlled to satisfy the equation as follows:

$$Fno/T1 \leq 2.7 \quad \text{Equation (18);}$$

ALT, G12 and G23 could be controlled to satisfy the equation as follows:

$$0.8 \leq ALT/(G12+G23) \quad \text{Equation (19);}$$

EFL and G23 could be controlled to satisfy the equation as follows:

$$2.6 \leq EFL/G23 \quad \text{Equation (20);}$$

T1, T2 and T3 could be controlled to satisfy the equation as follows:

$$(T2+T3)/T1 \leq 1.2 \quad \text{Equation (21); or}$$

TTL could be controlled to satisfy the equation as follows:

$$TTL \leq 8.0 \text{ mm} \quad \text{Equation (22).}$$

Aforesaid embodiments are not limited and could be selectively incorporated in other embodiments described herein. In some embodiments, more details about the convex or concave surface structure could be incorporated for one specific lens element or broadly for plural lens elements to enhance the control for the system performance and/or resolution. It is noted that the details listed here could be incorporated into example embodiments if no inconsistency occurs.

By controlling the convex or concave shape of the surfaces, the optical imaging lens thereof in exemplary embodiments achieve good optical characteristics, large aperture, large field of view, raised assembly yield, and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of one single lens element according to the present disclosure;

FIG. 2 is a schematic view of the relation between the surface shape and the optical focus of the lens element;

FIG. 3 is a schematic view of a first example of the surface shape and the efficient radius of the lens element;

FIG. 4 is a schematic view of a second example of the surface shape and the efficient radius of the lens element;

FIG. 5 is a schematic view of a third example of the surface shape and the efficient radius of the lens element;

FIG. 8 is a table of optical data for each lens element of the optical imaging lens of a first embodiment of the present disclosure;

FIG. 9 is a table of aspherical data of a first embodiment of the optical imaging lens according to the present disclosure;

FIG. 12 is a table of optical data for each lens element of the optical imaging lens of a second embodiment of the present disclosure;

FIG. 13 is a table of aspherical data of a second embodiment of the optical imaging lens according to the present disclosure;

FIG. 16 is a table of optical data for each lens element of the optical imaging lens of a third embodiment of the present disclosure;

FIG. 17 is a table of aspherical data of a third embodiment of the optical imaging lens according to the present disclosure;

FIG. 20 is a table of optical data for each lens element of the optical imaging lens of a fourth embodiment of the present disclosure;

FIG. 21 is a table of aspherical data of a fourth embodiment of the optical imaging lens according to the present disclosure;

FIG. 24 is a table of optical data for each lens element of the optical imaging lens of a fifth embodiment of the present disclosure;

FIG. 25 is a table of aspherical data of a fifth embodiment of the optical imaging lens according to the present disclosure;

FIG. 28 is a table of optical data for each lens element of a sixth embodiment of an optical imaging lens according to the present disclosure;

FIG. 29 is a table of aspherical data of a sixth embodiment of the optical imaging lens according to the present disclosure;

FIG. 32 is a table of optical data for each lens element of the optical imaging lens of a seventh embodiment of the present disclosure;

FIG. 33 is a table of aspherical data of a seventh embodiment of the optical imaging lens according to the present disclosure;

FIG. 36 is a table of optical data for each lens element of the optical imaging lens of an eighth embodiment of the present disclosure;

FIG. 37 is a table of aspherical data of an eighth embodiment of the optical imaging lens according to the present disclosure;

FIG. 40 is a table of optical data for each lens element of the optical imaging lens of a ninth embodiment of the present disclosure;

FIG. 41 is a table of aspherical data of a ninth embodiment of the optical imaging lens according to the present disclosure;

FIG. 42 is a table for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the first to ninth example embodiments;

FIG. 45 is a table of optical data for each lens element of the optical imaging lens of a tenth embodiment of the present disclosure;

FIG. 46 is a table of aspherical data of a tenth embodiment of the optical imaging lens according to the present disclosure;

FIG. 49 is a table of optical data for each lens element of the optical imaging lens of an eleventh embodiment of the present disclosure;

FIG. 50 is a table of aspherical data of an eleventh embodiment of the optical imaging lens according to the present disclosure;

FIG. 53 is a table of optical data for each lens element of the optical imaging lens of a twelfth embodiment of the present disclosure;

FIG. 54 is a table of aspherical data of a twelfth embodiment of the optical imaging lens according to the present disclosure;

FIG. 57 is a table of optical data for each lens element of the optical imaging lens of a thirteenth embodiment of the present disclosure;

FIG. 58 is a table of aspherical data of a thirteenth embodiment of the optical imaging lens according to the present disclosure;

FIG. 61 is a table of optical data for each lens element of the optical imaging lens of a fourteenth embodiment of the present disclosure;

FIG. 62 is a table of aspherical data of a fourteenth embodiment of the optical imaging lens according to the present disclosure;

FIG. 65 is a table of optical data for each lens element of the optical imaging lens of a fifteenth embodiment of the present disclosure;

FIG. 66 is a table of aspherical data of a fifteenth embodiment of the optical imaging lens according to the present disclosure;

FIG. 69 is a table of optical data for each lens element of the optical imaging lens of a sixteenth embodiment of the present disclosure;

FIG. 70 is a table of aspherical data of a sixteenth embodiment of the optical imaging lens according to the present disclosure;

FIG. 73 is a table of optical data for each lens element of the optical imaging lens of a seventeenth embodiment of the present disclosure;

FIG. 74 is a table of aspherical data of a seventeenth embodiment of the optical imaging lens according to the present disclosure;

FIG. 75 is a table for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the tenth to seventeenth example embodiments.

DETAILED DESCRIPTION

Figure 6:
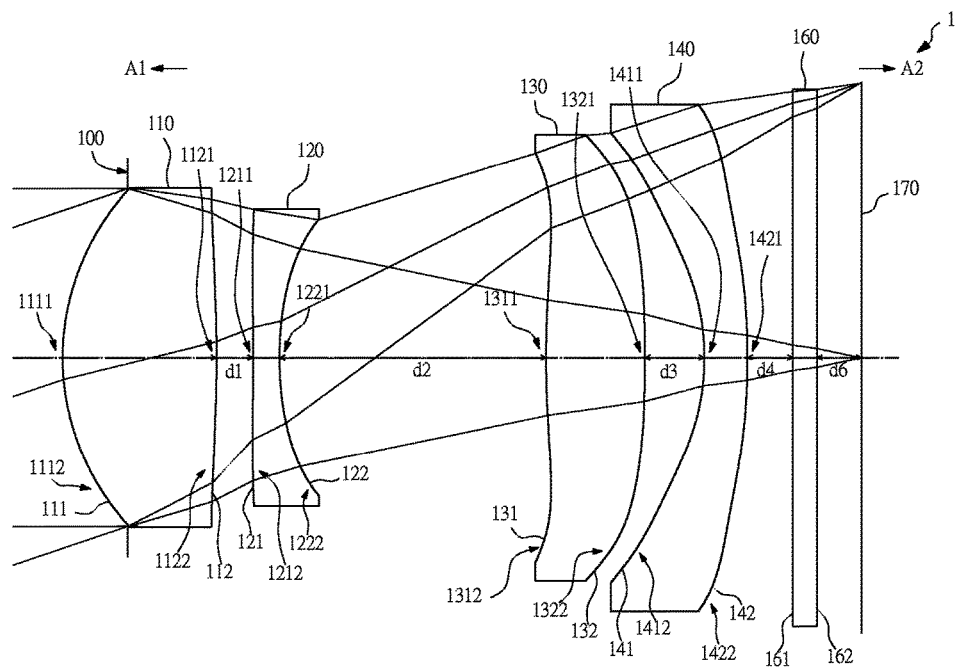
FIG. 6 is a cross-sectional view of a first embodiment of an optical imaging lens having four lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refractive power)" means that the paraxial refractive power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a part in a vicinity of the optical axis", and the region C of the lens element is defined as "a part in a vicinity of a periphery of the lens element". Besides, the lens element may also have an extending part E extended radially and outwardly from the region C, namely the part outside of the clear aperture of the lens element. The extending part E is usually used for physically assembling the lens element into an optical imaging lens system. Under normal circumstances, the imaging rays would not pass through the extending part E because those imaging rays only pass through the clear aperture. The structures and shapes of the aforementioned extending part E are only examples for technical explanation, the structures and shapes of lens elements should not be limited to these examples. Note that the extending parts of the lens element surfaces depicted in the following embodiments are partially omitted.

The following criteria are provided for determining the shapes and the parts of lens element surfaces set forth in the present specification. These criteria mainly determine the boundaries of parts under various circumstances including the part in a vicinity of the optical axis, the part in a vicinity of a periphery of a lens element surface, and other types of lens element surfaces such as those having multiple parts.

FIG. 1 is a radial cross-sectional view of a lens element. Before determining boundaries of those aforesaid parts, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The part of a surface of the lens element between the central point and the first transition point is defined as the part in a vicinity of the optical axis. The part located radially outside of the Nth transition point (but still within the scope of the clear aperture) is defined as the part in a vicinity of a periphery of the lens element. In some embodiments, there are other parts existing between the part in a vicinity of the optical axis and the part in a vicinity of a periphery of the lens element; the numbers of parts depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a part is convex or concave depends on whether a collimated ray passing through that part converges or diverges. That is, while applying a collimated ray to a part to be determined in terms of shape, the collimated ray passing through that part will be bended and the ray itself or its extension line will eventually meet the optical axis. The shape of that part can be determined by whether the ray or its extension line meets (intersects) the optical axis (focal point) at the object-side or image-side. For instance, if the ray itself intersects the optical axis at the image side of the lens element after passing through a part, i.e. the focal point of this ray is at the image side (see point R in FIG. 2), the part will be determined as having a convex shape. On the contrary, if the ray diverges after passing through a part, the extension line of the ray intersects the optical axis at the object side of the lens element, i.e. the focal point of the ray is at the object side (see point M in FIG. 2), that part will be determined as having a concave shape. Therefore, referring to FIG. 2, the part between the central point and the first transition point may have a convex shape, the part located radially outside of the first transition point may have a concave shape, and the first transition point is the point where the part having a convex shape changes to the part having a concave shape, namely the border of two adjacent parts. Alternatively, there is another method to determine whether a part in a vicinity of the optical axis may have a convex or concave shape by referring to the sign of an "R" value, which is the (paraxial) radius of curvature of a lens surface. The R value may be used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the part in a vicinity of the optical axis may be defined as the part between 0~50% of the effective radius (radius of the clear aperture) of the surface, whereas the part in a vicinity of a periphery of the lens element may be defined as the part between 50~100% of effective radius (radius of the clear aperture) of the surface.

Referring to the first example depicted in FIG. 3, only one transition point, namely a first transition point, appears within the clear aperture of the image-side surface of the lens element. Part I may be a part in a vicinity of the optical axis, and part II may be a part in a vicinity of a periphery of the lens element. The part in a vicinity of the optical axis may be determined as having a concave surface due to the R value at the image-side surface of the lens element is positive. The shape of the part in a vicinity of a periphery of the lens element may be different from that of the radially inner adjacent part, i.e. the shape of the part in a vicinity of a periphery of the lens element may be different from the shape of the part in a vicinity of the optical axis; the part in a vicinity of a periphery of the lens element may have a convex shape.

Referring to the second example depicted in FIG. 4, a first transition point and a second transition point may exist on the object-side surface (within the clear aperture) of a lens element. In which part I may be the part in a vicinity of the optical axis, and part III may be the part in a vicinity of a periphery of the lens element. The part in a vicinity of the optical axis may have a convex shape because the R value at the object-side surface of the lens element may be positive. The part in a vicinity of a periphery of the lens element (part III) may have a convex shape. What is more, there may be another part having a concave shape existing between the first and second transition point (part II).

Referring to a third example depicted in FIG. 5, no transition point may exist on the object-side surface of the lens element. In this case, the part between 0~50% of the effective radius (radius of the clear aperture) may be determined as the part in a vicinity of the optical axis, and the part between 50~100% of the effective radius may be determined as the part in a vicinity of a periphery of the lens element. The part in a vicinity of the optical axis of the object-side surface of the lens element may be determined as having a convex shape due to its positive R value, and the part in a vicinity of a periphery of the lens element may be determined as having a convex shape as well.

The optical imaging lens of the present disclosure is a prime lens, and sequentially from an object side to an image side along an optical axis, may comprise first, second, third and fourth lens elements and a filter unit, in which each of said lens elements has an object-side surface facing toward the object side and an image-side surface facing toward the image side. The optical imaging lens of the present disclosure with good optical characteristics and a shortened length could be achieved by designing characteristics of each lens element.

The above mentioned characteristics of each lens element are considered with optical features and the optical lens length of the optical imaging lens. For example, the first lens element may have positive refracting power, the object-side surface of the first lens element may comprise a convex portion in a vicinity of the optical axis and a concave portion in a vicinity of a periphery of the first lens element; the second lens element may have negative refracting power; the object-side surface of the third lens element may comprise a concave portion in a vicinity of a periphery of the third lens element; the image-side surface of the fourth lens element may comprise a convex portion in a vicinity of a periphery of the fourth lens element. The above mentioned designs are combined with each other could effectively eliminate aberration while the length of the optical lens may be reduced and the imaging quality may be enhanced.

Besides, controlling the parameters of each lens element described below could help designer to design the optical imaging lens with good optical performance, short length and technological feasibility.

For example, shortening EFL could enhance the reduction of the volume of the optical imaging lens and the enlargement of the field of view, such that EFL should be shortened. Therefore, if the optical imaging lens could satisfy any one of equations described below in process of slimming the thickness, the field of view may be enlarged:

$$6.5 \leq EFL/(T2+T3) \qquad \text{Equation (8)};$$

$$2.5 \leq EFL/Fno \qquad \text{Equation (10)};$$

$$11.5 \leq EFL/T2 \qquad \text{Equation (11); and}$$

$$4.5 \leq EFL/(T1+T2) \qquad \text{Equation (14)}.$$

In some embodiments, the value of EFL/(T2+T3) may be further restricted between 6.5 and 6.553 or 6.5 and 17.196. In some embodiments, the value of EFL/Fno may be further restricted between 2.949 and 3.341 or 3.755 and 3.795. In some embodiments, the value of EFL/T2 may be further restricted between 16.503 and 30.822 or 18.654 and 38.460. In some embodiments, the value of EFL/(T1+T2) may be further restricted between 4.5 and 5.608 or 4.782 and 7.091. Therefore, the imaging quality of the optical imaging lens may be better.

For shortening the length of the optical imaging lens and easily focusing to raise the imaging quality, the thicknesses of the lens elements and the air gaps between the lens elements of the optical imaging lens of the present disclosure are shorten properly. However, both the difficulties of assembling the optical imaging lens and the imaging quality should be considered, the thicknesses of the lens elements and the air gaps between the lens elements need to be adjusted to satisfy any one of equations described below for more proper arrangement:

$$TL/G23 \leq 4.5 \qquad \text{Equation (2)};$$

$$ALT/T1 \leq 2.8 \qquad \text{Equation (3)};$$

$$Fno/(G12+G23) \leq 1.8 \qquad \text{Equation (5)};$$

$$(T1+G12+T2)/G23 \leq 1.3 \qquad \text{Equation (7)};$$

$$Fno/T1 \leq 2.7 \qquad \text{Equation (18)};$$

$$(T2+T3)/T1 \leq 1.2 \qquad \text{Equation (21); and}$$

$$TTL \leq 8.0 \text{ mm} \qquad \text{Equation (22)}.$$

When the design of the optical imaging lens could satisfy any one of Equations (2), (3), (5), (7), (18), (21) and (22), and the denominators of theses equations are fixed, the numerators could be reduced to reduce the volume of the optical imaging lens.

In some embodiments, the value of TL/G23 may be further restricted between 2.208 and 2.776 or 1.978 and 4.477. In some embodiments, the value of ALT/T1 may be further restricted between 2.090 and 2.538 or 1.956 and 2.799. In some embodiments, the value of Fno/(G12+G23) may be further restricted between 0.810 and 1.222 or 0.681 and 1.554. In some embodiments, the value of (T1+G12+T2)/G23 may be further restricted between 0.536 and 0.958 or 0.438 and 1.217. In some embodiments, the value of Fno/T1 may be further restricted between 1.627 and 2.648 or 1.501 and 2.386. In some embodiments, the value of (T2+T3)/T1 may be further restricted between 0.811 and 1.200 or 0.332 and 0.989. In some embodiments, the value of TTL may be further restricted between 6.877 and 8.681 or 7.928 and 7.993.

When the design of the optical imaging lens could satisfy any one of equations below, the optical imaging lens could be in proper arrangement, and have good image quality under well yield:

$$1.0 \leq EFL/TTL \qquad \text{Equation (1)};$$

$$4.5 \leq (T1+G12+T2+G23)/T3 \qquad \text{Equation (4)};$$

$$7.5 \leq ALT/T4 \qquad \text{Equation (6)};$$

$$0.9 \leq (G12+G23)/(T1+T2) \qquad \text{Equation (9)};$$

$$2.5 \leq Fno/T4 \qquad \text{Equation (12)};$$

$$0.8 \leq (G12+G23)/T1 \qquad \text{Equation (13)};$$

$$1.5 \leq (T1+T2+T3)/T4 \qquad \text{Equation (15)};$$

$$16.5 \leq TTL/T2 \qquad \text{Equation (16)};$$

$$3.1 \leq G23/T2 \qquad \text{Equation (17); and}$$

$$0.8 \leq ALT/(G12+G23) \qquad \text{Equation (19)}.$$

In some embodiments, the value of EFL/TTL may be further restricted between 1.000 and 1.028 or 1.126 and 1.135. In some embodiments, the value of (T1+G12+T2+G23)/T3 may be further restricted between 4.501 and 6.442 or 4.501 and 17.561. In some embodiments, the value of (T1+G12+T2+G23)/T3 may be further restricted between 4.501 and 6.442 or 4.501 and 17.561. In some embodiments, the value of ALT/T4 may be further restricted between 7.500 and 7.999 or 7.500 and 9.453. In some embodiments, the value of (G12+G23)/(T1+T2) may be further restricted between 1.102 and 2.347 or 0.901 and 2.405. In some embodiments, the value of Fno/T4 may be further restricted between 5.759 and 8.059 or 4.583 and 7.253. In some embodiments, the value of (G12+G23)/T1 may be further restricted between 1.439 and 3.170 or 1.044 and 3.052. In some embodiments, the value of (T1+T2+T3)/T4 may be further restricted between 6.500 and 6.999 or 4.491 and 6.438. In some embodiments, the value of TTL/T2 may be further restricted between 16.501 and 30.267 or 16.509 and 33.992. In some embodiments, the value of G23/T2 may be further restricted between 4.588 and 11.192 or 3.283 and 14.787. In some embodiments, the value of ALT/(G12+G23) may be further restricted between 0.800 and 1.526 or 0.818 and 2.281. Therefore, the optical imaging lens could be maintained with proper volume.

In consideration of the unpredictability of an optical system design, when the optical imaging lens of the present disclosure can satisfy the equations described above, the length of the optical lens may be reduced, the aperture stop may be enlarged (F-number may be reduced), the field angle may be increased, the imaging quality may be enhanced, or the assembly yield may be upgraded. Such characteristics may advantageously mitigate various drawbacks in other optical system designs.

When implementing example embodiments, more details about the convex or concave surface could be incorporated for one specific lens element or broadly for plural lens elements to enhance the control for the system performance and/or resolution. It is noted that the details listed here could be incorporated in example embodiments if no inconsistency occurs.

Figure 7:
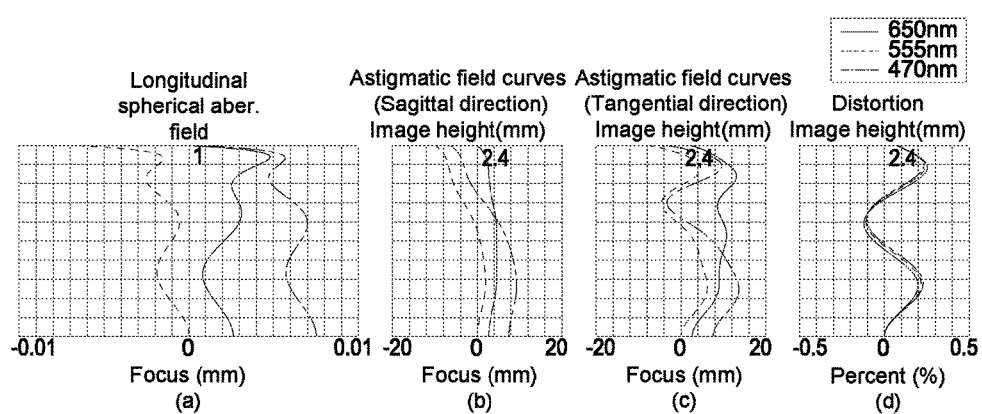
FIG. 7 is a chart of longitudinal spherical aberration and other kinds of optical aberrations of a first embodiment of the optical imaging lens according to the present disclosure.

Several exemplary embodiments and associated optical data will now be provided for illustrating example embodiments of optical imaging lens with good optical characteristics and a shortened length. Reference is now made to FIGS. 6-9. FIG. 6 illustrates an example cross-sectional view of an optical imaging lens 1 having four lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the tenth example embodiment. FIG. 9 depicts an example table of aspherical data of the optical imaging lens 1 according to the tenth example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130 and a fourth lens element 140. A filtering unit 160 and an image plane 170 of an image sensor (not shown) are positioned at the image side A2 of the optical lens 1. Each of the first, second, third, and fourth lens elements 110, 120, 130, 140 and the filtering unit 160 may comprise an object-side surface 111/121/131/141/161 facing toward the object side A1 and an image-side surface 112/122/132/142/162 facing toward the image side A2. The example embodiment of the filtering unit 160 illustrated is an IR cut filter (infrared cut filter) positioned between the fourth lens element 140 and an image plane 170. The filtering unit 160 selectively absorbs light with specific wavelength from the light passing optical imaging lens 1. For example, IR light is absorbed, and this will prohibit the IR light which is not seen by human eyes from producing an image on the image plane 170.

Exemplary embodiments of each lens element of the optical imaging lens 1 which may be constructed by plastic material will now be described with reference to the drawings.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a convex portion 1121 in a vicinity of the optical axis and a convex portion 1122 in a vicinity of a periphery of the first lens element 110. The object-side surface 111 and the image-side surface 112 may be aspherical surfaces.

An example embodiment of the second lens element 120 may have negative refracting power. The object-side surface 121 may comprise a concave portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of a periphery of the second lens element 120. The object-side surface 121 and the image-side surface 122 may be aspherical surfaces.

An example embodiment of the third lens element 130 may have positive refracting power. The object-side surface 131 may comprise a convex portion 1311 in a vicinity of the optical axis and a concave portion 1312 in a vicinity of a periphery of the third lens element 130. The image-side surface 132 may comprise a convex portion 1321 in a vicinity of the optical axis and a convex portion 1322 in a vicinity of a periphery of the third lens element 130. The object-side surface 131 and the image-side surface 132 may be aspherical surfaces.

An example embodiment of the fourth lens element 140 may have negative refracting power. The object-side surface 141 may comprise a concave portion 1411 in a vicinity of the optical axis and a concave portion 1412 in a vicinity of a periphery of the fourth lens element 140. The image-side surface 142 may comprise a convex portion 1421 in a vicinity of the optical axis and a convex portion 1422 in a vicinity of a periphery of the fourth lens element 140. The object-side surface 141 and the image-side surface 142 may be aspherical surfaces.

In example embodiments, air gaps exist between the lens elements 110, 120, 130, 140, the filtering unit 160 and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3 is denoted by G34, and the sum of d1, d2, d3, and d4 is denoted by Gaa.

FIG. 8 depicts the optical characteristics of each lens elements in the optical imaging lens 1 of the present embodiment. The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, and the object-side surface 141 and the image-side surface 142 of the fourth lens element 140 are all defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

FIG. 7(a) shows the longitudinal spherical aberration, wherein the transverse axis of FIG. 7(a) defines the focus, and the lengthwise axis of FIG. 7(a) defines the filed. FIG. 7(b) shows the astigmatism aberration in the sagittal direction, wherein the transverse axis of FIG. 7(b) defines the focus, and the lengthwise axis of FIG. 7(b) defines the image height. FIG. 7(c) shows the astigmatism aberration in the tangential direction, wherein the transverse axis of FIG. 7(c) defines the focus, and the lengthwise axis of FIG. 7(c) defines the image height. FIG. 7(d) shows the variation of the distortion aberration, wherein the transverse axis of FIG. 7(d) defines the percentage, and the lengthwise axis of FIG. 7(d) defines the image height. The three curves with different wavelengths (470 nm, 555 nm, 650 nm) represent that off-axis light with respect to these wavelengths may be focused around an image point. From the vertical deviation of each curve shown in FIG. 7(a), the offset of the off-axis light relative to the image point may be within about ±0.008 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.10 μm. Referring to FIG. 7(c), the focus variation with respect to the three different wavelengths (470 nm, 555 nm, 650 nm) in the whole field may fall within about ±14 μm. Please refer to FIG. 7(d), the transverse axis of FIG. 7(d), the variation of the distortion aberration may be within about ±0.3%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

The distance from the object-side surface 111 of the first lens element 110 to the image plane 170 along the optical axis may be about 6.960 mm, and then the present embodiment has short length of the optical image lens and could achieve to be designed for slim product under well optical performance.

Figure 10:
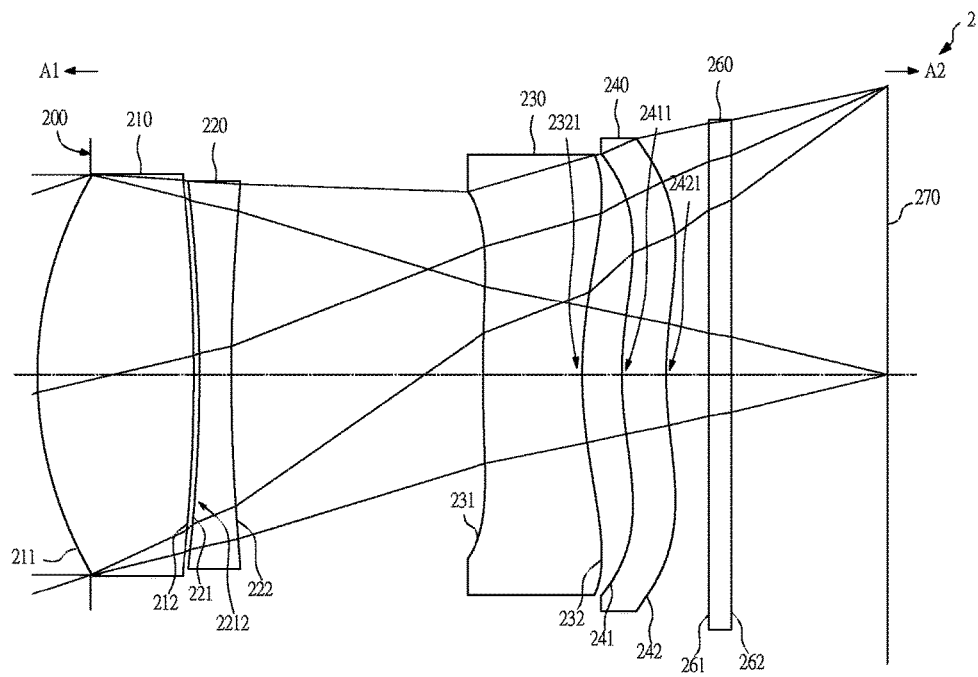
FIG. 10 is a cross-sectional view of a second embodiment of an optical imaging lens having four lens elements according to the present disclosure.
Figure 11:
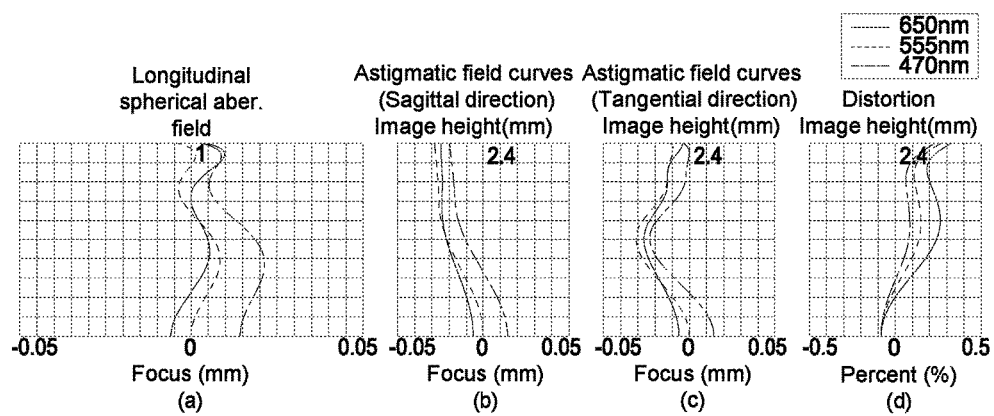
FIG. 11 is a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having four lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labelled in the present embodiment are similar to those in the first embodiment for the similar elements, but here the reference numbers are initialed with 2, for example, reference number 231 for labelling the object-side surface of the third lens element 230, reference number 232 for labelling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230 and a fourth lens element 240.

The arrangement of the convex or concave surface structures, including the object-side surfaces 211, 231 and image-side surfaces 212, 222 are generally similar with the optical imaging lens 1. The differences between the optical imaging lens 1 and the optical imaging lens 2 may include the concave/convex shapes of the object-side surfaces 221, 241 facing to the object side A1 and the image-side surfaces 232, 242 facing to the image side A2, and a radius of curvature, a refracting power, a thickness, an aspherical data, and an effective focal length of each lens element. More specifically, the third lens element 230 has negative refracting power, the fourth lens element 240 has positive refracting power, the object-side surface 221 may comprise a concave portion 2212 in a vicinity of a periphery of the second lens element 220, the image-side surface 232 may comprise a concave portion 2321 in a vicinity of the optical axis, the object-side surface 241 may comprise a convex portion 2411 in a vicinity of the optical axis, and the image-side surface 242 may comprise a concave portion 2421 in a vicinity of the optical axis.

Here, for clearly showing the drawings of the present embodiment, only the surface shapes which are different from that in the first embodiment are labelled. Please refer to FIG. 12 for the optical characteristics of each lens elements in the optical imaging lens 2 the present embodiment.

From the vertical deviation of each curve shown in FIG. 11(a), the offset of the off-axis light relative to the image point may be within about ±0.025 mm. Referring to FIG. 11(b), the focus variation with respect to the three different wavelengths (470 nm, 555 nm, 650 nm) in the whole field may fall within about ±0.03 mm. Referring to FIG. 11(c), the focus variation with respect to the three different wavelengths (470 nm, 555 nm, 650 nm) in the whole field may fall within about ±0.04 mm. Refer to FIG. 11(d), the variation of the distortion aberration of the optical imaging lens 2 may be within about ±0.4%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, the second embodiment may be manufactured more easily and the yield rate may be higher.

Figure 14:
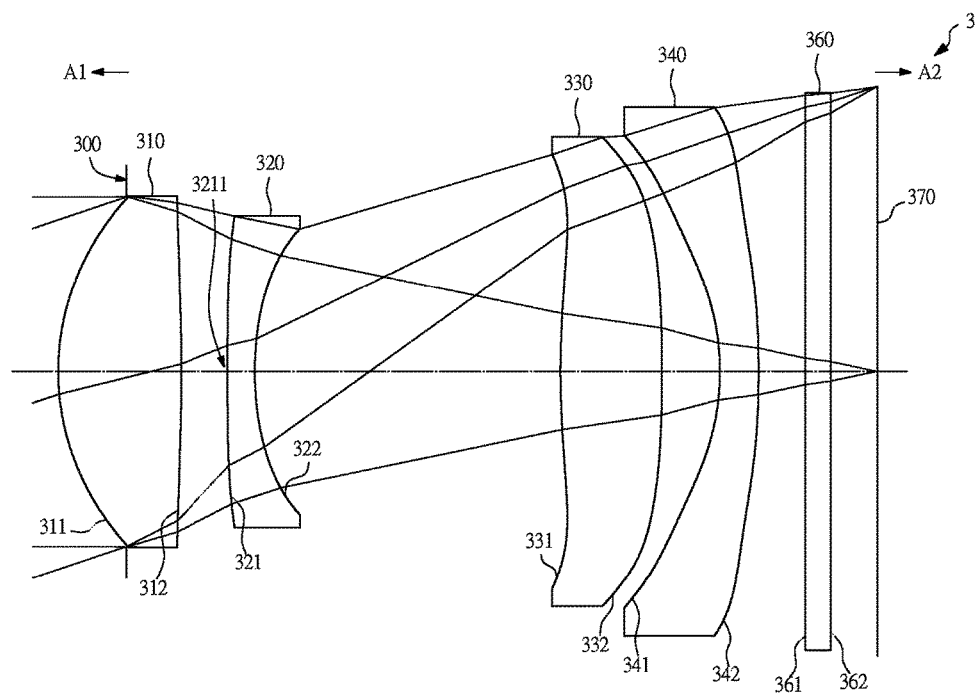
FIG. 14 is a cross-sectional view of a third embodiment of an optical imaging lens having four lens elements according to the present disclosure.
Figure 15:
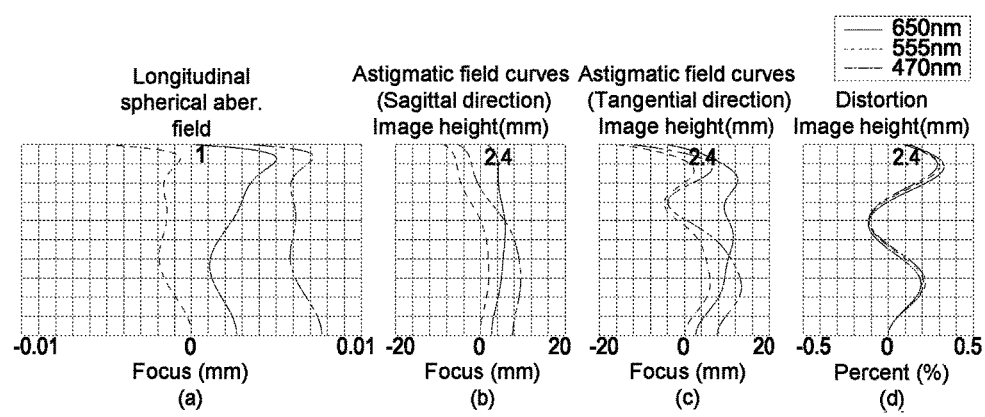
FIG. 15 is a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having four lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labelled in the present embodiment are similar to those in the first embodiment for the similar elements, but here the reference numbers are initialed with 3, for example, reference number 331 for labelling the object-side surface of the third lens element 330, reference number 332 for labelling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330 and a fourth lens element 340.

The arrangement of the convex or concave surface structures, including the object-side surfaces 311, 331, 341 and image-side surfaces 312, 322, 332, 342 are generally similar with the optical imaging lens 1. The differences between the optical imaging lens 1 and the optical imaging lens 3 may include the concave/convex shapes of the object-side surface 321 facing to the object side A1 and a radius of curvature, a thickness, an aspherical data, and an effective focal length of each lens element. More specifically, the object-side surface 321 may comprise a convex portion 3211 in a vicinity of the optical axis.

Here, for clearly showing the drawings of the present embodiment, only the surface shapes which are different from that in the first embodiment are labelled. Please refer to FIG. 16 for the optical characteristics of each lens elements in the optical imaging lens 3 the present embodiment.

From the vertical deviation of each curve shown in FIG. 15(a), the offset of the off-axis light relative to the image point may be within about ±0.008 mm. Referring to FIG. 15(b), the focus variation with respect to the three different wavelengths (470 nm, 555 nm, 650 nm) in the whole field may fall within about ±10 μm. Referring to FIG. 15(c), the focus variation with respect to the three different wavelengths (470 nm, 555 nm, 650 nm) in the whole field may fall within about ±16 μm. Refer to FIG. 15(d), the variation of the distortion aberration of the optical imaging lens 3 may be within about ±0.4%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, Fno of the third embodiment may be bigger, and TTL of the third embodiment may be shorter. Furthermore, the third embodiment of the optical imaging lens may be manufactured more easily and its yield rate may be higher.

Figure 18:
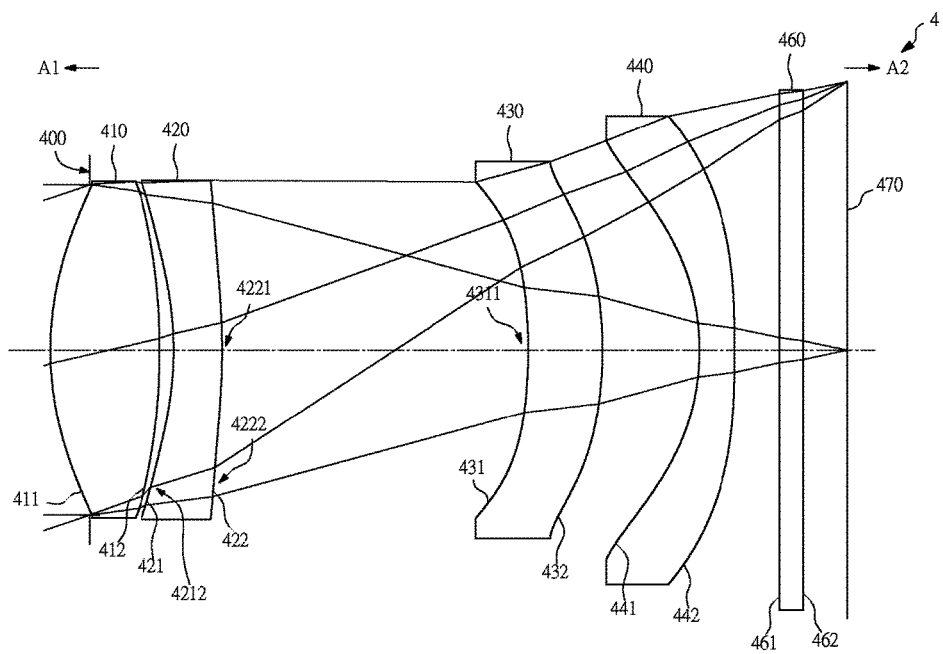
FIG. 18 is a cross-sectional view of a fourth embodiment of an optical imaging lens having four lens elements according to the present disclosure.
Figure 19:
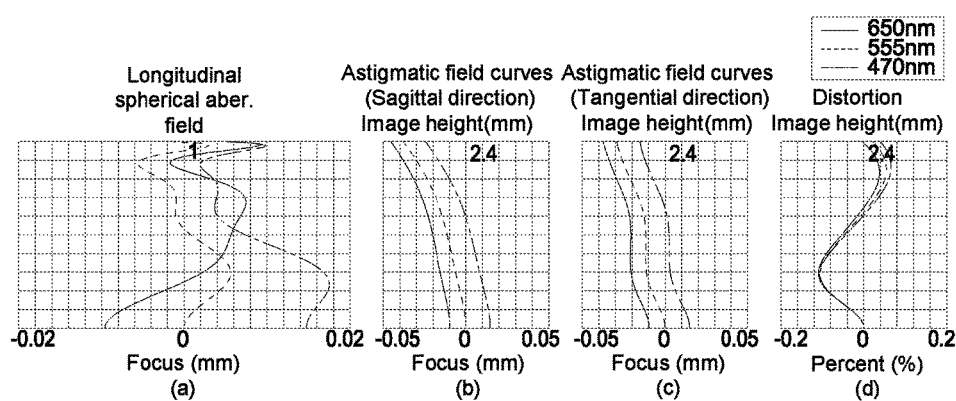
FIG. 19 is a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having four lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labelled in the present embodiment are similar to those in the first embodiment for the similar elements, but here the reference numbers are initialed with 4, for example, reference number 431 for labelling the object-side surface of the third lens element 430, reference number 432 for labelling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430 and a fourth lens element 44.

The arrangement of the convex or concave surface structures, including the object-side surfaces 411, 441 and image-side surfaces 412, 432, 442 are generally similar with the optical imaging lens 1. The differences between the optical imaging lens 1 and the optical imaging lens 4 may include the concave/convex shapes of the object-side surface 421, the image-side surface 422, the object-side surfaces 421, 431, a radius of curvature, a thickness, an aspherical data, and an effective focal length of each lens element. More specifically, the object-side surface 421 may comprise a concave portion 4212 in a vicinity of a periphery of the second lens element 420, the image-side surface 422 may comprise a convex portion 4221 in a vicinity of the optical axis and a convex portion 4222 in a vicinity of a periphery of the second lens element, and the object-side surface 431 may comprise a concave portion 4311 in a vicinity of the optical axis.

Here, for clearly showing the drawings of the present embodiment, only the surface shapes which are different from that in the first embodiment are labelled. Please refer to FIG. 20 for the optical characteristics of each lens elements in the optical imaging lens 4 the present embodiment.

From the vertical deviation of each curve shown in FIG. 19(a), the offset of the off-axis light relative to the image point may be within about ±0.018 mm. Referring to FIG. 19(b), the focus variation with respect to the three different wavelengths (470 nm, 555 nm, 650 nm) in the whole field may fall within about ±0.05 mm. Referring to FIG. 19(c), the focus variation with respect to the three different wavelengths (470 nm, 555 nm, 650 nm) in the whole field may fall within about ±0.04 mm. Please refer to FIG. 19(d), the variation of the distortion aberration of the optical imaging lens 4 may be within about ±0.12%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, EFL of the fourth embodiment may be shorter, Fno of the fourth embodiment may be larger, and the variation of the distortion aberration of the fourth embodiment may be smaller, such that the image quality of the fourth embodiment may be better. Furthermore, the fourth embodiment of the optical imaging lens may be manufactured more easily and its yield rate may be higher.

Figure 22:
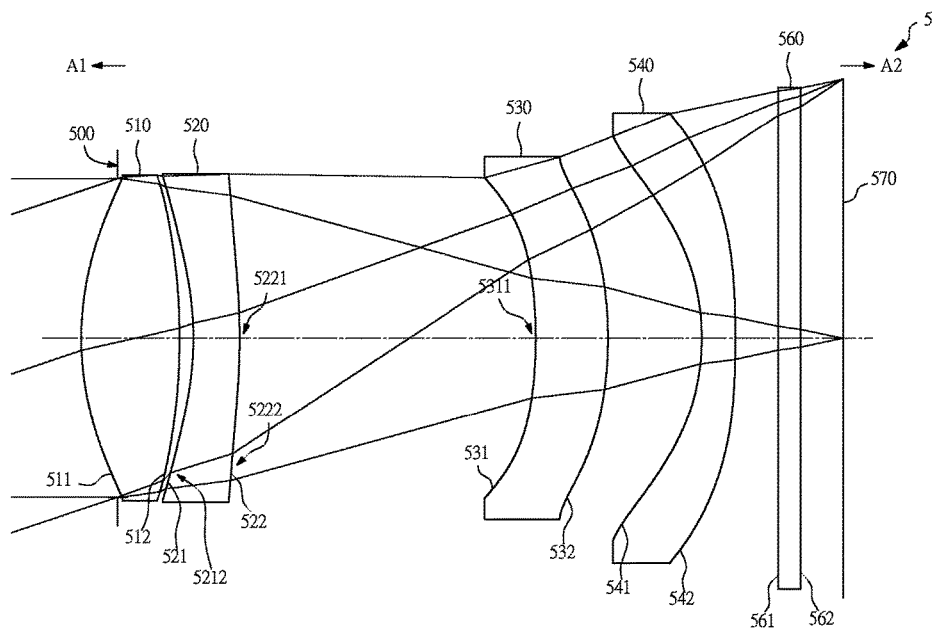
FIG. 22 is a cross-sectional view of a fifth embodiment of an optical imaging lens having four lens elements according to the present disclosure.
Figure 23:
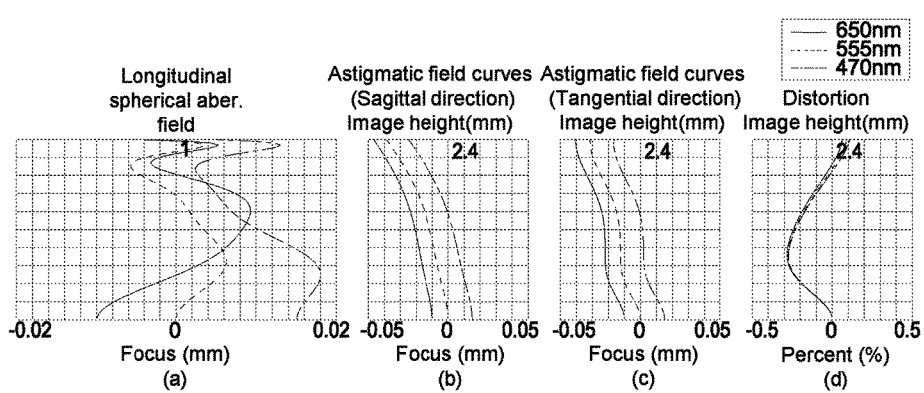
FIG. 23 is a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having four lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labelled in the present embodiment are similar to those in the first embodiment for the similar elements, but here the reference numbers are initialed with 5, for example, reference number 531 for labelling the object-side surface of the third lens element 530, reference number 532 for labelling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530 and a fourth lens element.

The arrangement of the convex or concave surface structures, including the object-side surfaces 511, 541 and image-side surfaces 512, 532, 542 are generally similar with the optical imaging lens 1. The differences between the optical imaging lens 1 and the optical imaging lens 5 may include the concave/convex shapes of the object-side surfaces 521, 531, image-side surface 522 and a radius of curvature, a thickness, an aspherical data, and an effective focal length of each lens element. More specifically, the object-side surface 521 may comprise a concave portion 5212 in a vicinity of a periphery of the second lens element 520, the image-side surface 522 may comprise a convex portion 5221 in a vicinity of the optical axis and a convex portion 5222 in a vicinity of a periphery of the second lens element 520, and the object-side surface 531 may comprise a concave portion 5311 in a vicinity of the optical axis.

Here, for clearly showing the drawings of the present embodiment, only the surface shapes which are different from that in the first embodiment are labelled. FIG. 24 depicts the optical characteristics of each lens elements in the optical imaging lens 5 of the present embodiment.

From the vertical deviation of each curve shown in FIG. 23(a), the offset of the off-axis light relative to the image point may be within about ±0.018 mm. Referring to FIG. 23(b), the focus variation with respect to the three different wavelengths (470 nm, 555 nm, 650 nm) in the whole field may fall within about ±0.05 mm. Referring to FIG. 23(c), the focus variation with respect to the three different wavelengths (470 nm, 555 nm, 650 nm) in the whole field may fall within about ±0.05 mm. Please refer to FIG. 23(d), the variation of the distortion aberration of the optical imaging lens 5 may be within about ±0.3%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, Fno of the fifth embodiment may be bigger. Furthermore, the fifth embodiment of the optical imaging lens may be manufactured more easily and the yield rate may be higher.

Figure 26:
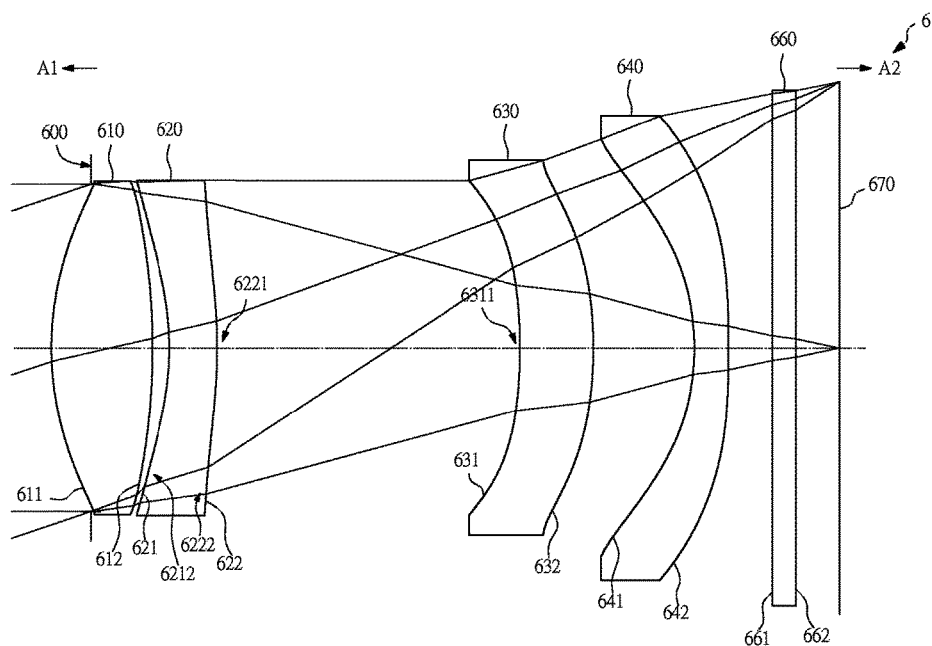
FIG. 26 is a cross-sectional view of a sixth embodiment of an optical imaging lens having four lens elements according to the present disclosure.
Figure 27:
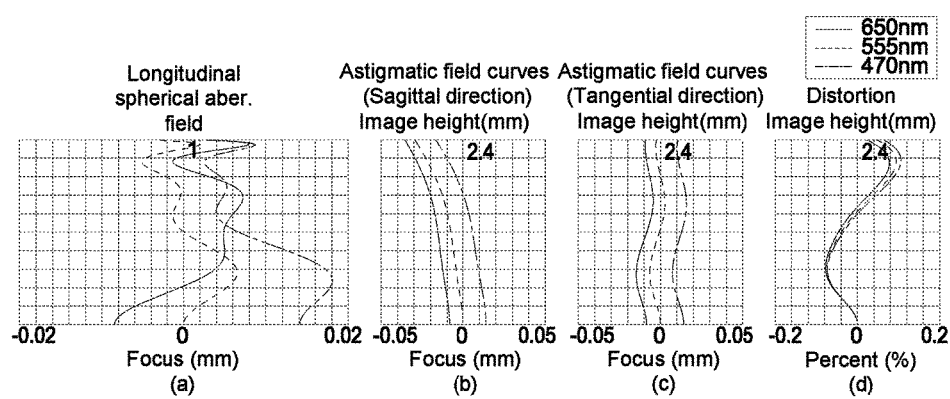
FIG. 27 is a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having four lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labelled in the present embodiment are similar to those in the first embodiment for the similar elements, but here the reference numbers are initialed with 6, for example, reference number 631 for labelling the object-side surface of the third lens element 630, reference number 632 for labelling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630 and a fourth lens element 640.

The arrangement of the convex or concave surface structures, including the object-side surfaces 611, 641 and image-side surfaces 612, 632, 642 are generally similar with the optical imaging lens 1. The differences between the optical imaging lens 1 and the optical imaging lens 6 may include the concave/convex shapes of the object-side surfaces 621, 631, and the image-side surface 622 and a radius of curvature, a thickness, an aspherical data, and an effective focal length of each lens element. More specifically, the object-side surface 621 may comprise a concave portion 6212 in a vicinity of a periphery of the second lens element 620, the image-side surface 622 may comprise a convex portion 6221 in a vicinity of the optical axis and a convex portion 6222 in a vicinity of a periphery of the second lens element, and the object-side surface 631 may comprise a concave portion 6311 in a vicinity of the optical axis.

Here, for clearly showing the drawings of the present embodiment, only the surface shapes which are different from that in the first embodiment are labelled. Please refer to FIG. 28 for the optical characteristics of each lens elements in the optical imaging lens 6 the present embodiment.

From the vertical deviation of each curve shown in FIG. 27(a), the offset of the off-axis light relative to the image point may be within about ±0.018 mm. Referring to FIG. 27(b), the focus variation with respect to the three different wavelengths (470 nm, 555 nm, 650 nm) in the whole field may fall within about ±0.04 mm. Referring to FIG. 23(c), the focus variation with respect to the three different wavelengths (470 nm, 555 nm, 650 nm) in the whole field may fall within about ±0.02 mm. Please refer to FIG. 27(d), the variation of the distortion aberration of the optical imaging lens 6 may be within about ±0.12%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, Fno of the sixth embodiment may be larger, and the variation of the distortion aberration of the sixth embodiment may be smaller. Furthermore, the sixth embodiment of the optical imaging lens may be manufactured more easily and the yield rate may be higher.

Figure 30:
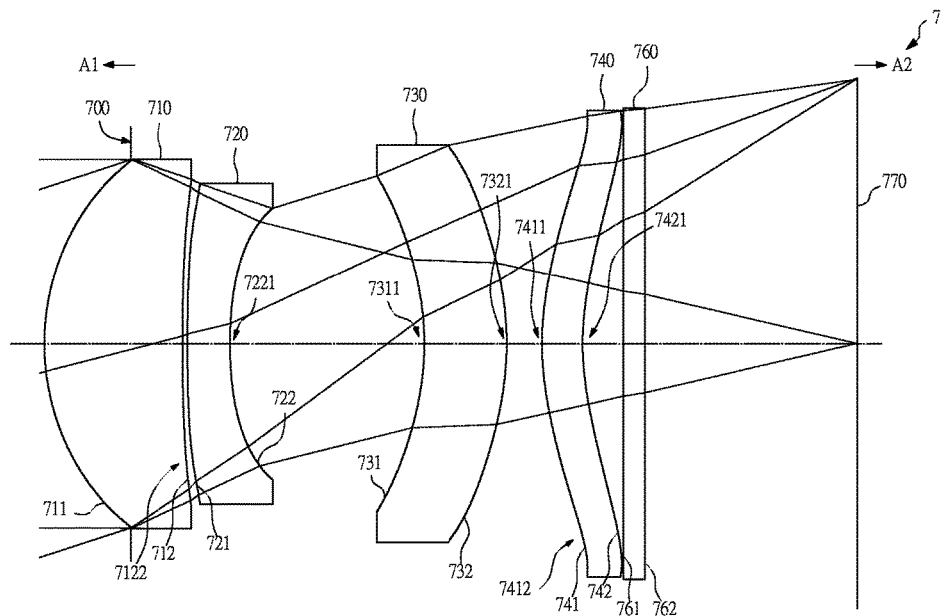
FIG. 30 is a cross-sectional view of a seventh embodiment of an optical imaging lens having four lens elements according to the present disclosure.
Figure 31:
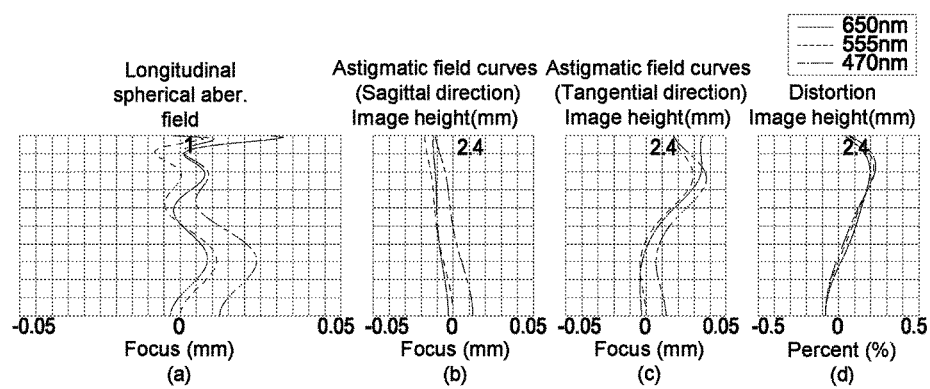
FIG. 31 is a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having four lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labelled in the present embodiment are similar to those in the first embodiment for the similar elements, but here the reference numbers are initialed with 7, for example, reference number 731 for labelling the object-side surface of the third lens element 730, reference number 732 for labelling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730 and a fourth lens element 740.

The arrangement of the convex or concave surface structures, including the object-side surfaces 711, 721 and image-side surfaces 732, 742 are generally similar with the optical imaging lens 1. The differences between the optical imaging lens 1 and the optical imaging lens 7 may include the concave/convex shapes of the object-side surfaces 731, 741, the image-side surfaces 712, 722, 732, 742 and a refracting power, a radius of curvature, a thickness, an aspherical data, and an effective focal length of each lens element. More specifically, the fourth lens element 740 has positive refracting power, the image-side surface 712 may comprise a concave portion 7122 in a vicinity of a periphery of the first lens element 710, the image-side surface 722 comprise a convex portion 7221 in a vicinity of the optical axis, the object-side surface 731 may comprise a concave portion 7311 in a vicinity of the optical axis, image-side surface 732 may comprise a concave portion 7321 in a vicinity of the optical axis, the object-side surface 741 may comprise a convex portion 7411 in a vicinity of the optical axis and a convex portion 7412 in a vicinity of a periphery of the fourth lens element 740, and the image-side surface 742 may comprise a concave portion 7421 in a vicinity of the optical axis.

Here, for clearly showing the drawings of the present embodiment, only the surface shapes which are different from that in the first embodiment are labelled. Please refer to FIG. 32 for the optical characteristics of each lens elements in the optical imaging lens 7 the present embodiment.

From the vertical deviation of each curve shown in FIG. 31(a), the offset of the off-axis light relative to the image point may be within ±0.035 mm. Referring to FIG. 31(b), the focus variation with respect to the three different wavelengths (470 nm, 555 nm, 650 nm) in the whole field falls within ±0.02 mm. Referring to FIG. 31(c), the focus variation with respect to the three different wavelengths (470 nm, 555 nm, 650 nm) in the whole field falls within ±0.04 mm. Please refer to FIG. 31(d), the variation of the distortion aberration of the optical imaging lens 7 may be within ±0.35%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, the seventh embodiment of the optical imaging lens may be manufactured more easily and the yield rate may be higher.

Figure 34:
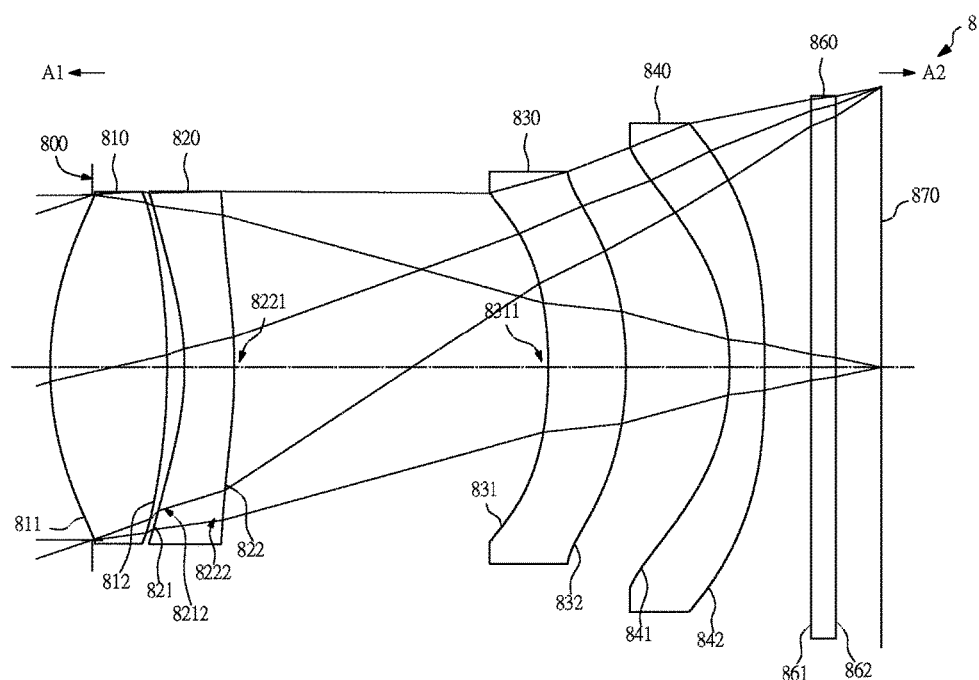
FIG. 34 is a cross-sectional view of an eighth embodiment of an optical imaging lens having four lens elements according to the present disclosure.
Figure 35:
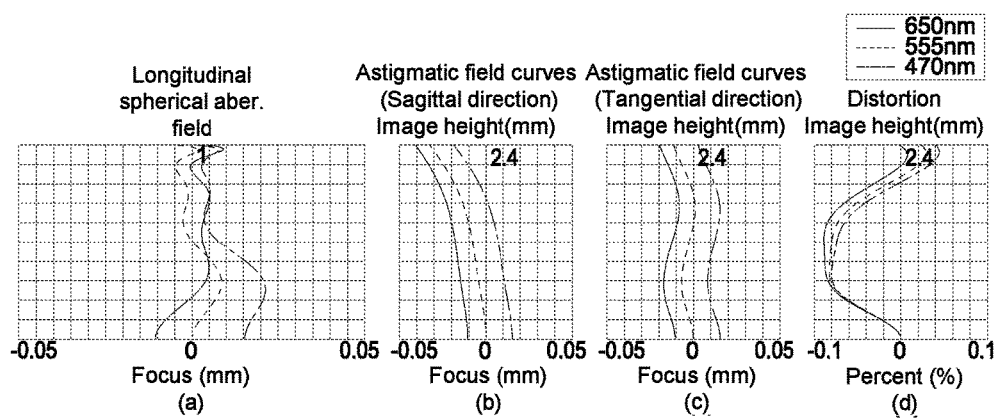
FIG. 35 is a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having four lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labelled in the present embodiment are similar to those in the first embodiment for the similar elements, but here the reference numbers are initialed with 8, for example, reference number 831 for labelling the object-side surface of the third lens element 830, reference number 832 for labelling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830 and a fourth lens element 840.

The arrangement of the convex or concave surface structures, including the object-side surfaces 811, 841 and image-side surfaces 812, 832, 842 are generally similar with the optical imaging lens 1. The differences between the optical imaging lens 1 and the optical imaging lens 8 may include the concave/convex shapes of the object-side surfaces 821, 831, the image-side surface 822 and a radius of curvature, a thickness, an aspherical data, and an effective focal length of each lens element. More specifically, the object-side surface 821 may comprise a concave portion 8212 in a vicinity of a periphery of the second lens element 820, the image-side surface 822 may comprise a convex portion 8221 in a vicinity of the optical axis and a convex portion 8222 in a vicinity of a periphery of the second lens element 820, and the object-side surface 831 may comprise a concave portion 8311 in a vicinity of the optical axis.

Here, for clearly showing the drawings of the present embodiment, only the surface shapes which are different from that in the first embodiment are labelled. Please refer to FIG. 36 for the optical characteristics of each lens elements in the optical imaging lens 8 the present embodiment.

From the vertical deviation of each curve shown in FIG. 35(a), the offset of the off-axis light relative to the image point may be within ±0.025 mm. Referring to FIG. 35 (b), the focus variation with respect to the three different wavelengths (470 nm, 555 nm, 650 nm) in the whole field falls within ±0.045 mm. Referring to FIG. 35 (c), the focus variation with respect to the three different wavelengths (470 nm, 555 nm, 650 nm) in the whole field falls within ±0.02 mm. Please refer to FIG. 35 (d), the variation of the distortion aberration of the optical imaging lens 8 may be within ±0.1%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, Fno of the eighth embodiment may be larger, and the variation of the distortion aberration of the eighth embodiment may be smaller. Further, the eighth embodiment of the optical imaging lens may be manufactured more easily and the yield rate may be higher.

Figure 38:
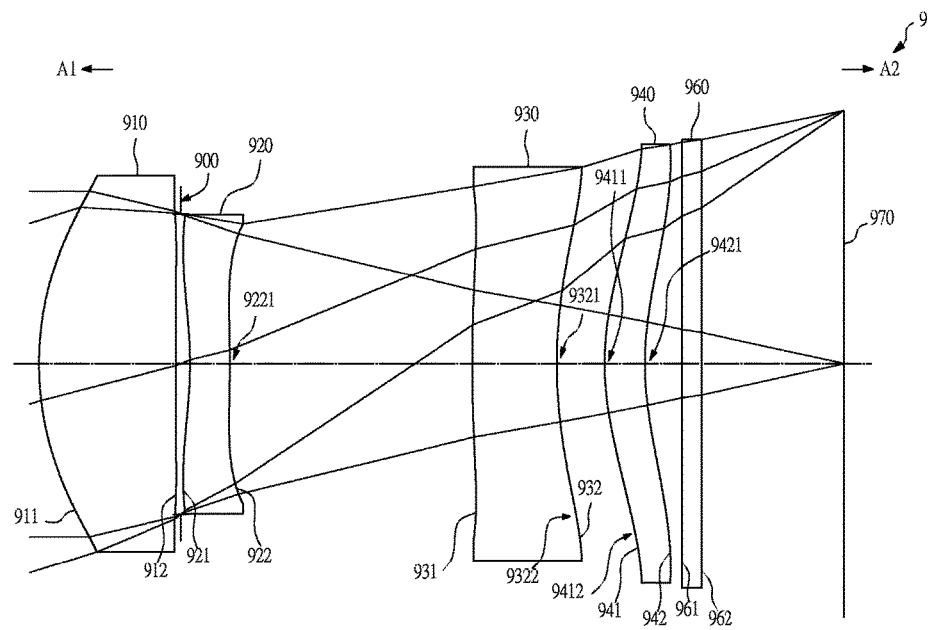
FIG. 38 is a cross-sectional view of a ninth embodiment of an optical imaging lens having four lens elements according to the present disclosure.
Figure 39:
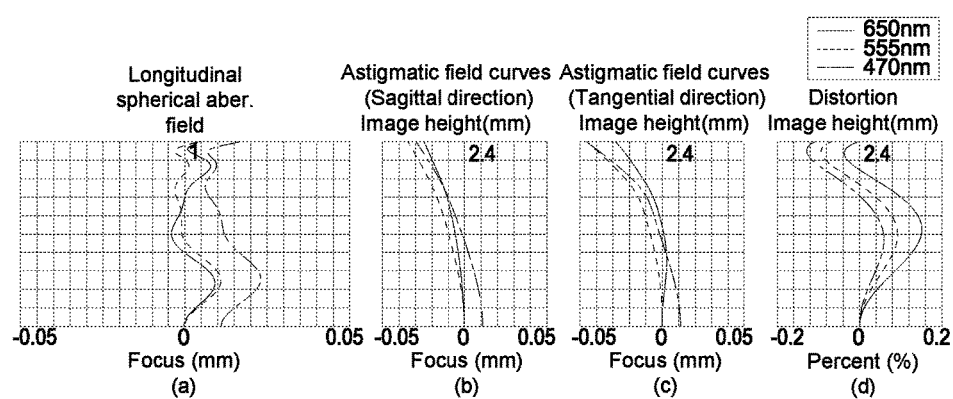
FIG. 39 is a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having four lens elements according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labelled in the present embodiment are similar to those in the first embodiment for the similar elements, but here the reference numbers are initialed with 9, for example, reference number 931 for labelling the object-side surface of the third lens element 930, reference number 932 for labelling the image-side surface of the third lens element 930, etc.

As shown in FIG. 38, the optical imaging lens 9 of the present embodiment, in an order from an object side A1 to an image side A2 along an optical axis, may comprise a first lens element 910, an aperture stop 900, a second lens element 920, a third lens element 930 and a fourth lens element 940.

The arrangement of the convex or concave surface structures, including the object-side surfaces 911, 921, 931 and image-side surface 912 are generally similar with the optical imaging lens 1. The differences between the optical imaging lens 1 and the optical imaging lens 9 may include the position of the aperture stop, the concave/convex shapes of the object-side surface 941, the image-side surfaces 922, 932, 942 and a refracting power, a radius of curvature, a thickness, an aspherical data, and an effective focal length of each lens element. More specifically, the aperture stop 900 may be positioned between the first lens element 910 and the second lens element 920, the third lens element 930 has negative refracting power, the fourth lens element 940 has positive refracting power, the image-side surface 922 may comprise a convex portion 9221 in a vicinity of the optical axis, the image-side surface 932 may comprise a concave portion 9321 in a vicinity of the optical axis and a concave portion 9322 in a vicinity of a periphery of the third lens element 930, the object-side surface 941 may comprise a convex portion 9411 in a vicinity of the optical axis and a convex portion 9412 in a vicinity of a periphery of the fourth lens element, and the image-side surface 942 may comprise a concave portion 9421 in a vicinity of the optical axis.

Here, for clearly showing the drawings of the present embodiment, only the surface shapes which are different from that in the first embodiment are labelled. Please refer to FIG. 40 for the optical characteristics of each lens elements in the optical imaging lens 9 the present embodiment.

From the vertical deviation of each curve shown in FIG. 39(a), the offset of the off-axis light relative to the image point may be within ±0.025 mm. Referring to FIG. 39(b), the focus variation with respect to the three different wavelengths (470 nm, 555 nm, 650 nm) in the whole field falls within ±0.035 mm. Referring to FIG. 39(c), the focus variation with respect to the three different wavelengths (470 nm, 555 nm, 650 nm) in the whole field falls within ±0.048 mm. Please refer to FIG. 39(d), the variation of the distortion aberration of the optical imaging lens 9 may be within ±0.16%.

Please refer to FIG. 42 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the first embodiment, Fno of the ninth embodiment may be larger, and the variation of the distortion aberration of the ninth embodiment may be smaller. Further, the ninth embodiment of the optical imaging lens may be manufactured more easily and the yield rate may be higher.

Please refer to FIG. 42 which shows the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the first to ninth embodiments, and it is clear that the optical imaging lenses of the first to ninth embodiments satisfy the Equations (1)-(22).

In other embodiments, a fifth lens element could be positioned between the third lens element and the fourth lens element. The embodiments of the optical imaging lens with five lens elements are provided as below.

Figure 43:
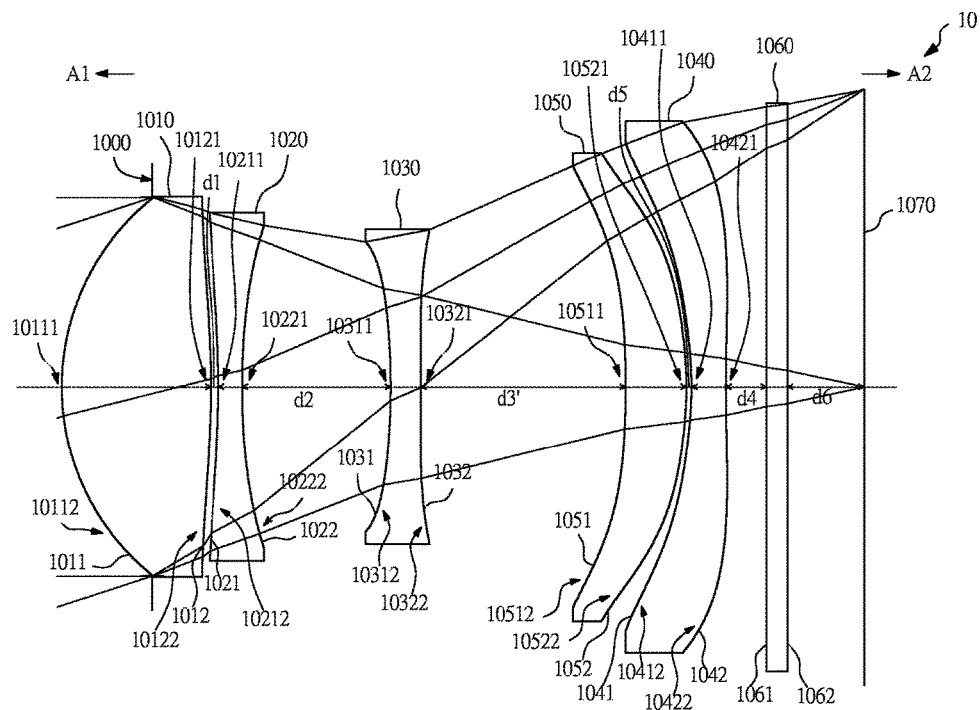
FIG. 43 is a cross-sectional view of a tenth embodiment of an optical imaging lens having five lens elements according to the present disclosure.
Figure 44:
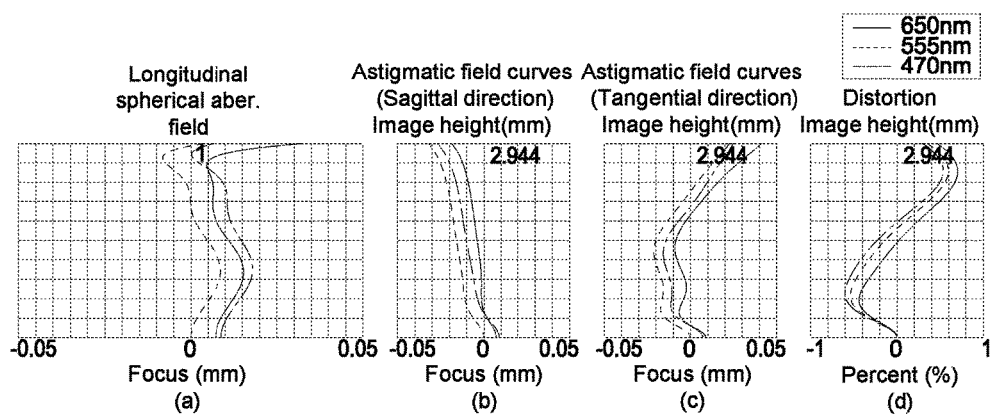
FIG. 44 is a chart of longitudinal spherical aberration and other kinds of optical aberrations of a tenth embodiment of the optical imaging lens according to the present disclosure.

Reference is now made to FIGS. 43-46. FIG. 43 illustrates an example cross-sectional view of an optical imaging lens 10 having five lens elements of the optical imaging lens according to a tenth example embodiment. FIG. 44 shows example charts of longitudinal spherical aberration and other kinds of optical aberrations of the optical imaging lens 10 according to the tenth example embodiment. FIG. 45 illustrates an example table of optical data of each lens element of the optical imaging lens 10 according to the tenth example embodiment. FIG. 46 depicts an example table of aspherical data of the optical imaging lens 1 according to the tenth example embodiment.

As shown in FIG. 43, the optical imaging lens 10 of the present embodiment may comprise, in order from an object side A1 to an image side A2 along an optical axis, an aperture stop 1000, a first lens element 1010, a second lens element 1020, a third lens element 1030, a fifth lens element 1050 and a fourth lens element 1040. A filtering unit 1060 and an image plane 1070 of an image sensor (not shown) are positioned at the image side A2 of the optical lens 1. Each of the first, second, third, fifth and fourth lens elements 1010, 1020, 1030, 1050, 1040 and the filtering unit 160 may comprise an object-side surface 1011/1021/1031/1051/1041/1061 facing toward the object side A1 and an image-side surface 1012/1022/1032/1052/1042/1062 facing toward the image side A2.

An example embodiment of the first lens element 1010 may have positive refracting power. The object-side surface 1011 may comprise a convex portion 10111 in a vicinity of an optical axis and a convex portion 10112 in a vicinity of a periphery of the first lens element 1010. The image-side surface 1012 may comprise a convex portion 10121 in a vicinity of the optical axis and a convex portion 10122 in a vicinity of a periphery of the first lens element 1010. The object-side surface 1011 and the image-side surface 1012 may be aspherical surfaces.

An example embodiment of the second lens element 1020 may have negative refracting power. The object-side surface 1021 may comprise a concave portion 10211 in a vicinity of the optical axis and a concave portion 10212 in a vicinity of a periphery of the second lens element 1020. The image-side surface 1022 may comprise a concave portion 10221 in a vicinity of the optical axis and a concave portion 10222 in a vicinity of a periphery of the second lens element 1020.

The object-side surface 1021 and the image-side surface 1022 may be aspherical surfaces.

An example embodiment of the third lens element 1030 may have negative refracting power. The object-side surface 1031 may comprise a concave portion 10311 in a vicinity of the optical axis and a concave portion 10312 in a vicinity of a periphery of the third lens element 1030. The image-side surface 1032 may comprise a convex portion 10321 in a vicinity of the optical axis and a concave portion 10322 in a vicinity of a periphery of the third lens element 1030. The object-side surface 1031 and the image-side surface 1032 may be aspherical surfaces.

An example embodiment of the fifth lens element 1050 may have positive refracting power. The object-side surface 1051 may comprise a concave portion 10511 in a vicinity of the optical axis and a concave portion 10512 in a vicinity of a periphery of the fifth lens element 1050. The image-side surface 1052 may comprise a convex portion 10521 in a vicinity of the optical axis and a convex portion 10522 in a vicinity of a periphery of the fifth lens element 1050. The object-side surface 1051 and the image-side surface 1052 may be aspherical surfaces.

An example embodiment of the fourth lens element 1040 may have negative refracting power. The object-side surface 1041 may comprise a concave portion 10411 in a vicinity of the optical axis and a concave portion 10412 in a vicinity of a periphery of the fourth lens element 140. The image-side surface 1042 may comprise a concave portion 10421 in a vicinity of the optical axis and a convex portion 10422 in a vicinity of a periphery of the fourth lens element 1040. The object-side surface 1041 and the image-side surface 1042 may be aspherical surfaces.

The tenth embodiment has the common technical features with the first embodiment, which may comprise the first lens element 1010 having a positive refracting power, the object-side surface 1011 may comprise a convex portion 10111 in a vicinity of an optical axis and a convex portion 10112 in a vicinity of a periphery of the first lens element 1010, the second lens element 1020 has negative refracting power, the object-side surface 1031 may comprise a concave portion 10312 in a vicinity of a periphery of the third lens element 1030, the image-side surface 1042 may comprise a convex portion 10422 in a vicinity of a periphery of the fourth lens element 1040.

In example embodiments, air gaps exist between the lens elements 1010, 1020, 1030, 1050, 1040, the filtering unit 1060 and the image plane 1070 of the image sensor. For example, FIG. 43 illustrates the air gap d1 existing between the first lens element 1010 and the second lens element 1020, the air gap d2 existing between the second lens element 1020 and the third lens element 1030, the air gap d3' existing between the third lens element 1030 and the fifth lens element 1050, the air gap d5 existing between the fifth lens element 1050 and the fourth lens element 140, the air gap d4 existing between the fourth lens element 1040 and the filtering unit 1060, and the air gap d6 existing between the filtering unit 1060 and the image plane 1070 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G12, the air gap d2 is denoted by G23, the air gap d3' is denoted by G35, the air gap d5 is denoted by G54, and the sum of d1, d2, d3', and d5 is denoted by Gaa. FIG. 44 depicts the optical characteristics of each lens elements in the optical imaging lens 10 of the present embodiment.

The aspherical surfaces including the object-side surface 1011 of the first lens element 1010, the image-side surface 1012 of the first lens element 1010, the object-side surface 1021 and the image-side surface 1022 of the second lens element 1020, the object-side surface 1031 and the image-side surface 1032 of the third lens element 1030, the object-side surface 1051 and the image-side surface 1052 of the fifth lens element 1050, and the object-side surface 1041 and the image-side surface 1042 of the fourth lens element 1040 are all defined by formula (1).

FIG. 44(a) shows the longitudinal spherical aberration, wherein the transverse axis of FIG. 44(a) defines the focus, and the lengthwise axis of FIG. 44(a) defines the filed. FIG. 44(b) shows the astigmatism aberration in the sagittal direction, wherein the transverse axis of FIG. 44(b) defines the focus, and the lengthwise axis of FIG. 44(b) defines the image height. FIG. 44(c) shows the astigmatism aberration in the tangential direction, wherein the transverse axis of FIG. 44(c) defines the focus, and the lengthwise axis of FIG. 44(c) defines the image height. FIG. 44(d) shows the variation of the distortion aberration, wherein the transverse axis of FIG. 44(d) defines the percentage, and the lengthwise axis of FIG. 44(d) defines the image height. The three curves with different wavelengths (470 nm, 555 nm, 650 nm) represent that off-axis light with respect to these wavelengths may be focused around an image point. From the vertical deviation of each curve shown in FIG. 44(a), the offset of the off-axis light relative to the image point may be within about ±0.035 mm. Therefore, the tenth embodiment may improve the longitudinal spherical aberration with respect to different wavelengths. Referring to FIG. 44(b), the focus variation with respect to the three different wavelengths (470 nm, 555 nm, 650 nm) in the whole field may fall within about ±0.04 mm. Referring to FIG. 44(c), the focus variation with respect to the three different wavelengths (470 nm, 555 nm, 650 nm) in the whole field may fall within about ±0.05 mm. Please refer to FIG. 44(d), the transverse axis of FIG. 44(d), the variation of the distortion aberration may be within about ±0.8%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

The distance from the object-side surface 1011 of the first lens element 1010 to the image plane 1070 along the optical axis may be about 7.952 mm, and then the present embodiment has short length of the optical image lens and could achieve to be designed for slim product under well optical performance.

Figure 47:
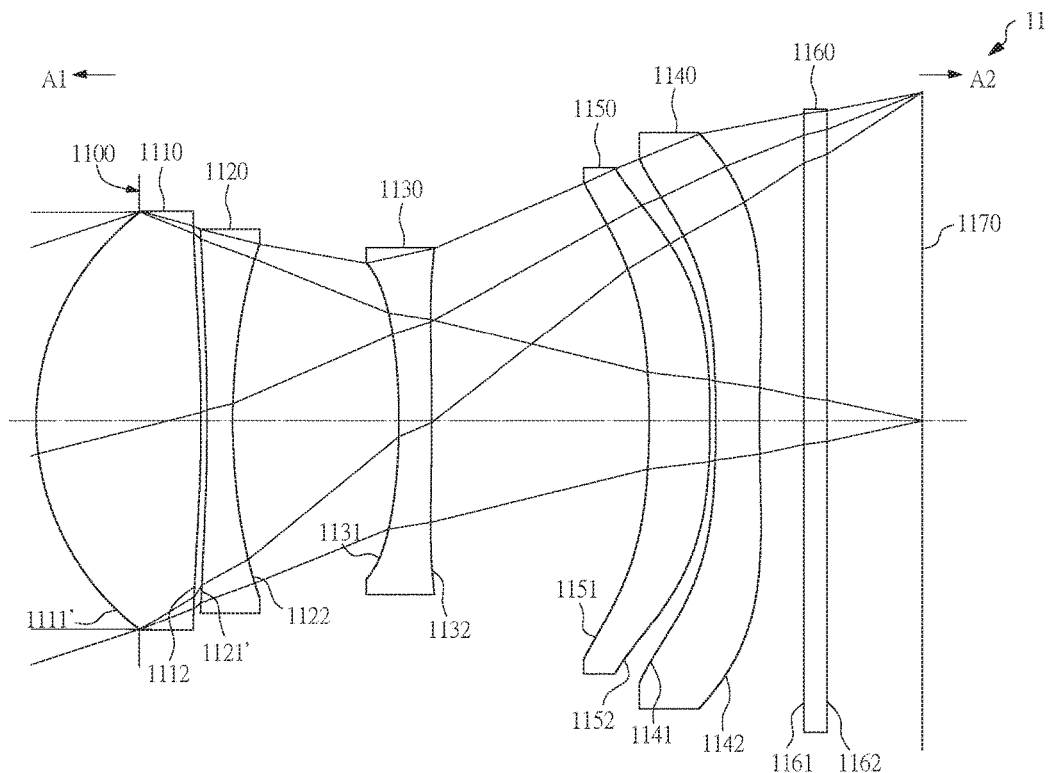
FIG. 47 is a cross-sectional view of an eleventh embodiment of an optical imaging lens having five lens elements according to the present disclosure.
Figure 48:
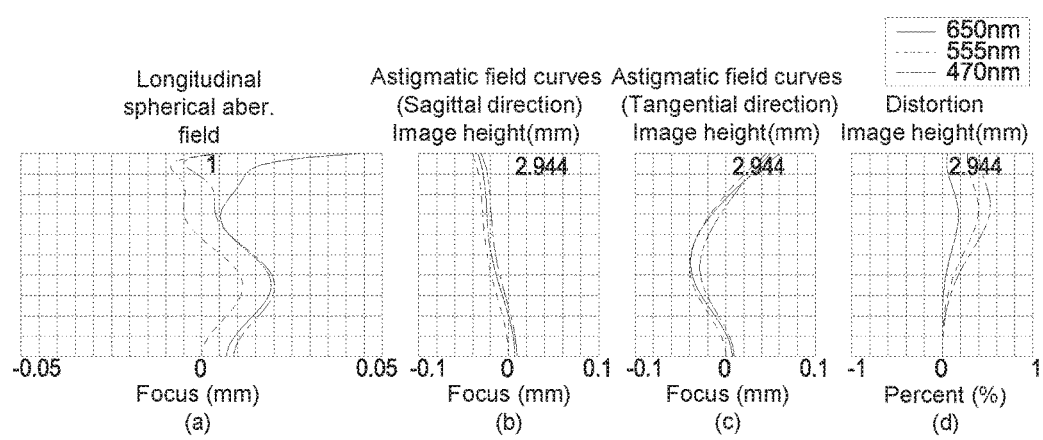
FIG. 48 is a chart of longitudinal spherical aberration and other kinds of optical aberrations of an eleventh embodiment of the optical imaging lens according to the present disclosure.

Reference is now made to FIGS. 47-50. FIG. 47 illustrates an example cross-sectional view of an optical imaging lens 11 having five lens elements of the optical imaging lens according to a eleventh example embodiment. FIG. 48 shows example charts of longitudinal spherical aberration and other kinds of optical aberrations of the optical imaging lens 11 according to the eleventh example embodiment. FIG. 49 shows an example table of optical data of each lens element of the optical imaging lens 11 according to the eleventh example embodiment. FIG. 50 shows an example table of aspherical data of the optical imaging lens 11 according to the eleventh example embodiment. The reference numbers labelled in the present embodiment are similar to those in the tenth embodiment for the similar elements, but here the reference numbers are initialed with 11, for example, reference number 1131 for labelling the object-side surface of the third lens element 1130, reference number 1132 for labelling the image-side surface of the third lens element 1130, etc.

As shown in FIG. 47, the optical imaging lens 11 of the present embodiment, in an order from an object side A1 to an image side A2 along an optical axis, may comprise an aperture stop 1100, a first lens element 1110, a second lens element 1120, a third lens element 1130, a fifth lens element 1150 and a fourth lens element 1140.

The arrangement of the convex or concave surface structures, including the object-side surfaces 1111', 1121', 1131, 1151, 1141 and image-side surfaces 1112', 1122', 1132, 1152, 1142 are generally same with the optical imaging lens 10. The differences between the optical imaging lens 10 and the optical imaging lens 11 may include a radius of curvature, a refracting power, a thickness, an aspherical data, and an effective focal length of each lens element.

Here, for clearly showing the drawings of the present embodiment, only the surface shapes which are different from that in the tenth embodiment are labelled. Please refer to FIG. 49 for the optical characteristics of each lens elements in the optical imaging lens 11 the present embodiment.

From the vertical deviation of each curve shown in FIG. 48(a), the offset of the off-axis light relative to the image point may be within about ±0.045 mm. Referring to FIG. 48(b), the focus variation with respect to the three different wavelengths (470 nm, 555 nm, 650 nm) in the whole field may fall within about ±0.04 mm. Referring to FIG. 48(c), the focus variation with respect to the three different wavelengths (470 nm, 555 nm, 650 nm) in the whole field may fall within about ±0.06 mm. Refer to FIG. 48(d), the variation of the distortion aberration of the optical imaging lens 11 may be within about ±0.6%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the eleventh embodiment has larger HFOV and Fno, and smaller variation of the distortion aberration. Further, the eleventh embodiment may be manufactured more easily and the yield rate may be higher.

Figure 51:
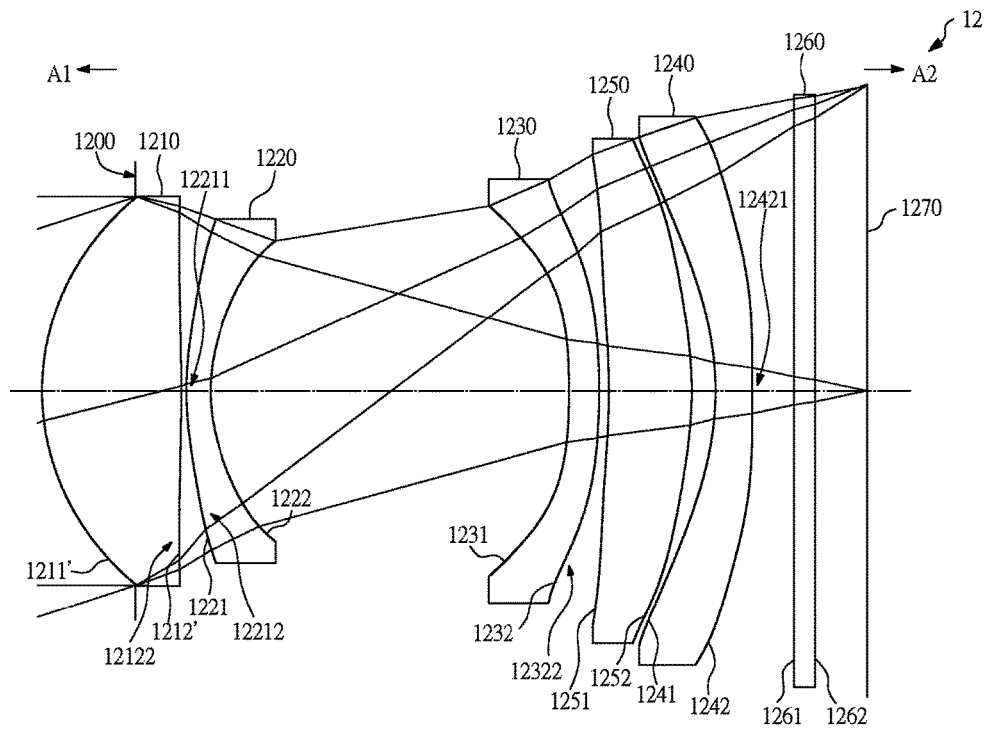
FIG. 51 is a cross-sectional view of a twelfth embodiment of an optical imaging lens having five lens elements according to the present disclosure.
Figure 52:
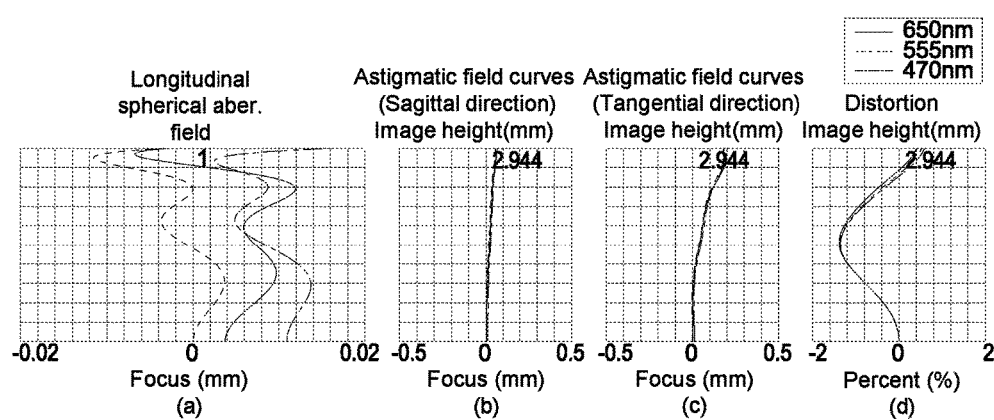
FIG. 52 is a chart of longitudinal spherical aberration and other kinds of optical aberrations of a twelfth embodiment of the optical imaging lens according to the present disclosure.

Reference is now made to FIGS. 51-54. FIG. 51 illustrates an example cross-sectional view of an optical imaging lens 12 having five lens elements of the optical imaging lens according to a twelfth example embodiment. FIG. 52 shows example charts of longitudinal spherical aberration and other kinds of optical aberrations of the optical imaging lens 12 according to the twelfth example embodiment. FIG. 53 shows an example table of optical data of each lens element of the optical imaging lens 12 according to the twelfth example embodiment. FIG. 54 shows an example table of aspherical data of the optical imaging lens 12 according to the twelfth example embodiment. The reference numbers labelled in the present embodiment are similar to those in the tenth embodiment for the similar elements, but here the reference numbers are initialed with 12, for example, reference number 1231 for labelling the object-side surface of the third lens element 1230, reference number 1232 for labelling the image-side surface of the third lens element 1230, etc.

As shown in FIG. 51, the optical imaging lens 12 of the present embodiment, in an order from an object side A1 to an image side A2 along an optical axis, may comprise an aperture stop 1200, a first lens element 1210, a second lens element 1220, a third lens element 1230, a fifth lens element 1250 and a fourth lens element 1240.

The arrangement of the convex or concave surface structures, including the object-side surfaces 1211', 1231, 1251, 1241 and image-side surfaces 1222', 1252 are generally same with the optical imaging lens 10. The differences between the optical imaging lens 10 and the optical imaging lens 12 may include the concave/convex shapes of the object-side surface 1221' facing to the object side A1 and the image-side surfaces 1212', 1232, 1242 facing to the image side A2, and a radius of curvature, a refracting power, a thickness, an aspherical data, and an effective focal length of each lens element. More specifically, the image-side surface 1212' may comprise a concave portion 12122 in a vicinity of a periphery of the first lens element 1210, the object-side surface 1221' may comprise a convex portion 12211 in a vicinity of the optical axis and a convex portion 12212 in a vicinity of a periphery of the second lens element 1220, the image-side surface 1232 may comprise a convex portion 12322 in a vicinity of a periphery of the third lens element 1230, and the image-side surface 1242 may comprise a convex portion 12421 in a vicinity of the optical axis.

Here, for clearly showing the drawings of the present embodiment, only the surface shapes which are different from that in the tenth embodiment are labelled. Please refer to FIG. 53 for the optical characteristics of each lens elements in the optical imaging lens 12 the present embodiment.

From the vertical deviation of each curve shown in FIG. 52(a), the offset of the off-axis light relative to the image point may be within about ±0.016 mm. Referring to FIG. 52(b), the focus variation with respect to the three different wavelengths (470 nm, 555 nm, 650 nm) in the whole field may fall within about ±0.10 mm. Referring to FIG. 52(c), the focus variation with respect to the three different wavelengths (470 nm, 555 nm, 650 nm) in the whole field may fall within about ±0.20 mm. Refer to FIG. 52(d), the variation of the distortion aberration of the optical imaging lens 12 may be within about ±1.4%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the twelfth embodiment has smaller longitudinal spherical aberration. Further, the twelfth embodiment may be manufactured more easily and the yield rate may be higher.

Figure 55:
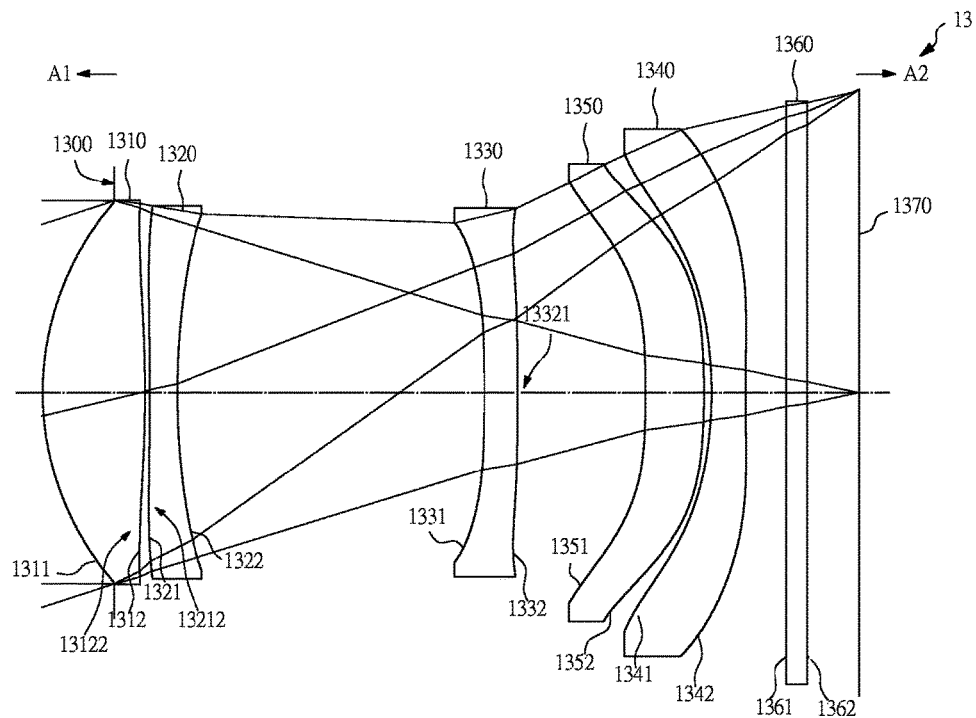
FIG. 55 is a cross-sectional view of a thirteenth embodiment of an optical imaging lens having five lens elements according to the present disclosure.
Figure 56:
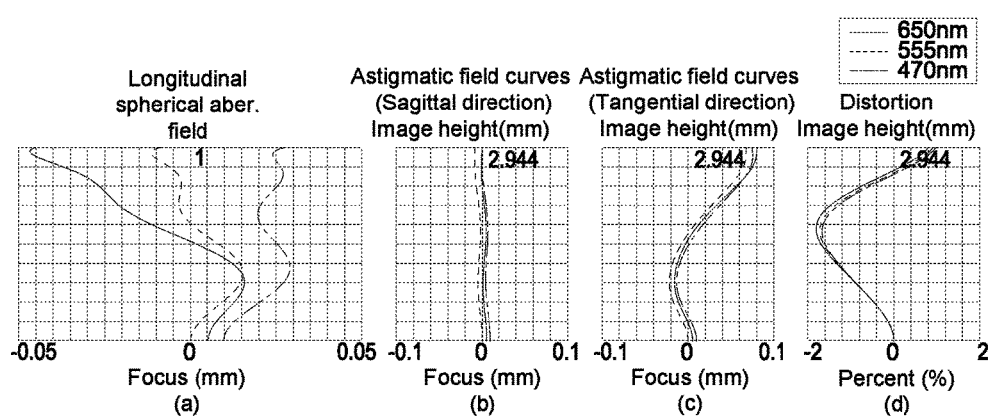
FIG. 56 is a chart of longitudinal spherical aberration and other kinds of optical aberrations of a thirteenth embodiment of the optical imaging lens according to the present disclosure.

Reference is now made to FIGS. 55-58. FIG. 55 illustrates an example cross-sectional view of an optical imaging lens 13 having five lens elements of the optical imaging lens according to a thirteenth example embodiment. FIG. 56 shows example charts of longitudinal spherical aberration and other kinds of optical aberrations of the optical imaging lens 13 according to the thirteenth example embodiment. FIG. 57 shows an example table of optical data of each lens element of the optical imaging lens 13 according to the thirteenth example embodiment. FIG. 58 shows an example table of aspherical data of the optical imaging lens 13 according to the thirteenth example embodiment. The reference numbers labelled in the present embodiment are similar to those in the tenth embodiment for the similar elements, but here the reference numbers are initialed with 13, for example, reference number 1331 for labelling the object-side surface of the third lens element 1330, reference number 1332 for labelling the image-side surface of the third lens element 1330, etc.

As shown in FIG. 55, the optical imaging lens 13 of the present embodiment, in an order from an object side A1 to an image side A2 along an optical axis, may comprise an aperture stop 1300, a first lens element 1310, a second lens element 1320, a third lens element 1330, a fifth lens element 1350 and a fourth lens element 1340.

The arrangement of the convex or concave surface structures, including the object-side surfaces 1311, 1331, 1351, 1341 and image-side surfaces 1322, 1352, 1342 are generally same with the optical imaging lens 10. The differences between the optical imaging lens 10 and the optical imaging lens 13 may include the concave/convex shapes of the object-side surface 1321 facing to the object side A1 and the image-side surfaces 1312, 1332 facing to the image side A2, and a radius of curvature, a refracting power, a thickness, an aspherical data, and an effective focal length of each lens element. More specifically, the image-side surface 1312 may comprise a concave portion 13122 in a vicinity of a periphery of the first lens element 1310, the object-side surface 1321 may comprise a convex portion 13212 in a vicinity of a periphery of the second lens element 1320, and the image-side surface 1332 may comprise a concave portion 13321 in a vicinity of the optical axis.

Here, for clearly showing the drawings of the present embodiment, only the surface shapes which are different from that in the tenth embodiment are labelled. Please refer to FIG. 57 for the optical characteristics of each lens elements in the optical imaging lens 13 the present embodiment.

From the vertical deviation of each curve shown in FIG. 56(a), the offset of the off-axis light relative to the image point may be within about ±0.05 mm. Referring to FIG. 56(b), the focus variation with respect to the three different wavelengths (470 nm, 555 nm, 650 nm) in the whole field may fall within about ±0.02 mm. Referring to FIG. 56(c), the focus variation with respect to the three different wavelengths (470 nm, 555 nm, 650 nm) in the whole field may fall within about ±0.08 mm. Refer to FIG. 56(d), the variation of the distortion aberration of the optical imaging lens 13 may be within about ±2.0%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the thirteenth embodiment has smaller the astigmatism aberration in the sagittal direction. Further, the thirteenth embodiment may be manufactured more easily and the yield rate may be higher.

Figure 59:
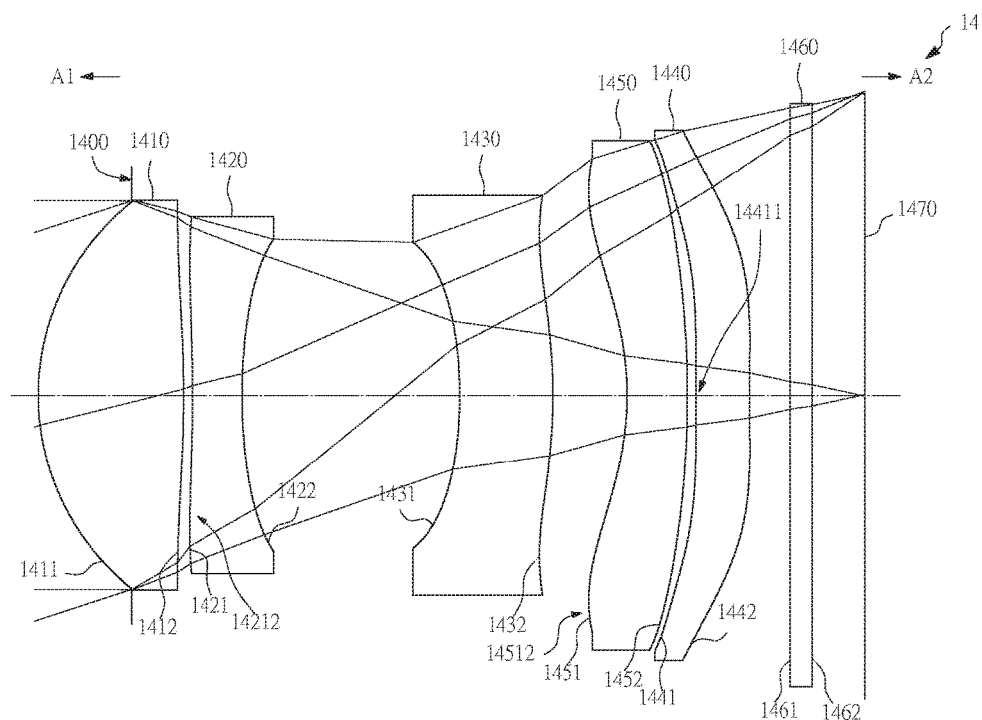
FIG. 59 is a cross-sectional view of a fourteenth embodiment of an optical imaging lens having five lens elements according to the present disclosure.
Figure 60:
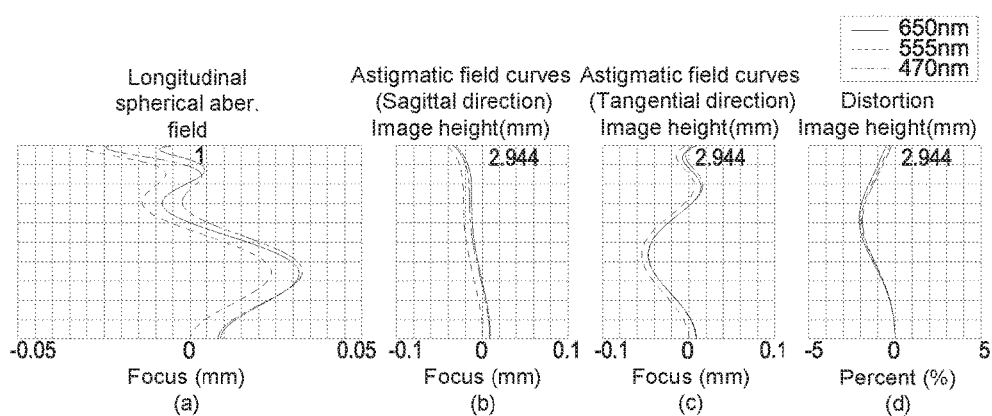
FIG. 60 is a chart of longitudinal spherical aberration and other kinds of optical aberrations of a fourteenth embodiment of the optical imaging lens according to the present disclosure.

Reference is now made to FIGS. 59-62. FIG. 59 illustrates an example cross-sectional view of an optical imaging lens 14 having five lens elements of the optical imaging lens according to a fourteenth example embodiment. FIG. 60 shows example charts of longitudinal spherical aberration and other kinds of optical aberrations of the optical imaging lens 14 according to the fourteenth example embodiment. FIG. 61 shows an example table of optical data of each lens element of the optical imaging lens 14 according to the fourteenth example embodiment. FIG. 62 shows an example table of aspherical data of the optical imaging lens 14 according to the fourteenth example embodiment. The reference numbers labelled in the present embodiment are similar to those in the tenth embodiment for the similar elements, but here the reference numbers are initialed with 14, for example, reference number 1431 for labelling the object-side surface of the third lens element 1430, reference number 1432 for labelling the image-side surface of the third lens element 1430, etc.

As shown in FIG. 59, the optical imaging lens 14 of the present embodiment, in an order from an object side A1 to an image side A2 along an optical axis, may comprise an aperture stop 1400, a first lens element 1410, a second lens element 1420, a third lens element 1430, a fifth lens element 1450 and a fourth lens element 1440.

The arrangement of the convex or concave surface structures, including the object-side surfaces 1411, 1431 and image-side surfaces 1412, 1422, 1432, 1452, 1442 are generally same with the optical imaging lens 10. The differences between the optical imaging lens 10 and the optical imaging lens 14 may include the concave/convex shapes of the object-side surfaces 1421, 1451, 1441 facing to the object side A1, and a refracting power, a radius of curvature, a refracting power, a thickness, an aspherical data and an effective focal length of each lens element. More specifically, the fifth lens element 1450 has negative power, the object-side surface 1421 may comprise a convex portion 14212 in a vicinity of a periphery of the second lens element 1420, the object-side surface 1451 may comprise a convex portion 14512 in a vicinity of a periphery of the fifth lens element 1450, and the object-side surface 1441 may comprise a convex portion 14411 in a vicinity of the optical axis.

Here, for clearly showing the drawings of the present embodiment, only the surface shapes which are different from that in the tenth embodiment are labelled. Please refer to FIG. 61 for the optical characteristics of each lens elements in the optical imaging lens 14 the present embodiment.

From the vertical deviation of each curve shown in FIG. 60(a), the offset of the off-axis light relative to the image point may be within about ±0.035 mm. Referring to FIG. 60(b), the focus variation with respect to the three different wavelengths (470 nm, 555 nm, 650 nm) in the whole field may fall within about ±0.04 mm. Referring to FIG. 60(c), the focus variation with respect to the three different wavelengths (470 nm, 555 nm, 650 nm) in the whole field may fall within about ±0.06 mm. Refer to FIG. 60(d), the variation of the distortion aberration of the optical imaging lens 14 may be within about ±2.5%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the fourteenth embodiment has larger HFOV. Further, the fourteenth embodiment may be manufactured more easily and the yield rate may be higher.

Figure 63:
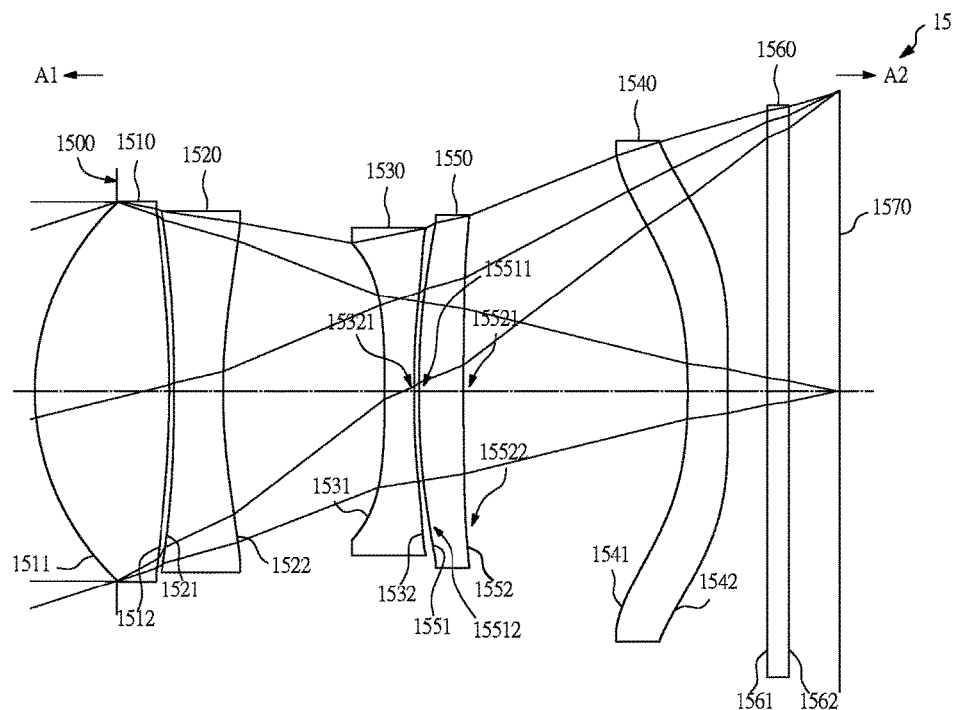
FIG. 63 is a cross-sectional view of a fifteenth embodiment of an optical imaging lens having five lens elements according to the present disclosure.
Figure 64:
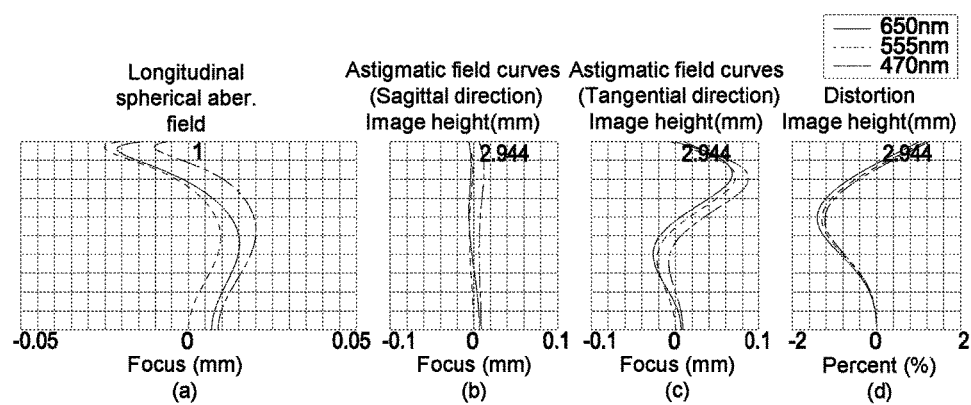
FIG. 64 is a chart of longitudinal spherical aberration and other kinds of optical aberrations of a fifteenth embodiment of the optical imaging lens according to the present disclosure.

Reference is now made to FIGS. 63-66. FIG. 63 illustrates an example cross-sectional view of an optical imaging lens 15 having five lens elements of the optical imaging lens according to a fifteenth example embodiment. FIG. 64 shows example charts of longitudinal spherical aberration and other kinds of optical aberrations of the optical imaging lens 15 according to the fifteenth example embodiment. FIG. 65 shows an example table of optical data of each lens element of the optical imaging lens 15 according to the fifteenth example embodiment. FIG. 66 shows an example table of aspherical data of the optical imaging lens 15 according to the fifteenth example embodiment. The reference numbers labelled in the present embodiment are similar to those in the tenth embodiment for the similar elements, but here the reference numbers are initialed with 15, for example, reference number 1531 for labelling the object-side surface of the third lens element 1530, reference number 1532 for labelling the image-side surface of the third lens element 1530, etc.

As shown in FIG. 63, the optical imaging lens 15 of the present embodiment, in an order from an object side A1 to an image side A2 along an optical axis, may comprise an aperture stop 1500, a first lens element 1510, a second lens element 1520, a third lens element 1530, a fifth lens element 1550 and a fourth lens element 1540.

The arrangement of the convex or concave surface structures, including the object-side surfaces 1511, 1521, 1531, 1541 and image-side surfaces 1512, 1522, 1542 are generally same with the optical imaging lens 10. The differences between the optical imaging lens 10 and the optical imaging lens 15 may include the concave/convex shapes of the object-side surfaces 1551, the image-side surfaces 1532, 1552, and a radius of curvature, a thickness, an aspherical data and an effective focal length of each lens element. More specifically, the image-side surface 1532 may comprise a concave portion 15321 in a vicinity of the optical axis, the object-side surface 1551 may comprise a convex portion 15511 in a vicinity of the optical axis and a convex portion 15512 in a vicinity of a periphery of the fifth lens element 1550, and the image-side surface 1552 may comprise a concave portion 15521 in a vicinity of the optical axis and a concave portion 15522 in a vicinity of a periphery of the fifth lens element 1550.

Here, for clearly showing the drawings of the present embodiment, only the surface shapes which are different from that in the tenth embodiment are labelled. Please refer to FIG. 65 for the optical characteristics of each lens elements in the optical imaging lens 15 the present embodiment.

From the vertical deviation of each curve shown in FIG. 64(a), the offset of the off-axis light relative to the image point may be within about ±0.025 mm. Referring to FIG. 64(b), the focus variation with respect to the three different wavelengths (470 nm, 555 nm, 650 nm) in the whole field may fall within about ±0.02 mm. Referring to FIG. 64(c), the focus variation with respect to the three different wavelengths (470 nm, 555 nm, 650 nm) in the whole field may fall within about ±0.10 mm. Refer to FIG. 64(d), the variation of the distortion aberration of the optical imaging lens 15 may be within about ±1.6%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the fifteenth embodiment has smaller longitudinal spherical aberration and astigmatism aberration in the sagittal direction. Further, the fifteenth embodiment may be manufactured more easily and the yield rate may be higher.

Figure 67:
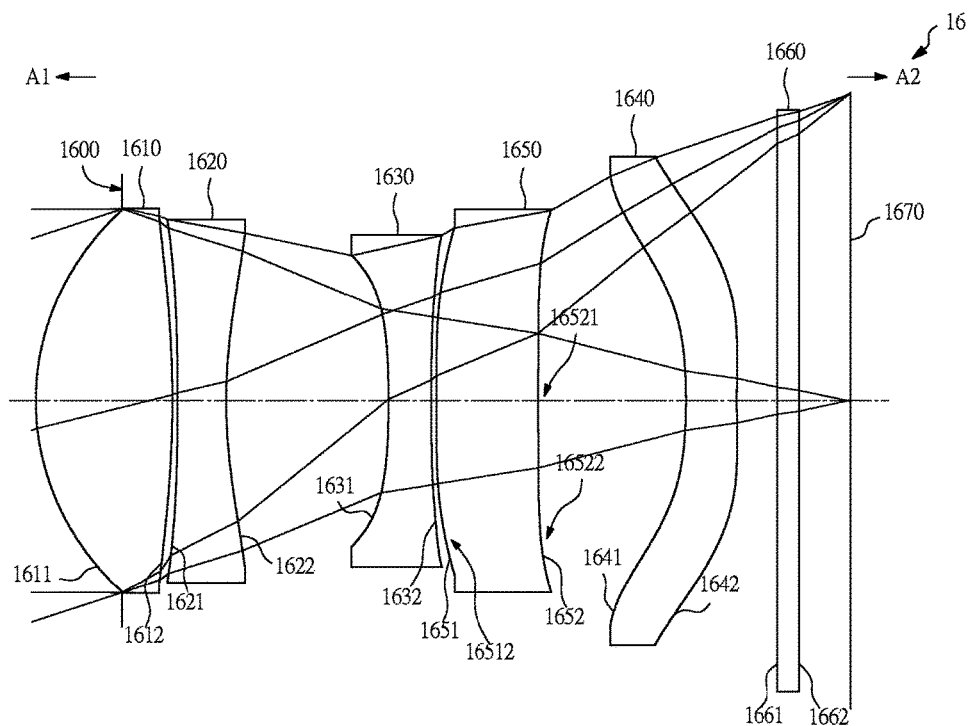
FIG. 67 is a cross-sectional view of a sixteenth embodiment of an optical imaging lens having five lens elements according to the present disclosure.
Figure 68:
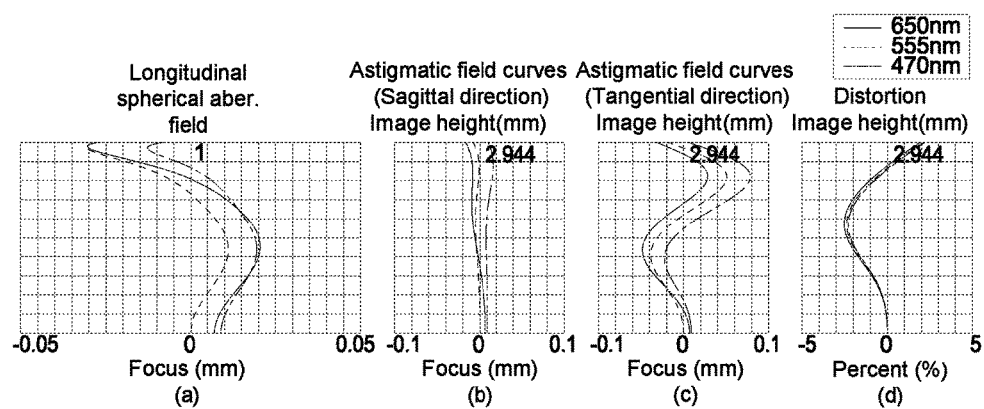
FIG. 68 is a chart of longitudinal spherical aberration and other kinds of optical aberrations of a sixteenth embodiment of the optical imaging lens according to the present disclosure.

Reference is now made to FIGS. 67-70. FIG. 67 illustrates an example cross-sectional view of an optical imaging lens 16 having five lens elements of the optical imaging lens according to a sixteenth example embodiment. FIG. 68 shows example charts of longitudinal spherical aberration and other kinds of optical aberrations of the optical imaging lens 16 according to the sixteenth example embodiment. FIG. 69 shows an example table of optical data of each lens element of the optical imaging lens 16 according to the sixteenth example embodiment. FIG. 70 shows an example table of aspherical data of the optical imaging lens 16 according to the sixteenth example embodiment. The reference numbers labelled in the present embodiment are similar to those in the tenth embodiment for the similar elements, but here the reference numbers are initialed with 16, for example, reference number 1631 for labelling the object-side surface of the third lens element 1630, reference number 1632 for labelling the image-side surface of the third lens element 1630, etc.

As shown in FIG. 67, the optical imaging lens 16 of the present embodiment, in an order from an object side A1 to an image side A2 along an optical axis, may comprise an aperture stop 1600, a first lens element 1610, a second lens element 1620, a third lens element 1630, a fifth lens element 1650 and a fourth lens element 1640.

The arrangement of the convex or concave surface structures, including the object-side surfaces 1611, 1621, 1631, 1641 and image-side surfaces 1612, 1622, 1632, 1642 are generally same with the optical imaging lens 10. The differences between the optical imaging lens 10 and the optical imaging lens 16 may include the concave/convex shapes of the object-side surface 1651, the image-side surface 1652, and a radius of curvature, a refracting power, a thickness, an aspherical data and an effective focal length of each lens element. More specifically, the fifth lens element 1650 has negative refracting power, the object-side surface 1651 may comprise a convex portion 16512 in a vicinity of a periphery of the fifth lens element 1650, and the image-side surface 1652 may comprise a concave portion 16521 in a vicinity of the optical axis and a concave portion 16522 in a vicinity of a periphery of the fifth lens element 1650.

Here, for clearly showing the drawings of the present embodiment, only the surface shapes which are different from that in the tenth embodiment are labelled. Please refer to FIG. 69 for the optical characteristics of each lens elements in the optical imaging lens 16 the present embodiment.

From the vertical deviation of each curve shown in FIG. 68(a), the offset of the off-axis light relative to the image point may be within about ±0.035 mm. Referring to FIG. 68(b), the focus variation with respect to the three different wavelengths (470 nm, 555 nm, 650 nm) in the whole field may fall within about ±0.02 mm. Referring to FIG. 68(c), the focus variation with respect to the three different wavelengths (470 nm, 555 nm, 650 nm) in the whole field may fall within about ±0.08 mm. Refer to FIG. 68(d), the variation of the distortion aberration of the optical imaging lens 16 may be within about ±1.6%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the sixteenth embodiment has smaller longitudinal spherical aberration. Further, the sixteenth embodiment may be manufactured more easily and the yield rate may be higher.

Figure 71:
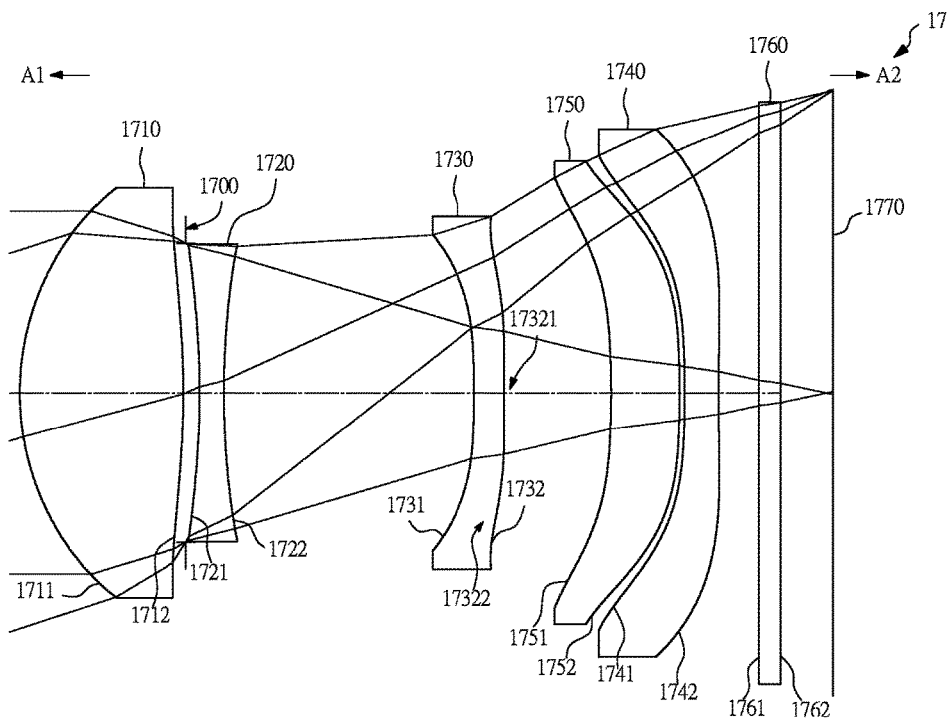
FIG. 71 is a cross-sectional view of a seventeenth embodiment of an optical imaging lens having five lens elements according to the present disclosure.
Figure 72:
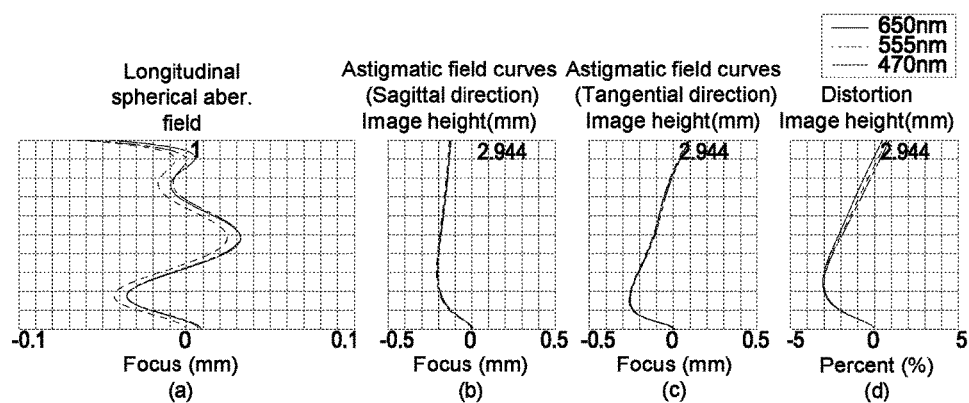
FIG. 72 is a chart of longitudinal spherical aberration and other kinds of optical aberrations of a seventeenth embodiment of the optical imaging lens according to the present disclosure.

Reference is now made to FIGS. 71-74. FIG. 71 illustrates an example cross-sectional view of an optical imaging lens 17 having five lens elements of the optical imaging lens according to a seventeenth example embodiment. FIG. 72 shows example charts of longitudinal spherical aberration and other kinds of optical aberrations of the optical imaging lens 17 according to the seventeenth example embodiment. FIG. 73 shows an example table of optical data of each lens element of the optical imaging lens 17 according to the seventeenth example embodiment. FIG. 74 shows an example table of aspherical data of the optical imaging lens 17 according to the seventeenth example embodiment. The reference numbers labelled in the present embodiment are similar to those in the tenth embodiment for the similar elements, but here the reference numbers are initialed with 17, for example, reference number 1731 for labelling the object-side surface of the third lens element 1730, reference number 1732 for labelling the image-side surface of the third lens element 1730, etc.

As shown in FIG. 71, the optical imaging lens 17 of the present embodiment, in an order from an object side A1 to an image side A2 along an optical axis, may comprise a first lens element 1710, an aperture stop 1700, a second lens element 1720, a third lens element 1730, a fifth lens element 1750 and a fourth lens element 1740.

The arrangement of the convex or concave surface structures, including the object-side surfaces 1711, 1721, 1731, 1751, 1741 and image-side surfaces 1712, 1722, 1752, 1742 are generally same with the optical imaging lens 10. The differences between the optical imaging lens 10 and the optical imaging lens 17 may include the concave/convex shapes of the image-side surface 1732, a position of the aperture stop 1700, and a radius of curvature, a refracting power, a thickness, an aspherical data and an effective focal length of each lens element. More specifically, the aperture stop 1700 may be positioned between the first lens element 1710 and the second lens element 1720, the fifth lens element 1750 has negative refracting power, and the image-side surface 1732 may comprise a concave portion 17321 in a vicinity of the optical axis and a convex portion 17322 in a vicinity of a periphery of the third lens element 1730.

Here, for clearly showing the drawings of the present embodiment, only the surface shapes which are different from that in the tenth embodiment are labelled. Please refer to FIG. 73 for the optical characteristics of each lens elements in the optical imaging lens 17 the present embodiment.

From the vertical deviation of each curve shown in FIG. 72(a), the offset of the off-axis light relative to the image point may be within about ±0.07 mm. Referring to FIG. 72(b), the focus variation with respect to the three different wavelengths (470 nm, 555 nm, 650 nm) in the whole field may fall within about ±0.2 mm. Referring to FIG. 72(c), the focus variation with respect to the three different wavelengths (470 nm, 555 nm, 650 nm) in the whole field may fall within about ±0.3 mm. Refer to FIG. 72(d), the variation of the distortion aberration of the optical imaging lens 16 may be within about ±3.0%.

Please refer to FIG. 75 for the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the present embodiment.

Comparing with the tenth embodiment, the seventeenth embodiment has smaller TTL and larger Fno. Further, the seventeenth embodiment may be manufactured more easily and the yield rate may be higher.

Please refer to FIG. 75 which shows the values of ALT, Gaa, BFL, TTL, TL, EFL/TTL, TL/G23, ALT/T1, (T1+G12+T2+G23)/T3, Fno/(G12+G23), ALT/T4, (T1+G12+T2)/G23, EFL/(T2+T3), (G12+G23)/(T1+T2), EFL/Fno, EFL/T2, Fno/T4, (G12+G23)/T1, EFL/(T1+T2), (T1+T2+T3)/T4, TTL/T2, G23/T2, Fno/T1, ALT/(G12+G23), EFL/G23 and (T2+T3)/T1 of the tenth to seventeenth embodiments, and it is clear that the optical imaging lenses of the tenth to seventeenth embodiments satisfy the Equations (1)-(22).

According to above disclosure, the longitudinal spherical aberration, the astigmatism aberration and the variation of the distortion aberration of each embodiment meet the term of use. Moreover, the off-axis light with respect to 470 nm, 555 nm and 650 nm wavelengths may be focused around an image point, and the offset of the off-axis light for each curve relative to the image point may be controlled with good inhibiting ability for the longitudinal spherical aberration, the astigmatism aberration and the variation of the distortion aberration. Further, referring to the data of imaging quality of each embodiment, the distance between the light with respect to 470 nm, 555 nm and 650 nm wavelengths may be quite close, which represents each embodiment may have well focusing ability for different wavelengths and have good inhibiting ability for dispersion.

According to above illustration, the optical imaging lens of the present disclosure, by controlling the structure of the lens elements and an inequality, the length of the optical imaging lens may be effectively shortened while maintaining good optical characteristics.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first lens element as a closest lens element to an object side, a second lens element as a second closest lens element to the object side and a third lens element as a third closest lens element to the object side and a fourth lens element as a closest lens element to an image side, each of said first, second, third and fourth lens elements having refracting power, an object-side surface facing toward said object side and allowing imaging rays to pass through and an image-side surface facing toward said image side and allowing the imaging rays to pass through, wherein:

said first lens element has positive refracting power, said object-side surface of said first lens element comprises a convex portion in a vicinity of the optical axis and a convex portion in a vicinity of a periphery of said first lens element;

said second lens element has negative refracting power;

said object-side surface of said third lens element comprises a concave portion in a vicinity of a periphery of said third lens element;

said image-side surface of said fourth lens element comprises a convex portion in a vicinity of a periphery of said fourth lens element;

an effective focal length of said optical imaging lens is represented by EFL, and a distance between said object-side surface of said first lens element and an image plane along the optical axis is represented by TTL, wherein EFL and TTL satisfy equation: $1.0 \leq EFL/TTL$;

a distance from said object-side surface of said first lens element to said image-side surface of said fourth lens element along the optical axis is represented by TL, and an air gap between said second lens element and said third lens element along the optical axis is represented by G23, wherein TL and G23 satisfy equation: $TL/G23 \leq 4.5$;

a sum of central thicknesses of said first, second, third and fourth lens elements is represented by ALT, and a central thickness of said first lens element along the optical axis is represented by T1, wherein ALT and T1 satisfy equation: $ALT/T1 \leq 2.8$;

an air gap between said first lens element and said second lens element along the optical axis is represented by G12, a central thickness of said second lens element along the optical axis is represented by T2, a central thickness of said third lens element along the optical axis is represented by T3, wherein T1, G12, T2, T3 and G23 satisfy equation: $4.5 \leq (T1+G12+T2+G23)/T3$; and the central thickness of said fourth lens element along the optical axis is represented by T4, wherein ALT and T4 satisfy the equation: $7.5 \leq ALT/T4$.

2. The optical imaging lens according to claim 1, wherein F-number of said optical imaging lens is represented by Fno, wherein Fno, G12 and G23 satisfy the equation: $Fno/(G12+G23) \leq 1.8$ mm$^{-1}$.

3. The optical imaging lens according to claim 1, wherein T1, T2, G12 and G23 satisfy the equation: $(T1+G12+T2)/G23 \leq 1.3$.

4. The optical imaging lens according to claim 3, wherein EFL, T2 and T3 satisfy the equation: $6.5 \leq EFL/(T2+T3)$.

5. The optical imaging lens according to claim 1, wherein T1, T2, G12 and G23 satisfy the equation: $0.9 \leq (G12+G23)/(T1+T2)$.

6. The optical imaging lens according to claim 5, wherein F-number of said optical imaging lens is represented by Fno, wherein Fno and EFL satisfy the equation: 2.5 mm $\leq EFL/Fno$.

7. The optical imaging lens according to claim 1, wherein EFL and T2 satisfy the equation: $11.5 \leq EFL/T2$.

8. The optical imaging lens according to claim 7, wherein F-number of said optical imaging lens is represented by Fno, wherein Fno and T4 satisfy the equation: 2.5 mm$^{-1}$ $\leq Fno/T4$.

9. The optical imaging lens according to claim 1, wherein G12, G23 and T1 satisfy the equation: $0.8 \leq (G12+G23)/T1$.

10. The optical imaging lens according to claim 9, wherein EFL, T1 and T2 satisfy the equation: $4.5 \leq EFL/(T1+T2)$.

11. The optical imaging lens according to claim 1, wherein T4, T1, T2_ and T3 satisfy the equation: $1.5 \leq (T1+T2+T3)/T4$.

12. The optical imaging lens according to claim 11, wherein TTL and T2 satisfy the equation: $16.5 \leq TTL/T2$.

13. The optical imaging lens according to claim 1, wherein G23 and T2 satisfy the equation: $3.1 \leq G23/T2$.

14. The optical imaging lens according to claim 13, wherein F-number of said optical imaging lens is represented by Fno, wherein Fno and T1 satisfy the equation: $Fno/T1 \leq 2.7$ mm$^{-1}$.

15. The optical imaging lens according to claim 1, wherein ALT, G12 and G23 satisfy the equation: $0.8 \leq ALT/(G12+G23)$.

16. The optical imaging lens according to claim 15, wherein EFL and G23 satisfy the equation: $2.6 \leq EFL/G23$.

17. The optical imaging lens according to claim 1, wherein T1, T2 and T3 satisfy the equation: $(T2+T3)/T1 \leq 1.2$.

18. The optical imaging lens according to claim 1, wherein TTL satisfies the equation: $TTL \leq 8.0$ mm.

19. The optical imaging lens according to claim 1, further comprising an aperture stop, wherein said aperture stop is positioned at said object side of said first lens element or between said first lens element and said second lens element.

* * * * *